United States Patent
Powell et al.

(10) Patent No.: US 12,453,752 B2
(45) Date of Patent: *Oct. 28, 2025

(54) HEVAMINE-RELATED PLANT COMPOSITIONS AND METHODS

(71) Applicant: MOREHOUSE SCHOOL OF MEDICINE, Atlanta, GA (US)

(72) Inventors: Michael Powell, Douglasville, GA (US); Erick Vidjin' Agnih Gbodossou, Dakar-Etoile (SN)

(73) Assignee: MOREHOUSE SCHOOL OF MEDICINE, Atlanta, GA (US)

(*) Notice: Subject to any disclaimer, the term of this patent is extended or adjusted under 35 U.S.C. 154(b) by 795 days.

This patent is subject to a terminal disclaimer.

(21) Appl. No.: 17/660,967

(22) Filed: Apr. 27, 2022

(65) Prior Publication Data

US 2022/0395548 A1 Dec. 15, 2022

Related U.S. Application Data

(60) Provisional application No. 63/208,698, filed on Jun. 9, 2021.

(51) Int. Cl.
*A61K 36/42* (2006.01)
*A01N 63/50* (2020.01)
(Continued)

(52) U.S. Cl.
CPC .............. *A61K 36/42* (2013.01); *A01N 63/50* (2020.01); *A01P 1/00* (2021.08); *A61K 31/352* (2013.01);
(Continued)

(58) Field of Classification Search
None
See application file for complete search history.

(56) References Cited

U.S. PATENT DOCUMENTS

| 4,535,060 A | 8/1985 | Comai |
| 5,405,765 A | 4/1995 | Vasil et al. |

(Continued)

FOREIGN PATENT DOCUMENTS

| EP | 4 019 032 | 6/2022 |
| WO | 2010/112968 | 10/2010 |
| WO | 2020/132062 | 6/2020 |
| WO | 2022/039822 | 2/2022 |

OTHER PUBLICATIONS

Genbank, basic endochitinase-like [Cucurbita maxima], Accession No. XP_022980775, dated Nov. 29, 2017. (Year: 2017).*

(Continued)

*Primary Examiner* — Dominic Lazaro
(74) *Attorney, Agent, or Firm* — Ping Wang; Kalos Athena Wang PLLC

(57) ABSTRACT

The present application relates to a compositions and methods comprising or expressing a hevamine A-related MoMo30 protein from *Momordica balsamina*. The MoMo30 protein is about 30 kDa in size, is stable after being autoclaved at 120° C. for 30 min, resists proteolytic cleavage by trypsin, exhibits mannose-sensitive binding to HIV gp120, exhibits hemagglutinin and chitinase activity, is capable of activating and stimulating T cell proliferation, is capable of preventing infection by HIV-1 or alleviating symptoms in an HIV-1 infected patients, and comprises an amino acid sequence of SEQ ID NO: 4. The MoMo30 protein and/or a nucleic acid encoding the same may be used in methods for preventing or treating microbial infections by HIV, SARS-CoV-2 and other enveloped viruses, as well as other microorganisms comprising cell surface proteins containing glycan residues, such as mannose.

12 Claims, 23 Drawing Sheets

Specification includes a Sequence Listing.

| | | | | | | |
|---|---|---|---|---|---|---|
| *Momordica balsamina* | 73 | VML I | . . . | GIDF I | 127 | SEQ ID NO: 7 |
| *Momordica charantia* | 73 | VLI I | . . . | GVDF I | 127 | SEQ ID NO: 8 |
| Hevea | 73 | VML L | . . . | GIDF I | 127 | SEQ ID NO: 9 |
| Cucumis | 98 | VLI I | . . . | GVDF I | 152 | SEQ ID NO: 10 |
| Nicotana | 89 | TFL I | . . . | GLDL W | 138 | SEQ ID NO: 11 |
| Saccharomyces | 102 | VLI I | . . . | GFDF I | 157 | SEQ ID NO: 12 |
| Alteromonas | 265 | ILE I | . . . | GVDI W | 313 | SEQ ID NO: 13 |
| Bacillus A1 | 158 | TII V | . . . | GVDL W | 204 | SEQ ID NO: 14 |
| Manduca sextaipsum | 257 | FMV V | . . . | GLDL W | 146 | SEQ ID NO: 15 |

(51) Int. Cl.
| | |
|---|---|
| *A01P 1/00* | (2006.01) |
| *A61K 31/352* | (2006.01) |
| *A61K 33/30* | (2006.01) |
| *A61K 38/47* | (2006.01) |
| *A61P 31/18* | (2006.01) |
| *C12N 15/10* | (2006.01) |
| *C12N 15/82* | (2006.01) |
| *C12P 19/34* | (2006.01) |

(52) U.S. Cl.
CPC .............. *A61K 33/30* (2013.01); *A61K 38/47* (2013.01); *A61P 31/18* (2018.01); *C12N 15/1096* (2013.01); *C12N 15/8283* (2013.01); *C12P 19/34* (2013.01); *C07K 2319/01* (2013.01)

(56) References Cited

U.S. PATENT DOCUMENTS

| | | | |
|---|---|---|---|
| 5,472,869 | A | 12/1995 | Krzyek et al. |
| 5,508,468 | A | 4/1996 | Lundquist et al. |
| 5,538,877 | A | 7/1996 | Lundquist et al. |
| 5,538,880 | A | 7/1996 | Lundquist et al. |
| 5,545,818 | A | 8/1996 | McBride et al. |
| 5,550,318 | A | 8/1996 | Adams et al. |
| 5,563,055 | A | 10/1996 | Townsend et al. |
| 5,641,664 | A | 6/1997 | D'Halluin et al. |
| 5,668,085 | A | 9/1997 | Forbes et al. |
| 5,683,958 | A | 11/1997 | Berger et al. |
| 5,703,015 | A | 12/1997 | Berger et al. |
| 5,736,369 | A | 4/1998 | Bowen et al. |
| 6,063,733 | A | 5/2000 | Berger et al. |
| 6,121,199 | A | 9/2000 | Berger et al. |
| 6,121,200 | A | 9/2000 | Berger et al. |
| 6,184,182 | B1 | 2/2001 | Gillespie et al. |
| 6,245,713 | B1 | 6/2001 | Brinker et al. |
| 6,365,551 | B1 | 4/2002 | Wright et al. |
| RE37,866 | E | 10/2002 | Wright et al. |
| 6,566,587 | B1 | 5/2003 | Lebrun et al. |
| 8,937,214 | B2 | 1/2015 | Gilbertson et al. |
| 10,329,580 | B2 | 6/2019 | Schultheiss et al. |
| 11,166,999 | B1 * | 11/2021 | Powell .................... A61K 38/47 |
| 11,266,723 | B1 * | 3/2022 | Powell .................... A61K 35/76 |
| 11,413,320 | B2 * | 8/2022 | Powell ...................... A61K 9/20 |
| 11,801,285 | B2 * | 10/2023 | Powell .................. C07K 14/415 |
| 11,925,670 | B2 * | 3/2024 | Powell ..................... A61P 31/16 |
| 12,246,052 | B2 * | 3/2025 | Powell ............... C12N 15/1096 |
| 2003/0104943 | A1 | 6/2003 | Lennon et al. |
| 2018/0290804 | A1 | 10/2018 | Aldaous et al. |
| 2022/0135997 | A1 | 5/2022 | Schultink et al. |

OTHER PUBLICATIONS

Genbank, Cucurbita maxima basic endochitinase-like (LOC111480064), transcript variant X3,mRNA, Accession No. XM_023125009, dated Nov. 29, 2017. (Year: 2017).*

Zhou, Y. et al., "A Single Asparagine-Linked Glycosylation Site of the Severe Acute Respiratory Syndrome Coronavirus Spike Glycoprotein Facilitates Inhibition by Mannose-Binding Lectin through Multiple Mechanisms," Journal of viroglogy, 2010, pp. 8753-8764.

Akkouh, O. et al., "Lectins with Anti-HIV Activity: A Review," Molecules, 2015, vol. 20, pp. 648-668.

Mani, J. S., et al., "Natural product-derived phytochemicals as potential agents against coronaviruses: A review," Virus Research, 2020, pp. 1-16.

Raman, R. et al., "Glycan-protein interactions in viral pathogenesis," Current Opinion in Structural Biology, 2016, vol. 40, pp. 153-162.

Di Veroli, G. Y. et al., "An automated fitting procedure and software for dose-response curves with multiphasic features," Scientific Reports, 2015, pp. 1-11.

He, Y. et al., "Potent HIV fusion inhibitors against Enfuvirtide-resistant HIV-1 strains," The National Academy of Sciences of the USA, 2008, vol. 105, pp. 16332-16337.

Kelley, L. et al., "The Phyre2 web portal for protein modeling, prediction and analysis," Nature Protocols, 2015, vol. 10, pp. 845-858.

Khan, M. et al., "Restoration of Wild-Type Infectivity to Human Immunodeficiency Virus Type 1 Strains Lacking nef by Intravirion Reverse Transcription," Journal of Virology, 2001, vol. 75, pp. 12081-12087.

Kimpton, J. et al., "Detection of replication-competent and pseudotyped human immunodeficiency virus with a sensitive cell line on the basis of activation of an integrated beta-galactosidase gene," Journal of Virology, 1992, vol. 66, pp. 2232-2239.

Romero-Romero, S. et al., "The Stability Landscape of de novo TIM Barrels Explored by a Modular Design Approach," Journal of Molecular Biology, 2021, vol. 433, pp. 1-20.

Punja, Z.K. et al., "Plant Chitinases and Their Roles in Resistance to Fungal Diseases," Journal of Nematology, 1993, vol. 25, pp. 526-540.

Raymond, A.D. et al., "HIV Type 1 Nef Is Released from Infected Cells in CD45+ Microvesicles and Is Present in the Plasma of HIV-Infected Individuals," AIDS Research and Human Retroviruses, 2011, vol. 27, pp. 167-178.

Sahai, A.S. et al., "Chitinases of fungi and plants: their in morphogenesis and host-parasite involvement interaction," FEMS Microbiology Reviews, 1993, vol. 11, pp. 317-338.

Scanlan, C.N. et al., "The Broadly Neutralizing Anti-Human Immunodeficiency Virus Type 1Antibody 2G12 Recognizes a Cluster of $\alpha1{\rightarrow}2$ Mannose Residues on the Outer Face of gp120," Journal of Virology, 2002, vol. 76, pp. 7306-7321.

Simek, M.D. et al., "Human Immunodeficiency Virus Type 1 Elite Neutralizers: Individuals with Broad and Potent Neutralizing Activity Identified by Using a High-Throughput Neutralization Assay together with an Analytical Selection Algorithm," Journal of Virology, 2009, vol. 83, pp. 7337-7348.

Wierenga, R.K., "The TIM-barrel fold: a versatile framework for efficient enzymes," FEBS Letters, 2001, vol. 492, pp. 193-198.

International Search Report and Written Opinion of International Application No. PCT/US2022/071956 mailed Aug. 10, 2022.

* cited by examiner

FIG. 6

M. balsamina MoMo30 = SEQ ID NO: 1
M. charantia Hev A = SEQ ID NO: 5
M. charantia MAP30 = SEQ ID NO: 17

GGIATYWGQDTREGRLTAACATGKFQIINIGFLSTFGNGRPPQVNLTRHCSPISNGCRNVSVGVLNCRN
DGVKVMLSIGGPHGSYSLSSAAEAIDLADYIWNNFLGGRSTSLRPFGDVPLDGVDFRIERGQFSHYYTM
VARRLHDYGRQCSRKVYLTAAPGCRFPDKYLTELLHTGLFDYVWVRFFDDRQCQYNSVNPSGFWWSW
MRWINSIPARKFYVGIPASEEAGDGYVAPEVLIKEVLPFTKKFTNYGGVMLFDLSNDVQTNYSSIISNRV
SEQ ID NO: 4

| | | | | |
|---|---|---|---|---|
| Momordica balsamina | 73 | VMLS... | ...GIDF... | 127 | SEQ ID NO: 7 |
| Momordica charantia | 73 | VLIS... | ...GVDF... | 127 | SEQ ID NO: 8 |
| Hevea | 73 | VMLS... | ...GIDF... | 127 | SEQ ID NO: 9 |
| Cucumis | 98 | VLIS... | ...GVDF... | 152 | SEQ ID NO: 10 |
| Nicotana | 89 | TFIS... | ...GLDL... | 138 | SEQ ID NO: 11 |
| Saccharomyces | 102 | VLIS... | ...GFDF... | 157 | SEQ ID NO: 12 |
| Alteromonas | 265 | ILFS... | ...GVDI... | 313 | SEQ ID NO: 13 |
| Bacillus A1 | 158 | TIIS... | ...GVDL... | 204 | SEQ ID NO: 14 |
|

| Extracts | Hela EC50 µg/ml | SD | SI | HFF EC50 µg/ml | SD | SI |
|---|---|---|---|---|---|---|
| MSM A | 81.94 | 18.73 | 3 | 5.21 | 1.86 | >192 |
| MSM A-rep2 | 93.02 | 20.29 | 3 | 45.25 | 10.16 | >22 |
| MSM B | 64.48 | 3.59 | 69 | 242.53 | 40.61 | >4 |
| MSM B-rep2 | 56.27 | 4.46 | 65 | 285.42 | 34.12 | >4 |
| MSM C | 119.86 | 21.27 | 8 | 207.78 | 29.73 | >5 |
| MSM C-rep2 | 132.63 | 19.06 | 8 | 439.41 | 48.28 | >2 |
| MSM D | 10.40 | 2.27 | 96 | 222.37 | 36.77 | >4 |
| MSM D-rep 2 | 10.96 | 2.43 | 84 | 245.02 | 37.5 | >4 |
| MSM E | 76.49 | 15.16 | 5 | 40.97 | 10.35 | >24 |
| MSM E-rep2 | 87.22 | 41.51 | 11 | 181.73 | 53.39 | >6 |
| MSM A,E | 32.82 | 9.59 | 30 | 97.26 | 135.7 | >10 |
| MSM A,E-rep2 | 38.4 | 17.44 | 26 | 163.12 | 35.44 | >8 |

SEQUENCE LISTING

```
<160> NUMBER OF SEQ ID NOS: 17

<210> SEQ ID NO 1
<211> LENGTH: 921
<212> TYPE: DNA
<213> ORGANISM: M. balsamina
<220> FEATURE:
<221> NAME/KEY: MISC_FEATURE
<222> LOCATION: (1)..(921)
<223> OTHER INFORMATION: M. balsamina MOMO30 nucleotide coding region
      sequence for preprotein

<400> SEQUENCE: 1
atggaatctc aattttgttc ttcatttcca tgtttattc tcctcgtaat tttccctttt       60
atgggctatt attccgaagc aataattacc ggcggcggaa ttgcgactta ttggggccag     120
gacacgagag agggccgact gaccgccgcc tgcgccaccg gaaaatttca gatcatcaac     180
atagggttcc tctctacatt cggcaacggc cggccgccgc aagtgaacct aacgcgccac     240
tgcagtccca tctccaacgg ttgccggaat gtgagcgtcg gcgtcctcaa ctgccgaaac     300
gacggcgtta aagtcatgct ctccatcggt ggccctcatg gaagctactc cctctcctcc     360
gccgccgaag ccattgacct tgctgactac atctggaaca attttctcgg tggccgctcc     420
acgtcactac gaccattcgg tgatgtgcca ttggacggcg tagatttcag gattgaacga     480
ggtcagtttt cccactatta cactatggtt gctcggcggc tacacgacta tggtcgacaa     540
tgtagtcgta aagtgtacct aacggcggct ccaggttgcc gttttccaga caagtaccta     600
accgaattgc ttcacactgg acttttcgac tatgtttggg ttagattttt tgacgatcga     660
caatgccaat ataattctgt taacccgtct ggcttttggt ggtcgtggat gcggtggata     720
aattcaattc cggcgaggaa attttacgtg ggaattcctg catctgaaga agccggagat     780
gggtacgtgg caccagaggt gttgataaag gaagtattgc cctttactaa gaagtttacc     840
aattacggtg gcgttatgct tttcgacttg tcgaatgatg ttcaaactaa ctacagttct     900
ataattagca atagggtttg a                                              921

<210> SEQ ID NO 2
<211> LENGTH: 829
<212> TYPE: DNA
<213> ORGANISM: M. balsamina
<220> FEATURE:
<221> NAME/KEY: MISC_FEATURE
<222> LOCATION: (1)..(829)
<223> OTHER INFORMATION: M. balsamina MOMO30 nucleotide coding sequence
      for mature/secreted protein
```

<400> SEQUENCE: 2

```
cggcggaatt gcgacttatt ggggccagga cacgagagag ggccgactga ccgccgcctg    60
cgccaccgga aaatttcaga tcatcaacat agggttcctc tctacattcg caacggccg    120
gccgccgcaa gtgaacctaa cgcgccactg cagtcccatc tccaacggtt gccggaatgt   180
gagcgtcggc gtcctcaact gccgaaacga cggcgttaaa gtcatgctct ccatcggtgg   240
ccctcatgga agctactccc tctcctccgc cgccgaagcc attgaccttg ctgactacat   300
ctggaacaat tttctcggtg gccgctccac gtcactacga ccattcggtg atgtgccatt   360
ggacggcgta gatttcagga ttgaacgagg tcagttttcc cactattaca ctatggttgc   420
tcggcggcta cacgactatg gtcgacaatg tagtcgtaaa gtgtacctaa cggcggctcc   480
aggttgccgt tttccagaca agtacctaac cgaattgctt cacactggac ttttcgacta   540
tgtttgggtt agatttttg acgatcgaca atgccaatat aattctgtta accgtctgg    600
cttttggtgg tcgtggatgc ggtggataaa ttcaattccg gcgaggaaat ttacgtggg    660
aattcctgca tctgaagaag ccggagatgg gtacgtggca ccagaggtgt tgataaagga   720
agtattgccc tttactaaga agtttaccaa ttacggtggc gttatgcttt tcgacttgtc   780
gaatgatgtt caaactaact acagttctat aattagcaat agggtttga                829
```

<210> SEQ ID NO 3
<211> LENGTH: 306
<212> TYPE: PRT
<213> ORGANISM: M. balsamina
<220> FEATURE:
<221> NAME/KEY: MISC_FEATURE
<222> LOCATION: (1)..(306)
<223> OTHER INFORMATION: M. balsamina MOMO30 amino acid sequence for preprotein

<400> SEQUENCE: 3

```
Met Glu Ser Gln Phe Cys Ser Ser Phe Pro Cys Phe Ile Leu Leu Val
1               5                   10                  15
Ile Phe Pro Phe Met Gly Tyr Tyr Ser Glu Ala Ile Ile Thr Gly G

```
Cys Arg Phe Pro Asp Lys Tyr Leu Thr Glu Leu Leu His Thr Gly Leu
            195                 200                 205

Phe Asp Tyr Val Trp Val Arg Phe Phe Asp Asp Arg Gln Cys Gln Tyr
210                 215                 220

Asn Ser Val Asn Pro Ser Gly Phe Trp Trp Ser Trp Met Arg Trp Ile
225                 230                 235                 240

Asn Ser Ile Pro Ala Arg Lys Phe Tyr Val Gly Ile Pro Ala Ser Glu
            245                 250                 255

Glu Ala Gly Asp Gly Tyr Val Ala Pro Glu Val Leu Ile Lys Glu Val
            260                 265                 270

Leu Pro Phe Thr Lys Lys Phe Thr Asn Tyr Gly Val Met Leu Phe
            275                 280                 285

Asp Leu Ser Asn Asp Val Gln Thr Asn Tyr Ser Ser Ile Ile Ser Asn
290                 295                 300

Arg Val
305

<210> SEQ ID NO 4
<211> LENGTH: 275
<212> TYPE: PRT
<213> ORGANISM: M. balsamina
<220> FEATURE:
<221> NAME/KEY: MISC_FEATURE
<222> LOCATION: (1)..(275)
<223> OTHER INFORMATION: M. balsamina MOMO30 amino acid sequence for
      mature/secreted protein

<400> SEQUENCE: 4

Gly Gly Ile Ala Thr Tyr Trp Gly Gln Asp Thr Arg Glu Gly Arg Leu
1               5                   10                  15

Thr Ala Ala Cys Ala Thr Gly Lys Phe Gln Ile Ile Asn Ile Gly Phe
            20                  25                  30

Leu Ser Thr Phe Gly Asn Gly Arg Pro Pro Gln Val Asn Leu Thr Arg
            35                  40                  45

His Cys Ser Pro Ile Ser Asn Gly Cys Arg Asn Val Ser Val Gly Val
        50                  55                  60

Leu Asn Cys Arg Asn Asp Gly Val Lys Val Met Leu Ser Ile Gly Gly
65                  70                  75                  80

Pro His Gly Ser Tyr Ser Leu Ser Ala Ala Glu Ala Ile Asp Leu
            85                  90                  95

Ala Asp Tyr Ile Trp Asn Asn Phe Leu Gly Gly Arg Ser Thr Ser Leu
            100                 105                 110

Arg Pro Phe Gly Asp Val Pro Leu Asp Gly Val Asp Phe Arg Ile Glu
        115                 120                 125

Arg Gly Gln Phe Ser His Tyr Tyr Thr Met Val Ala Arg Arg Leu His
    130                 135                 140

Asp Tyr Gly Arg Gln Cys Ser Arg Lys Val Tyr Leu Thr Ala Ala Pro
145                 150                 155                 160

Gly Cys Arg Phe Pro Asp Lys Tyr Leu Thr Glu Leu Leu His Thr Gly
            165                 170                 175

Leu Phe Asp Tyr Val Trp Val Arg Phe Phe Asp Asp Arg Gln Cys Gln
            180                 185                 190

Tyr Asn Ser Val Asn Pro Ser Gly Phe Trp Trp Ser Trp Met Arg Trp
            195                 200                 205

Ile Asn Ser Ile Pro Ala Arg Lys Phe Tyr Val Gly Ile Pro Ala Ser
            210                 215                 220
```

Glu Ala Gly Asp Gly Tyr Val Ala Pro Glu Val Leu Ile Lys Glu
225                 230                 235                 240

Val Leu Pro Phe Thr Lys Lys Phe Thr Asn Tyr Gly Gly Val Met Leu
            245                 250                 255

Phe Asp Leu Ser Asn Asp Val Gln Thr Asn Tyr Ser Ser Ile Ile Ser
        260                 265                 270

Asn Arg Val
        275

<210> SEQ ID NO 5
<211> LENGTH: 921
<212> TYPE: DNA
<213> ORGANISM: M. charantia
<220> FEATURE:
<221> NAME/KEY: MISC_FEATURE
<222> LOCATION: (1)..(921)
<223> OTHER INFORMATION: M. charantia MOMO30 nucleotide coding region
      sequence for preprotein

<400> SEQUENCE: 5
atggaatctc aattttgttc ttcatttcca cgttttcttc tcctcataat tctcgcttct      60
atattgggtt gttattcgga agcaattacc ggcggcggaa ttgccactta ctggggccag     120
aacacgagag agggccggct gaccgccgcc tgcgccaccg gaaaatttca gatcatcaac     180
atagggttcc tctctacatt cggcaacggc cggccgccgc aagtgaacct aacgcgccac     240
tgcagtcccg tctccaacgg ctgccggaat gtgagcgttg gcgtcctcaa ctgccgaaac     300
gatggcgtta aagtcatgct ctccattggt ggccctcacg gaagctactt cctctcctcc     360
gccgccgaag ccgttgacct tgctgactac atctggaaca acttcctcgg cggccactcc     420
acgtcactac gaccgtttgg tgatgtacca ttggacggtg tagatttcag gattgagcga     480
gtcgagttct cccactacta cgccatggtt gctcggcggc tacacgacta tggccggcaa     540
agtaaccgta aagtgtactt aacggcggct ccggggtgcc gttttcccga caaataccta     600
actgaatcgc ttcacactgg acttttcgac tatgtttggg ttagattttt tgacgaccgg     660
caatgccgtt atgattccgt taacccgtcg ggcttttggt ggtcgtggat gcggtggaca     720
cattcaattc cggcgaggaa attttacttg gaattccgg catccgaaga agccggagat      780
gggtacgtgg caccggaggt gctgataaag gaagtgctgc cgtttgttaa gaggttcaca     840
agttatggcg gcgttatgct tttcgacttg tcgaatgatg ttcaaactaa ctacagttct     900
ataattagca tagggtttg a                                                921

<210> SEQ ID NO 6
<211> LENGTH: 306
<212> TYPE: PRT
<213> ORGANISM: M. charantia
<220> FEATURE:
<221> NAME/KEY: MISC_FEATURE
<222> LOCATION: (1)..(306)
<223> OTHER INFORMATION: M. charantia MOMO30 amino acid sequence for
      preprotein

<400> SEQUENCE: 6

Met Glu Ser Gln Phe Cys Ser Ser Phe Pro Arg Phe Leu Leu Leu Ile
1               5                   10                  15

Ile Leu Ala Ser Ile Leu Gly Cys Tyr Ser Glu Ala Ile Thr Gly Gly
            20                  25                  30

Gly Ile Ala Thr Tyr Trp Gly Gln Asn Thr Arg Glu Gly Arg Leu Thr
        35                  40                  45

```
Ala Ala Cys Ala Thr Gly Lys Phe Gln Ile Ile Asn Ile Gly Phe Leu
        50                  55                  60

Ser Thr Phe Gly Asn Gly Arg Pro Pro Gln Val Asn Leu Thr Arg His
65                  70                  75                  80

Cys Ser Pro Val Ser Asn Gly Cys Arg Asn Val Ser Val Gly Val Leu
                85                  90                  95

Asn Cys Arg Asn Asp Gly Val Lys Val Met Leu Ser Ile Gly Gly Pro
            100                 105                 110

His Gly Ser Tyr Phe Leu Ser Ser Ala Ala Glu Ala Val Asp Leu Ala
        115                 120                 125

Asp Tyr Ile Trp Asn Asn Phe Leu Gly Gly His Ser Thr Ser Leu Arg
    130                 135                 140

Pro Phe Gly Asp Val Pro Leu Asp Gly Val Asp Phe Arg Ile Glu Arg
145                 150                 155                 160

Val Glu Phe Ser His Tyr Tyr Ala Met Val Ala Arg Arg Leu His Asp
                165                 170                 175

Tyr Gly Arg Gln Ser Asn Arg Lys Val Tyr Leu Thr Ala Ala Pro Gly
            180                 185                 190

Cys Arg Phe Pro Asp Lys Tyr Leu Thr Glu Ser Leu His Thr Gly Leu
        195                 200                 205

Phe Asp Tyr Val Trp Val Arg Phe Phe Asp Asp Arg Gln Cys Arg Tyr
    210                 215                 220

Asp Ser Val Asn Pro Ser Gly Phe Trp Trp Ser Trp Met Arg Trp Thr
225                 230                 235                 240

His Ser Ile Pro Ala Arg Lys Phe Tyr Leu Gly Ile Pro Ala Ser Glu
                245                 250                 255

Glu Ala Gly Asp Gly Tyr Val Ala Pro Glu Val Leu Ile Lys Glu Val
            260                 265                 270

Leu Pro Phe Val Lys Arg Phe Thr Ser Tyr Gly Gly Val Met Leu Phe
        275                 280                 285

Asp Leu Ser Asn Asp Val Gln Thr Asn Tyr Ser Ser Ile Ile Ser Asn
    290                 295                 300

Arg Val
305

<210> SEQ ID NO 7
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 7

Lys Val Met Leu Ser Leu Gly Gly Leu Asp Gly Ile Asp Phe Asp Ile
1               5                   10                  15

Glu

<210> SEQ ID NO 8
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 8

Lys Val Leu Leu Ser Ile Gly Gly Leu Asp Gly Val Asp Phe Asp Ile
1               5                   10                  15
```

<210> SEQ ID NO 9
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 9

Lys Val Met Leu Ser Leu Gly Gly Leu Asp Gly Ile Asp Phe Asp Ile
1               5                   10                  15

Glu

<210> SEQ ID NO 10
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 10

Lys Val Leu Leu Ser Ile Gly Gly Leu Asp Gly Val Asp Phe Asp Ile
1               5                   10                  15

Glu

<210> SEQ ID NO 11
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 11

Lys Thr Phe Leu Ser Ile Ala Gly Phe His Gly Leu Asp Leu Asp Trp
1               5                   10                  15

Glu

<210> SEQ ID NO 12
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 12

Lys Val Leu Leu Ser Leu Gly Gly Val Asp Gly Phe Asp Phe Asp Ile
1 5 10 15

Glu

<210> SEQ ID NO 13
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 13

Lys Ile Leu Pro Ser Ile Gly Gly Tyr Asp Gly Val Asp Ile Asp Trp
1 5 10 15

Glu

```
<210> SEQ ID NO 14
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 14

Lys Thr Ile Ile Ser Val Gly Gly Phe Asp Gly Val Asp Leu Asp Trp
1 5 10 15

Glu

<210> SEQ ID NO 15
<211> LENGTH: 17
<212> TYPE: PRT
<213> ORGANISM: Artificial Sequence
<220> FEATURE:
<223> OTHER INFORMATION: Synthetic: Hevamine A-like

<400> SEQUENCE: 15

Lys Phe Met Val Ala Val Gly Gly Phe Asp Gly Leu Asp Leu Asp Trp
1 5 10 15

Glu

<210> SEQ ID NO 16
<211> LENGTH: 16
<212> TYPE: PRT
<213> ORGANISM: Artificial Sequence
<220> FEATURE:
<223> OTHER INFORMATION: Synthetic: MOMO30 N-terminal amino acid sequence
<220> FEATURE:
<221> NAME/KEY: misc_feature
<222> LOCATION: (12)..(12)
<223> OTHER INFORMATION: Xaa can be any naturally occurring amino acid

<400> SEQUENCE: 16

Gly Pro Ile Val Thr Tyr Trp Gly Gln Asn Val Xaa Glu Gly Glu Leu
1 5 10 15

<210> SEQ ID NO 17
<211> LENGTH: 861
<212> TYPE: DNA
<213> ORGANISM: M. charantia
<220> FEATURE:
<221> NAME/KEY: misc_feature
<222> LOCATION: (1)..(861)
<223> OTHER INFORMATION: M. charantia MAP30 nucleotide coding region sequence for preprotein
<400> SEQUENCE: 17
atggtggtat gcttactact ttcttttttta attatcgcca tcttcattgg tgttcctact 60
gccaaaggcg atgttaactt cgatttgtcg actgccactg caaaaaccta cacaaaattt 120
atcgaagatt tcagggcgac tcttccattt agccataaag tgtatgatat acctctactg 180
tattccacta tttccgactc cagacgtttc atactcctca atctcacaag ttatgcatat 240
gaaaccatct cggtggccat agatgtgacg aacgtttatg ttgtggccta tcgcacccgc 300
gatgtatcct actttttttaa agaatctcct cctgaagctt ataacatcct attcaaaggt 360
acgcggaaaa ttacactgcc atataccggt aattatgaaa atcttcaaac tgctgcacac 420
aaaataagag agaatattga tcttggactc cctgccttga gtagtgccat taccacattg 480
ttttattaca atgcccaatc tgctccttct gcattgcttg tactaatcca gacgactgca 540
gaagctgcaa gatttaagta tatcgagcga cacgttgcta agtatgttgc cactaacttt 600

```
aagccaaatc tagccatcat aagcttggaa aatcaatggt ctgctctctc caaacaaata    660
tttttggcgc agaatcaagg aggaaaattt agaaatcctg tcgaccttat aaaacctacc    720
ggggaacggt ttcaagtaac caatgttgat tcagatgttg taaaaggtaa tatcaaactc    780
ctgctgaact ccagagctag cactgctgat gaaaacttta tcacaaccat gactctactt    840
ggggaatctg ttgtgaattg a                                              861
```

HEVAMINE-RELATED PLANT COMPOSITIONS AND METHODS

This application claims priority to U.S. Provisional Patent Application Ser. No. 63/208,698, filed on Jun. 9, 2021, the contents of which are expressly incorporated by reference herein.

FIELD

The present application generally relates to antimicrobial compositions and methods. More particularly, the present application relates to antimicrobial compositions comprising a hevamine A-related MoMo30 plant protein for treatment and prevention of viral inventions.

BACKGROUND

The surfaces of host cells and viruses are decorated by complex glycans, which play multifaceted roles in the dynamic interplay between the virus and the host including viral entry into host cell, modulation of proteolytic cleavage of viral proteins, recognition, and neutralization of virus by host immune system (Raman, R. et al., Curr. Opin. Struct. Biol., 40: 153-162, 2016). These roles are mediated by specific multivalent interactions between cell surfaces decorated by complex glycans and their cognate protein lectins.

Lectin proteins are sugar-binding proteins that bind specifically and reversibly to carbohydrate groups. They are typically anchored on the surfaces of cells and are found in all groups of living organisms including plants, animals, fungi, and bacteria, as well as viruses and mycoplasmas. Depending on their broad sugar-binding specificity, they have been classified as mannose-, galactose-, N-acetylglucosamine-, fucose- and sialic acid-binding lectins, according to the simple sugars that inhibit their carbohydrate-binding properties.

The complex glycans displayed on host cell surfaces typically act as attachment factors, co-receptors or primary receptors that are specifically recognized by viral surface glycoprotein similarly decorated by a variety of glycans. For example, complex glycans terminated by α2-3 or α2-6-linked sialic acid (N-acetyl neuraminic acid) act as receptors for several different viruses. Linear sulfated glycosaminoglycans such as heparan sulfate act as co-receptors for a variety of viruses, including dengue virus, hepatitis C virus, and foot-and-mouth disease virus. The display of specific glycan motifs on surfaces of different cells and tissues contributes to the host restriction and cell/tissue tropism of viruses.

The complex glycans on the microbial cell surfaces also play a key role in host immune response to counter infections and play a dual role to enhance antigen presentation and processing for adaptive immune responses. In particular, sites of N-linked glycosylation are often positively selected during evolution of microorganisms in human hosts to increase glycans on their cell surfaces so as to present glycans that mimic self-antigens and mask the underlying protein epitope which in turn permits the virus to evade host immune response.

A wide variety of lectins from animals, plants, algae, cyanobacteria, and other sources have been shown to possess antiviral activity against a wide variety of viruses, including coronaviruses, human immunodeficiency viruses (HIVs), influenza viruses, herpes simplex viruses, Ebola viruses, and others. See e.g., Mani et al., Virus Res., Apr. 30, 2020, pp. 197989; Akkouh et al., Molecules, 20:648-668, 2015). For example, mannose binding lectin (MBL), a serum protein in humans important in host defenses has been shown to selectively bind to the SARS CoV Spike (S) protein in a SARS-CoV pseudotyped virus and potently inhibit SARS-CoV infection of susceptible cell lines at concentrations below those observed in the serum of healthy individuals (Zhou, Y et al., J Virol., 84(17): 8753-8764, 2010). Mutagenesis indicated that a single N-linked glycosylation site, N330, was critical for the specific interactions between MBL and SARS-S. Id. Exemplary lectins with broad spectrum antiviral activity against multiple viruses include Concanavalin A from jack bean, Griffithsin from red algae, and Cyanovirin-N from cyanobacteria.

In view of the wide range of microorganisms containing various glycans on their cell surface, there is a need to identify potential broad spectrum antimicrobial agents having properties characteristic of lectins for binding and neutralizing microorganisms in microbial infections. The present application address this need and provides a plant-derived broad spectrum antimicrobial protein named MoMo30.

SUMMARY

In one aspect, the present application relates to a composition comprising an isolated/purified MoMo30 protein containing composition comprising an amino acid sequence at least 95% identical to SEQ ID NO: 3 or SEQ ID NO: 4. In a particular embodiment, the MoMo30 protein comprises the amino acid sequence of SEQ ID NO: 3 or SEQ ID NO: 4. In some embodiments, the MoMo30 protein is derived from plant member of the *Momordica* genus, such as *Momordica balsamina*.

In some embodiments, the composition is in a dried form, such as a capsule or tablet. In other embodiments, the composition is in a liquid form, such as an herbal tea.

In some embodiments, the composition is a pharmaceutical composition comprising at least one pharmaceutically acceptable carrier.

In some embodiments, the composition comprises a second active agent. In certain particular embodiments, the second active agent targets a virus, bacterium, or fungus. In a particular embodiment, the virus is HIV or SARS-CoV-2.

In another aspect, the present application relates to a composition comprising a MoMo30-related nucleic acid encoding or operatively linked to a nucleotide sequence comprising at least 95% identity to SEQ ID NO: 1 or SEQ ID NO: 2. In a particular embodiment, the nucleic acid comprises the nucleotide sequence of SEQ ID NO: 1 or SEQ ID NO: 2. In certain embodiments, the MoMo30-related nucleotide sequence is derived from plant member of the *Momordica* genus, such as *Momordica balsamina*.

In another embodiment, the present application provides a cell transformed by a plasmid or expression vector comprising a nucleotide sequence that is at least 95% identical to SEQ ID NO: 1 or SEQ ID NO: 2.

In another aspect, a method for preventing or reducing symptoms of an infection, comprises orally administering to a subject in need thereof an effective amount of a MoMo30-protein containing composition, where the infection is caused by a virus, bacterium, or fungus. In certain preferred embodiments, the infection is caused by HIV, SARS-CoV-2, or an influenza Type 1 virus. In particular embodiments, the MoMo30 protein containing composition is dried and administered in the form of a capsule, tablet, or herbal tea.

In another aspect, a method for preventing or reducing symptoms of an infection comprises administering to a subject in need thereof, an expression vector operatively linked to a nucleic acid comprising a nucleotide sequence that is at least 95% or 100% identical to SEQ ID NO: 1 or SEQ ID NO: 2.

In another aspect, a method for preparing the MoMo30 protein composition of the present application includes the steps of: (a) drying a plant comprising an MoMo30 protein; (b) extracting the dried plant in aqueous media; (c) separating the aqueous media from solid material to form an aqueous extract; and (d1) passing the aqueous extract through a molecular weight cut-off filter and collecting a retentate comprising the protein, or (d2) purifying the protein from the aqueous extract by immunoaffinity purification using an antibody directed against the protein. The prepared MoMo30 composition is substantially free of plant components less than 10 kDa in size and is stable after boiling at 100° C. for 20 min.

BRIEF DESCRIPTION OF THE DRAWINGS

In FIG. 4B, HIV-1$_{NL43}$ in an amount comprising 1 ng p24 was incubated with MoMo30 at concentrations of 1 nm (bottom curve) and 5 nm (top curve) sufficient to cause 50% or 70% inhibition, respectively. MoMo30 was pre-treated for 30 min at temperatures from 15 to 120° C. prior to mixing.

FIG. 6 shows a Clustal Omega alignment of DNA sequences from *M. balsamina* MoMo30, the Hevamine A-like protein from *M. charantia*, and the MAP30 protein from *M. charantia*. Residues that are different are shaded. MoMo30 is 92% identical to the *M. charantia* hevamine A-like gene coding region and 26% identical to the *M. charantia* MAP30 protein.

FIG. 8 shows an alignment of two conserved regions from the MoMo30 protein against other hevamine A-related proteins.

FIG. 13A shows MoMo30 binding to purified gp120. In FIG. 13B, Gp120 pre-treated with PNGase F (an N-linked glycosylase) dramatically reduces binding. The three lines represent triplicate measurements.

FIG. 14A shows that mannose blocks the activity of MoMo30. HIV-1$_{NL4-3}$, 400 ng of MoMo30 and different concentrations of D-mannose were incubated for 5 min at 37° C. and tested by a MAGI cell assay for inhibition of infection. Jurkat cells (1×10$^7$) were infected with 300 ng of HIV-1$_{NL4-3}$ with or without 20 mg of MoMo30.

FIG. 21B shows an increase in CD4+ lymphocytes following treatment with the MoMo30 plant extract.

In FIG. 22, panel C, a subset of the originally treated patients (n=13) were re-tested at 180 months. The results of this analysis showed that CD4 counts in most of the re-tested patients returned to near baseline levels. In addition, viral loads in ten of these re-tested patients had decreased to undetectable (<20 copies/ml); two patients had very low levels (~3000 copies/ml) and one was reported as (20 copies/ml) at 180 months post-treatment.

FIG. 23, panels A and B show the results of patients' serum being tested for neutralizing activity against HIV-1 pseudotyped with an HIV-1$_{NL4-3}$ env or an aMLV env, respectively. FIG. 23, panel C shows a table depicting examples of antibody titers against 10 primary strains and 3 lab strains of HIV-1. The table summarizes reciprocal dilutions of the inhibitory dose to induce 50% reduction in replication of virus (ID 50). Darker shaded areas depict higher titers, while the lighter shaded areas depict lower titers.

Figure 1:
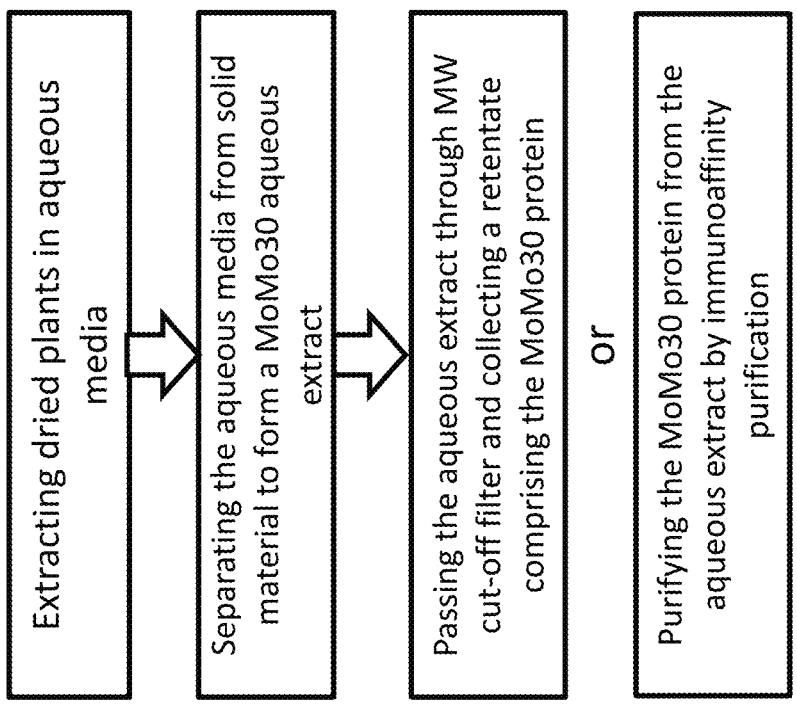
FIG. 1 shows an exemplary process for producing an aqueous plant extract from dried *Momordica balsamina* leaves.

While the present disclosure will now be described in detail, and it is done so in connection with the illustrative embodiments, it is not limited by the particular embodiments illustrated in the figures and the appended claims.

DETAILED DESCRIPTION OF THE INVENTION

The invention and accompanying drawings will now be discussed in reference to the numerals provided therein to enable one skilled in the art to practice the present invention. The skilled artisan will understand, however, that the inventions described below can be practiced without employing these specific details, or that they can be used for purposes other than those described herein. Indeed, they can be modified and can be used in conjunction with products and techniques known to those of skill in the art considering the present disclosure. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

It will be appreciated that reference throughout this specification to aspects, features, advantages, or similar language does not imply that all the aspects and advantages may be realized with the present invention should be or are in any single embodiment of the invention. Rather, language referring to the aspects and advantages is understood to mean that a specific aspect, feature, advantage, or characteristic described in connection with an embodiment is included in at least one embodiment of the present invention. Thus, discussion of the aspects and advantages, and similar language, throughout this specification may, but do not necessarily, refer to the same embodiment.

The described aspects, features, advantages, and characteristics of the invention may be combined in any suitable manner in one or more further embodiments. Furthermore, one skilled in the relevant art will recognize that the invention may be practiced without one or more of the specific aspects or advantages of a particular embodiment. In other instances, additional aspects, features, and advantages may be recognized and claimed in certain embodiments that may not be present in all embodiments of the invention.

Unless otherwise defined, all technical and scientific terms used herein have the same meaning as commonly understood by one of ordinary skill in the art to which this application belongs. One of skill in the art will recognize many techniques and materials similar or equivalent to those described here, which could be used in the practice of the aspects and embodiments of the present application. The described aspects and embodiments of the application are not limited to the methods and materials described.

As used in this specification and the appended claims, the singular forms "a," "an" and "the" include plural referents unless the content clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to "the value," greater than or equal to the value" and possible ranges between values are also disclosed, as appropriately understood by the skilled artisan. For example, if the value "10" is disclosed the "less than or equal to 10" as well as "greater than or equal to 10" is also disclosed.

As used herein, the term "MoMo30 protein" is used with reference to e.g., a 30 kDa protein comprising an amino acid sequence at least 95% identical to SEQ ID NO: 3 or SEQ ID NO: 4. In certain embodiments, the MoMo30 protein is obtained from a plant of the *Momordica* genus or a species therefrom, such as *Momordica balsamina* and others described herein, or any plant comprising a homolog thereof.

As used herein, the term "MoMo30 homolog" refers to a MoMo30-related protein that is at least 90%, at least 91%, at least 92%, at least 93%, at least 94%, at least 95%, at least 96%, at least 97%, at least 98%, at least 99%, or 100% identical to the amino acid sequence of the *Momordica balsamina* MoMo30 protein set forth in SEQ ID NO: 3 or SEQ ID NO: 4.

As used herein, the term "preprotein" is used with reference to a predicted amino acid sequence including an N-terminal signal peptide, which is cleaved off during protein processing resulting in a secreted biologically active mature protein as described herein.

The phrase "antimicrobial agent" or "antimicrobial product" or "antimicrobial protein" are used interchangeably with reference to protein or small molecule compound that can inhibit the progression of a microbial infection, including those caused by viruses, bacteria, fungi and protozoa, or induce or mediate the death (e.g., necrosis or apoptosis) of infected cells in a subject (e.g., a human).

The terms "treat" and "treatment" refer to the amelioration of one or more symptoms associated with a coronavirus infection; prevention or delay of the onset of one or more symptoms of a viral infection; and/or lessening of the severity or frequency of one or more symptoms of the infection.

The phrases "effective amount" "therapeutically effective," and "pharmacologically effective amount" are used interchangeably with reference to the amount(s) of one or more antimicrobial agents needed to provide a threshold level of active antagonist agents in the bloodstream or in the target tissue. The precise amount will depend upon numerous factors, e.g., the particular active agent, the components and physical characteristics of the composition, intended patient population, patient considerations, and the like, and can readily be determined by one skilled in the art, including based upon the information provided herein or otherwise available in the relevant literature.

The phrases "pharmaceutical composition comprises" and "pharmaceutical composition comprising" should be interpreted such that the "comprises" or "comprising" components are included in a single pharmaceutical composition or in one or more independent pharmaceutical compositions.

The terms "codon optimized" and "codon optimization" refer to a process for modifying a nucleic acid sequence according to one or more of the following: (1) to match codon frequencies in a host organism target; (2) to promote increased expression; (3) to ensure proper folding; (4) to provide a GC content suitable for increasing mRNA stability or reducing secondary structures; (5) to minimize tandem repeat codons or base runs that may impair gene construction or expression; (6) to customize transcriptional and translational control regions; (7) to insert or remove protein trafficking sequences; (8) to remove/add post translation modification sites in an encoded protein (e.g. glycosylation sites); (9) to add, remove or shuffle protein domains; (10) to insert or delete restriction sites; (11) modify ribosome binding sites and mRNA degradation sites; (12) to adjust translational rates to allow the various domains of the protein to fold properly; or (13) to reduce or eliminate problem secondary structures within the polynucleotide. Codon optimization tools, algorithms and services are known in the art-non-limiting examples include services from GeneArt (Life Technologies), DNA2.0 (Menlo Park Calif.) and/or proprietary methods.

The terms, "improve", "increase" or "reduce", as used in this context, indicate values or parameters relative to a baseline measurement, such as a measurement in the same individual prior to initiation of the treatment described herein, or a measurement in a control individual (or multiple control individuals) in the absence of the treatment described herein.

The term "control individual" is an individual who is not afflicted with the same viral infection as the individual being treated, who is about the same age as the individual being treated (to ensure that the stages of the disease in the treated individual and the control individual(s) are comparable).

The individual (also referred to as "patient" or "subject") being treated may be a fetus, infant, child, adolescent, or adult human.

Further, it should be understood that any reference to "HIV" or "HIV-1" should be construed as applying to any isolate or clade of HIV-1 or HIV-2.

MoMo30 Compositions of the Present Application

One aspect of the application is directed to a composition comprising a MoMo30 protein of the present application comprising an amino acid sequence that is at least 95%, identical to SEQ ID NO: 3 or SEQ ID NO: 4, or an MoMo30 protein encoded by a nucleic acid that is at least 95% identical to SEQ ID NO: 1 or SEQ ID NO: 2. In some embodiments, the MoMo30 protein is a 30 kDa plant protein, binds HIV gp120, is stable after boiling at 100° C. for 20 min or autoclaving at 120° C. for 30 min, and has a binding property that is sensitive to mannose. In certain embodiments, the MoMo30 protein is obtained from a plant of the Momordica genus or a species therefrom, such as Momordica balsamina and others described herein, or any plant comprising a homolog thereof.

The MoMo30 product from Momordica balsamina is characterized by multiple properties, including: (1) an amino acid sequence of SEQ ID NO: 3 or SEQ ID NO: 4; (2) a size of about 30 kDa; (3) soluble in aqueous solutions; (4) high heat resistance or high stability as reflected in no appreciable loss of activity following autoclaving at 120° C. for 30 min; (5) mannose-sensitive binding to HIV gp120; (6) insensitive to digestion with trypsin following denaturation in 8M urea and overnight treatment and partially sensitive to subtilisin after overnight treatment; (7) an IC50 of about 32 pM in a MAGI cell indicator assay; (8) hemagglutinin activity; (9) capable of activating and stimulating T cell proliferation; (10) having chitinase activity; and (11) capable of preventing infection by HIV-1 or alleviating symptoms in an HIV-1 infected patient.

Without wishing to be bound by theory, MoMo30 is believed to be a carbohydrate binding agent with two distinct modes of action: (1) inhibition of virus by blocking entry into cells; (2) selecting for mutations in the viral envelope that allow the host to produce a broadly neutralizing antibody response. MoMo30 inhibits virus through binding carbohydrates. The more carbohydrates on the gp120, the more targets will be available for inhibiting virus. Under such pressure, the presence of the MoMo30 selects for virus with fewer glycosyl groups. Fewer glycosyl groups on gp120 allow more epitopes to be exposed and allows the production of neutralizing antibodies. Consequently, patients treated with MoMo30 in the short-term exhibit the production of a broadly neutralizing antibody response. The same patients should also develop a broadly neutralizing antibody response to control their infection in the long term.

In some embodiments, the MoMo30 protein (or homolog thereof) is encoded by a plant species of the Momordica genus. Exemplary Momordica species include, but are not limited to, M. aculeata, M acuminate, M. acutangula, M. adoensis, M affinis, M amaniana, M. angolensis, M angulate, M. angustisepala, M anigosantha, M anthelmintica, M. argillicola, M. aspera, M auriculata, M. balsamina, M. bequaertii, M bicolor, M boivinii, M. brachybotrys, M. bracteata, M. brevispinosa, M bricchettii, M cabraei, M. calantha, M calcarata, M. camerounensis, M. cardiospermoides, M. carinata, M casea, M charantia, M. chinensis, M cirrhiflora, M. cissoides, M. clarkeana, M clematidea, M cochinchinensis, M cochinchinensis, M. cogniauxiana, M. cordata, M cordatifolia, M coriacea, M corymbifera, M. covel, M. crinocarpa, M cucullata, M cylindrica, M cymbalaria, M dasycarpa, M. denticulata, M. denudata, M dictyosperma, M dioica, M. diplotrimera, M dissecta, M. eberhardtii, M echinata, M echinocarpa, M ecirrhata, M. elastica, M. elaterium, M. elegans, M. enneaphylla, M. erinocarpa, M. fasciculata, M foetida, M. friesiorum, M. gabonii, M garipensis, M garriepensis, M gilgiana, M. glabra, M. glauca, M. gracilis, M grandibracteata, M. grosvenorii, M. guttata, M hamiltoniana, M. hamiltoniana, M henriquesii, M heterophylla, M heyneana, M hispida, M. huberi, M. humilis, M. hystrix, M indica, M. involucrata, M jagorana, M. jeffreyana, M kirkii, M. lambertiana, M. lanata, M laotica, M. laurentii, M. leiocarpa, M. littorea, M. luffa, M luffa, M macrantha, M macropetala, M macrophylla, M. macropoda, M. macrosperma, M. maculata, M mannii, M. marlothii, M. martinicensis, M. meloniflora, M. microphylla, M. missionis, M. mixta, M monadelpha, M morkorra, M mossambica, M multicrenulata, M. multiflora, M. muricata, M. obtusisepala, M officinarum, M operculata, M ovata, M paina, M. palmata E, M. papillosa, M. parvifolia, M. pauciflora, M pedata, M. pedisecta, M. peteri, M procera, M pterocarpa, M punctata, M. purgans, M pycnantha, M. quinquefida, M quinqueloba, M. racemiflora, M racemosa, M renigera, M. repens, M reticulata, M. rostrata, M. rotunda, M. roxburghiana, M. rumphii, M. runssorica, M rutshuruensis, M. sahyadrica, M sativa, M schimperiana, M schinzii, M. schliebenii, M. senegalensis, M. sessilfolia, M. sicyoides, M silvatica, M. sinensis, M. somalensis, M. sphaeroidea, M spicata, M. spinosa, M stefaninii, M subangulata, M surculata, M. suringarii, M. thollonii, M. tonkinensis, M trifolia, M trifoliata, M trilobata, M tuberosa, M. tubiflora, M. tubulosa, M. umbellata, M verticillata, M vogelii, M wallichii, M welwitschii, M. wildemaniana, M. zeylanica, and M. zeylanica. In some embodiments, the MoMo30 protein may be obtained from any of the foregoing Momordica leaf extracts, fruit extracts, root extracts, bark extracts, seed extracts and/or any flower thereof.

In preferred embodiments, the MoMo30 protein is obtained from Momordica balsamina leaf extracts. In other embodiments, the MoMo30 protein is obtained from Momordica balsamina fruit extracts, root extracts, bark extracts, seed extracts and/or any flower thereof. In yet other embodiments, the MoMo30 protein is prepared from cells transformed with an expression vector encoding M. balsamina MoMo30 or any other MoMo30 plant source.

In some embodiments, the MoMo30 protein (or homolog thereof) is encoded by a plant species of the Prosopis genus. Exemplary Prosopis species include, but are not limited to, P. abbreviata, P. affinis, P. african, P. alba, P. chilensis, P. cineraria, P. farcta, P. fiebrigii, P. flexuosa, P. glandulosa, P. hassleri, P. juliflora, P. laevigata, P. koelziana, P. kuntzei, P. nigra, P. pallida, P. pubescens, P. reptans, P. rojasiana, P. ruscifolia, P. spicigera, P. strombu/fera, P. tamarugo, and P. velutina. In some embodiments, the MoMo30 protein may be obtained from any of the foregoing Prosopis leaf extracts, fruit extracts, root extracts, bark extracts, seed extracts and/or any flower thereof.

In some embodiments, the MoMo30 protein is a variant containing one or more mutations relative to the wild-type sequence. "Variants" include protein sequences having one or more amino acid additions, deletions, stop positions, or substitutions, as compared to a wild-type protein. An amino acid substitution can be a conservative or a non-conservative substitution. Variants of MoMo30 proteins can include those having one or more conservative amino acid substitutions. A "conservative substitution" or "conservative amino acid substitution" involves a substitution found in one of the following conservative substitutions groups: Group 1: Alanine (Ala; A), Glycine (Gly; G), Serine (Ser; S), Threonine (Thr; T); Group 2: Aspartic acid (Asp; D), Glutamic acid (Glu; E); Group 3: Asparagine (Asn; N), Glutamine (Gln; Q); Group 4: Arginine (Arg; R), Lysine (Lys; K), Histidine (His; H); Group 5: Isoleucine (Ile; I), Leucine (Leu; L), Methionine (Met; M), Valine (Val; V); and Group 6: Phenylalanine (Phe; F), Tyrosine (Tyr; Y), Tryptophan (Trp; W).

Additionally, amino acids can be grouped into conservative substitution groups by similar function, chemical structure, or composition (e.g., acidic, basic, aliphatic, aromatic, or sulfur-containing). For example, an aliphatic grouping may include, for purposes of substitution, G, A, V, L, and I. Other groups including amino acids that are considered conservative substitutions for one another include: sulfur-containing: M and C; acidic: D, E, N, and Q; small aliphatic, nonpolar or slightly polar residues: A, S, T, P, and G; polar, negatively charged residues and their amides: D, N, E, and Q; polar, positively charged residues: H, R, and K; large aliphatic, nonpolar residues: M, L, I, V, and C; and large aromatic residues: F, Y, and W.

Non-conservative substitutions include those that affect the structure of the peptide backbone in the area of alteration (e.g., the alpha-helical or beta-sheet structure); the charge or hydrophobicity of the molecule at the target site; or the bulk of the side chain. Non-conservative substitutions which in general are expected to produce the greatest changes in a protein's properties may include those in which e.g., (i) a hydrophilic residue (e.g., S or T) is substituted for (or by) a hydrophobic residue (e.g. L, I, F, V, or A); (ii) a C or P is substituted for (or by) any other residue; (iii) a residue having an electropositive side chain (e.g. K, R, or H) is substituted for (or by) an electronegative residue (e.g., Q or D); or (iv) a residue having a bulky side chain (e.g., F) that is substituted for (or by) one not having a bulky side chain, (e.g., G).

MoMo30 mutants may be generated by random mutagenesis or site-directed mutagenesis using methods known to those of ordinary skill in the art with or without selection methodologies employing MAGI indicator cell assays, apoptosis assays and the like.

In one embodiment, the MoMo30 protein or MoMo30 homolog comprises an amino acid sequence that is at least 90%, at least 91%, at least 92%, at least 93%, at least 94%, at least 95%, at least 96%, at least 97%, at least 98%, at least 99%, or 100% identical to the amino acid sequence of SEQ ID NO: 3 or SEQ ID NO: 4 and contains at least one amino acid substitution relative SEQ ID NO:3 or SEQ ID NO: 4, respectively.

In some embodiments, the present application provides a nucleic acid encoding a MoMo30 protein of the present application. In some embodiments, the MoMo30 encoded nucleic acid is at least 95% identical to a *Momordica balsamina* MoMo30 cDNA, including cDNAs comprising the nucleotide sequence of SEQ ID NO: 1 or SEQ ID NO: 2. In some embodiments, the nucleotide sequence comprises at least nucleotide substation relative the nucleotide sequence of SEQ ID NO: 1 or SEQ ID NO: 2. In some embodiments, the MoMo30-encoded nucleic acid includes a codon-optimized nucleic acid coding region.

In some embodiments, a MoMo30-encoded polynucleotide of the present application contains a codon-optimized nucleic acid coding region. In certain embodiments, the nucleic acid is codon optimized for expression in humans. In certain embodiments, codon-optimized polynucleotides for use according to the present application are prepared by replacing the codons of SEQ ID NO: 1 or SEQ ID NO: 2 with e.g., "humanized" codons, i.e. codons that appear frequently in highly expressed human genes. Codon optimization methods are known in the art and may be used as provided herein. In some embodiments, the open reading frame (ORF) sequence in a polynucleotide is optimized using optimization algorithms as described herein and known in the art.

In some embodiments, the codon optimized MoMo30 polynucleotide sequence shares less than 95%, less than 90%, less than 85%, less than 80%, less than 75%, less than 70%, less than 65%, less than 60%, less than 55% or less than 50% sequence identity to SEQ ID NO: 1 or SEQ ID NO: 2.

In some embodiments, the codon optimized polynucleotide sequence shares between 50% and 95%, between 50% and 90%, between 50% and 85%, between 50% and 80%, between 50% and 75%, between 50% and 70%, between 50% and 65%, between 50% and 60%, between 50% and 55%, between 55% and 95%, between 55% and 90%, between 55% and 85%, between 55% and 80%, between 55% and 75%, between 55% and 70%, between 55% and 65%, between 55% and 60%, between 60% and 95%, between 60% and 90%, between 60% and 85%, between 60% and 80%, between 60% and 75%, between 60% and 70%, between 60% and 65%, between 65% and 95%, between 65% and 90%, between 65% and 85%, between 65% and 80%, between 65% and 75%, between 65% and 70%, between 70% and 95%, between 70% and 90%, between 70% and 85%, between 70% and 80%, between 70% and 75%, between 75% and 95%, between 75% and 90%, between 75% and 85%, between 75% and 80%, between 80% and 95%, between 80% and 90%, between 80% and 85%, between 85% and 95%, between 85% and 90%, or between 90% and 95% sequence identity to SEQ ID NO: 1 or SEQ ID NO: 2.

In some embodiments, the present application provides an expression vector comprising a MoMo30-encoded nucleic acid or codon-optimized nucleic acid therefrom.

In some embodiments, the present application provides an expression vector encoding a MoMo30 protein containing at least one amino acid substitution relative SEQ ID NO:3 or SEQ ID NO: 4.

In other embodiments, the present application provides a host cell transformed with a MoMo30-encoded nucleic acid or an MoMo30-encoded expression vector.

In another aspect, the present application provides an extract comprising a MoMo30 protein. The extract may be prepared for oral administration or parenteral administration (e.g., intravenous (IV), intramuscular (IM), subcutaneous (SC or SQ), transdermal (TD)). The extract may be in dried form, or it may be in aqueous solution, with or without one or more pharmaceutically acceptable carriers. In one embodiment, the extract is an herbal extract from a natural plant source, such as *M. balsamina*. In another embodiment, the extract is a cell extract from bacterial, fungal, plant, insect, or animal cells transformed with a MoMo30 expression vector to express the protein. The transformed cells may be stably transformed, or they may be transiently transformed. The extract may be prepared, and its composition may be modified in accordance with any of the methods of preparation outlined below or known to those of ordinary skill in the art.

In some embodiments, the MoMo30 protein or MoMo30-containing extract may be combined with one or more nutritional supplements selected from the group consisting of minerals and metals, vitamins, salts, amino acids, fatty acids, proteins, and other pharmaceutically acceptable excipients. The nutritional supplement may be included with the MoMo30 protein or MoMo30-containing extract as in a MoMo30 formulation, or it may be separately administered therewith. Exemplary supplements include vitamin A, vitamin B1, vitamin B2, vitamin B5, vitamin B6, vitamin B12, vitamin C, magnesium citrate, vitamin E, vitamin D3, calcium, zinc citrate, selenium, manganese gluconate, copper gluconate, copper gluconate, Coenzyme Q, biotin, folate, acetyl-L-carnitine, chromium polynicotinate, citrus bioflavinoids, glucosamine sulfate, boron sulfate, and whey protein. Exemplary fatty acids may be selected from the group consisting of linoleic acid (LA), gamma linoleic acid (GLA), eicosapentaneoic acid (EPA), docosapentaneoic Acid (DPA), docosahexaenoic acid (DHA), and D-alpha-tocopherol.

Alternatively, or in addition, in some embodiments, the MoMo30 protein or MoMo30-containing extract may be combined with one or more MoMo30 homologs, plant extracts and/or or plant substances to form a MoMo30 combination formulation. Exemplary plant extracts or MoMo30 homologs in such combination formulations may be obtained from one or more members selected from the group consisting of *Acacia arabia, Afromomum melegueta, Agrimonia eupatoria, Ajuga decumbens, Allium cepa, Allium sativum, Aloe vera, Alternanthera philoxeroides* or *sessiles, Ammi maius, Andographis paniculata, Apium graveolens, Apium leptophyllum, Arachis hypogaea, Arctium lappa, Artemesia Judaica, Amebia euhcroma, Asparagus racemosus, Astragalus spinosus, Astragalus lentingosis swainsonine, Azadirachta indica, Balanites aegyptiaca, Bauhinia rufescens, Bersama tysoniana, Blumea alata, Brucea antidysenterica, Buchenavia capita, Butyrospermum parkii, Bryonia cretica* ssp. *Dioica, Bryonia angustifolia, Calotropis procera, Camellia theifera, Camellia sinensis, Casia sieberiana, Catha edulis. Cedrela toona, Chrysanthemum morifolium, Clausena anisata, Clivia miniata, Cochlospermum planchonii, Coffea arabica, Cola nitida, Combretum glutinosum, Combretum micranthum, Coptis chinesis, Coptis teetoides, Coptis japonica, Coraria nepalensis, Coriandrum sativum, Cryptolepis sanguinolenta, Curcuma longa, Cyperus articulatus, Cyperus domestus, Cyperus rigidifolius, Datura metel syn alba, Daucus carota, Diospyros mespiliformis, Echinacea angustiflora* and *purpurea, Echinacea simulata, Echinacea pallida, Entada abyssinica, Epimedium grandiflorum, Epimedium sagittatum, Epimedium sinense, Epilobium angustifolium, Erigeron Canadensis, Eugenia* or *Syzigium claviflorum, Euphorbia hirta, Faidherbia albida, Fagara xanthox, Ficus iteophylla, Ficus platphylla, Foeniculum vulgarel, Garcinia afzelii, Garcinia epundata, Gardenia coronaria, Gaultheria trichophylla, Glycine max, Glycyrrhiza labra, Gossypium herbaceum, Guiera senegalensis, Heracleum sphondylium, Hypericum perforatum, Hypericum japonicum, Hyssopus officinalis, Jasminum officinale, Khaya senegalensis, Lippia javanica, Lithospermum erythrorhizon, Lonicera japonica, Lophira lanceolate, Luffa, Lycopus europaeus, Magnolia officinalis, Mallotus repandus, Mallotus philippinesis, Matricaria chamomil, Matricaria recutitia, Melissa parviflora, Melissa officinalis, Momordica* species, *including Momordica balsamina, Momordica charantia* and *others; Morinda lucida, Narcissus tazetta, Narcissus pseudonarcissus, Ocimum gratissimum, Oenthera rosea, Paeonia spec., Papaver somniferum, Parkia biglobosa, Perillafrutescens, Persea Americana, Phyllanthus niruri, Pinus koraicenis, Pinus parviflora, Piper nirgum, Plumeria rubra, Polyantha suberosa, Prosopis* sp., *including P. africana* and *others; Prunus africans, Prunella vulgaris, Prunus bakariensis, Prunus amygdalus, Psoralea corylfolia, Randia dunatorum, Raphanus sativus, Rheum palmatum, Rhus coriaria, Rhus chinesis, Ricinus communis, Rosmarinus officinalis, Salic mucronata, Salvia miltiorhiza* and *officinalis, Salvadora persica, Sambucus ebulus, Saussurea lappa, Scilla griffithii, Scutellaria baicalensis baiealein, Sedum sediforme, Senecio scandens, Senecio aereus, Senna alata, Silybum marianum, Skimmia laureola, Solarium niporum, Swertia franchetiana, Tamarindus indica, Terminalia alata, Terminalia catappa, Terminalia chebula, Terminalia glaucescens, Thula occidentalis, Trapalaponica spec., Trichosanthes dioica, Trichosanthes kirilowii, Urtica dioica, Viola yeodensis, Vitellaria paradoxa, Voacanga africana, Woodfordia fruticosa, Woodwardia spec., Zanoxylum nitidum, Zanthoxylum zanthoxyloides*, and *Ziziphus mauritania*, including powder or extract from leaf, bark, seed, root, and/or flower therefrom.

In one embodiment, the MoMo30 combination formulation includes one or more plant extracts selected from the group consisting of *Momordica balsamina, Aframomum melegueta, Cyperus domestus, Ficus iteophylla* and *Tamarindus indica*. In another embodiment, the MoMo30 combination formulation includes one or more plant extracts selected from the group consisting of *Momordica balsamina, Aframomum melegueta, Cyperus articulatus, Ficus iteophylla* and *Tamarindus indica*. In another embodiment, the MoMo30 combination formulation includes one more plant extracts selected from the group consisting of *Momordica balsamina, Aframomum melegueta* and *Cyperus articulatus*. In a more particular embodiment, the MoMo30 combination formulation includes a leaf extract from *Momordica balsamina*, a seed extract from *Aframomum melegueta* and/or a root extract from *Cyperus articulatus*.

Exemplary plant-derived substances include lentinan, a polysaccharide isolated from the fruit body of shiitake mushroom (*Lentinula edodes* mycelium) and various ribosome inactivating proteins (RIPs) from *M. balsamina* and *Trichosanthis kirilowii*, such as Momordin I and Momordin II, as well as ribosome inactivating proteins from any of the foregoing plant extracts. It is believed that the addition of the aforementioned nutritional supplements and/or plant-based substances may further increase the prophylactic and/or therapeutic efficacy of the MoMo30 protein, especially in patients with HIV or any of the other viral infections described herein below.

In another embodiment, the MoMo30 combination formulation comprises a MoMo30 protein in combination with one or more antimicrobial agents. Examples of other antimicrobial agents include, but are not limited to, antiviral agents, antibiotics, antimicrobial peptides, bacterial biofilm-degrading enzymes, and in vivo expression vectors encoding antimicrobial agents. When used in such combinations, the MoMo30 protein of the present invention and other antimicrobial agents may be administered simultaneously, separately, by the same or different routes, or at various times during treatment.

Exemplary antiviral agents include, but are not limited to, abacavir, acyclovir, adefovir, amantadine, amdoxovir, amprenavir, antiprotease, apricitabine, arbidol, artemisinin, atazanafir, atripla, azidothymidine (AZT), azithromycin, bevirimat, boceprevir, butylated hydroxytoluene (BHT), chloroquine, cidofovir, combivir, darunavir, delavirdine, didanosine, dipivoxil, docosanol, edoxudine, efavirenz, elvitegravir, elvucitabine, emtricitabine, enfuviritide, entecavir, etravirine, famciclovir, foscarnet, fosamprenavir, gancyclovir, globoidnan A, GSK-572, HIV fusion inhibitors, hydroxychloroquine, hypericin, ibalizumab, idoxuridine, immunovir, indinavir, interferons (Types I, II and III), lamivudine, lersivirine, lopinivir, loviride, maraviroc, maribavir, MK-2048, molixan (NOV-205), moroxydine, nelfinavir, nevirapine, nexavir, non-nucleotide HIV RT inhibitors, oseltamivir, paxlovid, pegylated interferons (e.g., peginterferon alfa-2a), penciclovir, pencyclovir, peramivir, pleconaryl, podophyllotoxin, racivir, raltegravir, remdesivir, resquimod, ribavirin, rifampin, rilpivirine, rimantidine, ritonavir, saquinivir, stampidine, stavudine, taribavirin, tenofovir, tipranavir, trifluridine, trizivir, tromantidine, truvada, valaciclovir (Valtrex), valacyclovir, valganciclovir, vicriviroc, vidarabine, vivecon, zalcitabine, zanamivir (Relenza), zidovudine, zinc sulfate, and combinations thereof.

In certain embodiments, the MoMo30 protein of the present application is combined with an antiviral agent selected from the group consisting of hydroxychloroquine, chloroquine, azithromycin, remdesivir, Kaletra® (lopinavir/ritonavir), camostat mesilate, ribavirin, interferon beta 1b, interleukin-6 inhibitors, dexamethasone, indinavir, umifenovir, nelfinavir, saquinavir, EIDD-1931, EIDD-2801, anti-SARS-CoV-2 antibodies, anti-CCR5 antibodies, cyclophilin inhibitors, neuropilin-1 (Nrp-1) inhibitors; naproxen, vitamin D, ivermectin, niclosamide, P9R, favipiravir, sofosbuvir, curcumin, dexamethasone, mannitol, tizanidine, alpelisib, sulfamethizole, sulfathiazole, kanamycin, tobramycin, phthalylsulfathiazole, droperidol, eszopiclone, homatropine, and combinations thereof.

Antibiotics for use in the present application include anti-bacterial and anti-fungal antibiotics. There are several generally recognized categories of bacterial antibiotic agents including (1) penicillins, (2) cephalosporins, (3) quinolones, (4) aminoglycosides, (5) monobactams, (6) carbapenems, and (7) macrolides. Specific examples of bacterial antibiotics for use with the SMR peptides of the present application include, but are not limited to, afenide, amikacin, amoxicillin, ampicillin, arsphenamine, augmentin, azithromycin, azlocillin, aztreonam, bacampicillin, bacitracin, balofloxacin, besifloxacin, capreomycin, carbacephem (loracarbef), carbenicillin, cefacetrile (cephacetrile), cefaclomezine, cefaclor, cefadroxil (cefadroxyl), cefalexin (cephalexin), cefaloglycin (cephaloglycin), cefalonium (cephalonium), cefaloram, cefaloridine (cephaloradine), cefalotin (cephalothin), cefamandole, cefaparole, cefapirin (cephapirin), cefatrizine, cefazaflur, cefazedone, cefazolin (cephazolin), cefcanel, cefcapene, cefclidine, cefdaloxime, cefdinir, cefditoren, cefedrolor, cefempidone, cefepime, cefetamet, cefetrizole, cefivitril, cefixime, cefluprenam, cefmatilen, cefmenoxime, cefmepidium, cefmetazole, cefodizime, cefonicid, cefoperazone, cefoselis, cefotaxime, cefotetan, cefovecin, cefoxazole, cefoxitin, cefozopran, cefpimizole, cefpirome, cefpodoxime, cefprozil (cefproxil), cefquinome, cefradine (cephradine), cefrotil, cefroxadine, cefsumide, ceftaroline, ceftazidime, ceftazidime/avibactam, cefteram, ceftezole, ceftibuten, ceftiofur, ceftiolene, ceftioxide, ceftizoxime, ceftobiprole, ceftriaxone, cefuracetime, cefuroxime, cefuzonam, cephalexin, cephalothin, chloramphenicol, chlorhexidine, ciprofloxacin, clarithromycin, clavulanic acid, clinafloxacin, clindamycin, cloxacillin, colimycin, colistimethate, colistin, crysticillin, cycloserine, daptomycin, demeclocycline, dicloxacillin, dirithromycin, doripenem, doxycycline, efprozil, enoxacin, ertapenem, erythromycin, ethambutol, flucloxacillin, flumequine, fluoroquinolones, fosfomycin, furazolidone, fusidic acid, gatifloxacin, geldanamycin, gemifloxacin, gentamicin, glycopeptides, grepafloxacin, herbimycin, imipenem, isoniazid, kanamycin, levofloxacin, lincomycin, linezolid, lipoglycopeptides, lomefloxacin, meropenem, meticillin, metronidazole, mezlocillin, minocycline, mitomycin, moxifloxacin, mupirocin, nadifloxacin, nafcillin, nalidixic acid, neomycin, netilmicin, nitrofurantoin, norfloxacin, novobiocin, ofloxacin, oxacillin, oxazolidinones, oxolinic acid, oxytetracycline, oxytetracycline, paromomycin, pazufloxacin, pefloxacin, penicillin G, penicillin V, pipemidic acid, piperacillin, piromidic acid, pivampicillin, pivmecillinam, platensimycin, pleuromutilins, polymyxins (e.g., polymyxin B), pristinamycin, prontosil, prulifloxacin, pvampicillin, pyrazinamide, quinupristin/dalfopristin, retapamulin, rifabutin, rifalazil, rifampicin/rifampin, rifamycin, rifapentine, rosoxacin, roxithromycin, rufloxacin, sitafloxacin, sparfloxacin, spectinomycin, spiramycin, streptomycin, sulbactam, sulfacetamide, sulfamethizole, sulfamethoxazole, sulfanilimide, sulfisoxazole, sulfonamides, sultamicillin, teicoplanin, telavancin, telithromycin, temafloxacin, tetracyclines, thiamphenicol, ticarcillin, tigecycline, tinidazole, tobramycin, tosufloxacin, trimethoprim, trimethoprim-sulfamethoxazole, troleandomycin, trovafloxacin, tuberactinomycin, vancomycin, viomycin, pharmaceutically acceptable salts thereof, and structural analogs thereof.

Exemplary anti-fungal agents include, but are not limited to, abafungin, albaconazole, amorolfin, amphotericin B, anidulafungin, bifonazole, butenafine, butoconazole, candicidin, caspofungin, ciclopirox, clotrimazole, econazole, fenticonazole, filipin, fluconazole, flucytosine, griseofulvin, haloprogin, hamycin, isavuconazole, isoconazole, itraconazole, ketoconazole, micafungin, miconazole, naftifine, natamycin, nystatin, omoconazole, oxiconazole, polygodial, posaconazole, ravuconazole, rimocidin, sertaconazole, sulconazole, terbinafine, terconazole, tioconazole, tolnaftate, undecylenic acid, voriconazole, pharmaceutically acceptable salts thereof, and structural analogs thereof.

Another aspect of the application is a method of preparing a MoMo30-containing plant extract, including but not limited to plants of the *Momordica* genus, such as *Momordica balsamina*. In one embodiment, the method includes one or more steps including: harvesting the plants; drying the plants; extracting the dried plants in water or aqueous media to form an aqueous extract; centrifuging the aqueous extract to remove debris and particulates; filtering the aqueous extract by passage through a molecular weight cutoff (MWCO) filter (e.g., Amicon 30 kDa or 50 kDa); collecting the retentate containing MoMo30 protein; eluting the MoMo30 protein from the retentate; drying the protein in the retentate or resuspending the protein in buffer for further analysis, purification and/or storage. The MoMo30 protein may be further purified from the plant extract by immunoaffinity chromatography and other conventional methodologies known to those of skill in the art. In some embodiments, plant leaves comprising a MoMo30 protein are obtained from members of the *Momordica* genus, such as *Momordica balsamina*.

In a particular embodiment, a method for preparing a MoMo30-containing plant extract comprises the steps of: (a) drying a plant comprising an MoMo30 protein; (b) extracting the dried plant in aqueous media; (c) separating the aqueous media from solid material to form an aqueous MoMo30 extract; and (d1) passing the aqueous extract through a molecular weight cut-off filter and collecting a retentate comprising the protein, or (d2) purifying the protein from the aqueous extract by immunoaffinity purification using an antibody directed against the protein.

In another embodiment, a method for preparing a MoMo30-containing plant extract comprises the steps of: (a) drying a plant comprising an MoMo30 protein; (b) extracting the dried plant in boiling water; and (c) separating the aqueous media from solid material to form an aqueous MoMo30 extract.

The MoMo30 protein may be dried for storage or resuspended in an appropriate buffer for further use or storage following e.g., quantification of MoMo30 yield and/or characterization of MoMo30 purity. In practice, the extracts are highly stable and have been stored freeze dried for years without significant loss of anti-viral activity.

In addition, the extract, purified extract and/or purified MoMo30 protein may be characterized by HPLC and/or tested for functional activity via infectivity assays and the like. For example, in some embodiments, the MoMo30-containing plant extract or purified protein may be evaluated for functional activity by testing their ability to inhibit infection by HIV using a MAGI cell infectivity assay (or "indicator assay"). This assay involves the use of genetically modified CD4-expressing HeLa cell line (MAGI) containing an HIV LTR-driven cassette placed upstream of the E. coli β-gal encoded reporter gene (HeLa-CD4-LTR-3-gal). See Kimpton and Emerman, J Virol 66:2232, 1992. Expression of the reporter gene is activated in the presence of HIV Tat, which is expressed upon infection by HIV, such as HIV-$1_{NL4-3}$ and activates the HIV-1 LTR. Cells infected by HIV turn blue and can be counted under a microscope.

In other embodiments, a MoMo30-containing plant extract or purified MoMo30 protein is evaluated for its ability to inhibit a coronavirus (CoV) infection using a lentivirus-based, VSV-based or MuLV-based virus particles operably linked to a luciferase reporter that are pseudotyped with a CoV Spike (S) protein, such as SARS-CoV-2 S protein, in ACE2-expressing cells. A "bald" or non-pseudotyped lentivirus control containing the luciferase reporter alone can be used as a negative control. A lentivirus-based luciferase reporter system for carrying out this assay includes pseudotyped (CoV-2 S protein) lentivirus reporters, non-pseudotyped lentivirus reporters (negative control), and ACE2-expressing lentiviruses (BPS Bioscience, San Diego, Calif., BPS#s 79942, 79943 and 79944). Additional reagents and cell lines for carrying out the above experiments may be obtained from BPS Bioscience (San Diego, Calif.) and Creative Biogene (Shirley, N Y). This system allows for an evaluation of the ability of MoMo30 to block expression of the luciferase reporter in ACE2-expressing cells infected with the S/S1-pseudotyped lentivirus reporter. A "bald" or non-pseudotyped control containing the luciferase reporter alone can be used as a negative control.

To further confirm the binding of MoMo30 to high mannose residues in coronavirus S proteins, the above-described functional assay may be carried out at increasing concentrations of the monosaccharide mannose. It is predicted that increasing mannose concentrations will progressively eliminate the ability of the MoMo30 protein to inhibit CoV-2 replication in Vero E6 cells and inhibit luciferase or 3-gal expression from the reporter.

Methods of Treatment

In another aspect, the present application provides a method for preventing or treating a microbial infection. In one embodiment, the method comprises administering to a subject in need thereof a MoMo30 protein, a MoMo30 protein-containing composition, or MoMo30 combination formulation according to the present application in an amount sufficient to prevent a microbial infection, reduce the symptoms associated with the infection, or cure the subject of the microbial infection or disease. The MoMo30 protein may be administered as a substantially purified protein or MoMo30-encoded nucleic acid in a pharmaceutically acceptable carrier, alone or in combination with a suitable adjuvant, or it may be administered as plant extract alone or in combination with other nutritional supplements, plant extracts or plant components described above.

In another aspect, a method of treatment comprises administering to a subject in need thereof a MoMo30-encoded expression vector according to the present application in an amount sufficient to prevent a microbial infection, reduce the symptoms associated with the infection, or cure the subject of the microbial infection or disease. As used herein, the term "antimicrobial agent" is used with reference to the MoMo30 protein of the present application, as well as secondary bioactive agents, which have the capacity to kill, disrupt the reproduction of, inhibit the growth of, or reduce the drug-resistance of a microorganism.

In some embodiments, the infection is caused by a virus.

In other embodiments, the infection is caused by a bacterium.

In other embodiments, the infection is caused by a fungus.

In other embodiments, the infection is caused by a protozoon.

The methods of the present application may be applied to the prevention or treatment of variety of enveloped RNA and DNA viruses, including RNA viruses, such as retroviruses, lentiviruses, coronaviruses (including subgroup 1a and 1b alphacoronaviruses, subgroup 2a, 2b, 2c and 2d betacoronaviruses, and subgroup 3 gammacoronaviruses), herpesviruses, alphaviruses, bunyaviruses, filoviruses, flaviviruses, hepatitis viruses, orthomyxoviruses (e.g., influenza Types A, -B, -C, -D), paramyxoviruses, rhabdoviruses, and togaviruses; and DNA viruses, such as herpesviruses, poxviruses, and hepadnaviruses. Preferably, the microorganism or virus includes one or more cell surface proteins containing mannose residues. In certain preferred embodiments, the infection is caused by HIV, SARS-CoV-2, or an influenza Type 1 virus.

Exemplary species of enveloped viruses for prophylactic or therapeutic use, include retroviruses or lentiviruses, such as human immunodeficiency virus type 1 and type 2 (HIV-1 and HIV-2), human T-cell lymphotropic virus type I and type II (HTLV-I and HTLV-II); herpesviruses, including Epstein-Barr virus, human cytomegalovirus type 1 (HCMV-1), human herpes virus type 6 (HHV-6), human herpes virus type 7 (HHV-7), human herpes virus type 8 (HHV-8), influenza type A virus, including subtypes H1N1 and H5N1, as well as types -B, -C, and -D; coronaviruses, including severe acute respiratory syndrome coronavirus type 2 (SARS-CoV-2), SARS-CoV-1, Middle East Respiratory Syndrome Coronavirus (MERS-CoV), HCoV-229E, HCoV-OC43, HCoV-NL63, and HCoV-HKU1; RNA viruses that cause hemorrhagic fever, such as the filoviruses, Ebola virus (EBOV) and Marburg virus (MBGV); Bunyaviridae (e.g., Rift Valley fever virus (RVFV) and Crimean-Congo hemorrhagic fever virus (CCHFV)); and flaviviruses, such as Hepatitis C virus, West Nile virus (WNV), Dengue fever virus (DENV), yellow fever virus (YFV), tick-borne encephalitis virus, Saint Louis encephalitis virus, and (GB virus C (GBV-C), formerly known as Hepatitis G virus (HGV)); enteroviruses (Types A to L, including coxsackieviruses (Types A to C); echoviruses; rhinoviruses (Types A to C), poliovirus); orthomyxoviruses (e.g., influenza Types A, -B, -C, -D, including A subtypes H1N1, H5N1, H3N2); paramyxoviruses (e.g., rubulavirus (mumps), rubeola virus (measles), respiratory syncytial virus, Newcastle disease, parainfluenza); parvoviruses (e.g., parvovirus B19 virus); rhabdoviruses (e.g., Rabies virus); arenaviruses (e.g., lymphocytic choriomeningitis virus and several Lassa fever viruses, including Guanarito virus, Junin virus, Lassa virus, Lujo virus, Machupo virus, Sabia virus, Whitewater Arroyo virus); alphaviruses (e.g., Venezuelan equine encephalitis virus, eastern equine encephalitis virus; western equine encephalitis virus); hepatitis A virus, hepatitis C virus (HCV), hepatitis D virus (HDV), hepatitis E virus (HEV), including any type, subtype, clade or sub-clade of the foregoing viruses.

In certain preferred embodiments, the RNA virus for prevention or treatment is a coronavirus, such as SARS-CoV-2, SARS-CoV-1, MERS-CoV, HCoV-229E, HCoV-OC43, HCoV-NL63, and HCoV-HKU1. In an exemplary embodiment, a method for preventing or reducing symptoms of a coronavirus infection, comprises orally administering to a subject in need thereof a composition comprising: an effective amount of a MoMo30 protein comprising an amino acid sequence that is at least 90% identical to SEQ ID NO: 4; and at least one pharmaceutically acceptable carrier.

In other preferred embodiments, the RNA virus for prevention or treatment is an influenza Type A virus. Influenza A viruses are divided into subtypes on the basis of two proteins on the surface of the virus, hemagglutinin (HA) and neuraminidase (NA). There are 18 known HA subtypes and 11 known NA subtypes. Many different combinations of HA and NA proteins are possible. For example, an "H7N2 virus" designates an influenza A virus subtype that has an HA7 protein and an NA2 protein. Similarly, an "H5N1" virus has an HA5 protein and an NA1 protein. Type A influenza viruses that may be targeted for prophylactic and/or therapeutic use according to the methods and compositions of the present application include a variety of sub-types, such as H1N1, H1N2, H3N2, H5N1, H5N2, H5N3, H5N4, H5N5, H5N6, H5N7, H5N8, and H5N9, H7N1, H7N2, H7N3, H7N4, H7N5, H7N6, H7N7, H7N8, H7N9, H9N1, H9N2, H9N3, H9N4, H9N5, H9N6, H9N7, H9N8, H9N9, H17N10 and H18N11).

In another exemplary embodiment, a method for preventing or reducing symptoms of an influenza Type A virus infection, comprises orally administering to a subject in need thereof a composition comprising: an effective amount of a MoMo30 protein comprising an amino acid sequence that is at least 90% identical to SEQ ID NO: 4; and at least one pharmaceutically acceptable carrier.

Exemplary species of enveloped DNA viruses for prevention or treatment include, but are not limited to, Exemplary DNA viruses for prophylactic or therapeutic treatment include herpesviruses (e.g., HSV-1, HSV-2, EBV, VZV, HCMV-1, HHV-6, HHV-7, HHV-8), papillomaviruses (e.g., human papilloma virus (HPV) Types 1, 2, 4, 6, 11, 16, 18, 26, 30, 31, 33, 34, 35, 39, 40, 41, 42, 43, 44, 45, 51, 52, 54, 55, 56, 57, 58, 59, 61, 62, 64, 67, 68, 69, 70); poxviruses (e.g., smallpox virus), hepadnaviruses (Hepatitis B virus); anelloviruses (e.g., transfusion transmitted virus or torque teno virus (TTV); as well as any type, subtype, clade or sub-clade thereof.

In some embodiments, the MoMo30 protein is used for the treatment or prevention of bacterial infection. Exemplary bacteria for treatment include, but are not limited to, *Staphylococcus* species, including *S. epidermidis, S. aureus*, and methicillin-resistant *S. aureus; Enterococcus* species, including *E. faecalis* and *E. faecium; Mycobacterium tuberculosis, Haemophilus influenzae, Pseudomonas* species, including *P. aeruginosa, P. pseudomallei*, and *P. mallei; Salmonella* species, including *S. enterocolitis, S. typhimurium, S. enteritidis, S. bongori*, and *S. choleraesuis; Shigella* species, including *S. flexneri, S. sonnei, S. dysenteriae*, and *S. boydii; Brucella* species, including *B. melitensis, B. suis, B. abortus*, and *B. pertussis; Neisseria* species, including *N. meningitidis* and *N. gonorrhoeae; Escherichia coli*, including enterotoxigenic *E. coli* (ETEC); *Vibrio cholerae, Helicobacter pylori, Chlamydia trachomatis, Clostridium difficile, Cryptococcus neoformans, Moraxella catarrhalis, Campylobacter* species, including *C. jejuni; Corynebacterium* species, including *C. diphtheriae, C. ulcerans, C. pseudotuberculosis, C. pseudodiphtheriticum, C. urealyticum, C. hemolyticum, C. equi; Streptococcus* species, including *S. pneumoniae, S. pyogenes, S. mutans, S. agalactiae, S. equi, S. canis, S. bovis, S. equinus, S. anginosus, S. sanguis, S. salivarius, S. mitis; Listeria monocytogenes, Nocardia asteroides, Bacteroides* species, *Actinomycetes* species, *Treponema pallidum, Leptospirosa species, Klebsiella pneumoniae; Proteus* sp., including *Proteus vulgaris; Serratia* species, *Acinetobacter, Yersinia* species, including *Y. pestis* and *Y. pseudotuberculosis; Francisella tularensis, Enterobacter species, Bacteroides species, Legionella species, Borrelia burgdorferi*, and the like.

In some embodiments, the MoMo30 protein is used for the treatment or prevention of a fungal infection. Exemplary fungi for treatment include, but are not limited to, *Aspergillus* species, *Dermatophytes, Blastomyces derinatitidis, Candida* species, including *C. albicans* and *C. krusei; Malassezia furfur, Exophiala werneckii, Piedraia hortai, Trichosporon beigelii, Pseudallescheria boydii, Madurella grisea, Histoplasma capsulatum, Sporothrix schenckii, Histoplasma capsulatum, Tinea* species, including *T. versicolor, T pedis, T. unguium, T. cruris, T capitus, T. corporis, T. barbae; Trichophyton* species, including *T. rubrum, T. interdigitale, T tonsurans, T violaceum, T yaoundei, T. schoenleinii, T. megninii, T. soudanense, T. equinum, T. erinacei*, and *T. verrucosum; Microsporum* species, including *M. audouini, M. ferrugineum, M canis, M. nanum, M distortum, M. gypseum, M. fulvum*, and the like.

In certain embodiments, the MoMo30 protein may be useful for treating or preventing a variety of conditions including, for example, infections of the skin, infections of the urogenital tract, infections of the digestive system (e.g., the gut), infections of the lung, and/or infections of the sinus. For example, the antimicrobial compositions may be useful for the treatment of a condition, such as, for example, rosacea, atopic dermatitis (e.g., eczema), a *Candida* infection (e.g., vaginal, diaper, intertrigo, balanitis, oral thrush), *Tinea versicolor*, Dermatophytosis (e.g., *Tinea pedis* (athlete's foot)), *Tinea unguium*, Onychomycosis (e.g., toe nail fungus), *Tinea cruris, Tinea capitus, Tinea corporis, Tinea barbae*, seborrheic dermatitis, antibiotic-resistant skin infections, impetigo, ecthyma, erythrasma, burn wounds (e.g., reduction of infections, improved healing), diabetic foot/leg ulcers (e.g., reduction of infections, improved healing), prevention of central catheter-related blood stream infections, oral mucositis, warts (e.g., common, flat, plantar, genital), and molluscum contagiosum. In some embodiments, the condition is acne, often acne vulgaris and sometimes acne conglobate.

In some embodiments, the MoMo30 protein may be useful for treating or preventing a protozoan infection. Exemplary protozoan infections include, but are not limited to those caused by *Cryptosporidium, Isospora belli, Toxoplasma gondii, Trichomonas vaginalis*, and *Cyclospora* species.

Route and Dose of MoMo30 Product Administration

An antimicrobial MoMo30 product of the present application may be administered orally, intrathecally, intra-arterially, intravenously, intradermally, subcutaneously, transdermally (topically) or transmucosally. An antimicrobial composition may be administered by any route, including oral, rectal, pulmonary, sublingual, and parenteral administration. Parenteral administration includes, for example, intraperitoneal, intravenous, intramuscular, intraarterial, intravesical (e.g., to the bladder), intradermal, transdermal, topical, or subcutaneous administration.

As a general proposition, the therapeutically effective amount of an antimicrobial MoMo30 product administered will be in a weight range of about 1 ng/kg body weight/day to about 100 mg/kg body weight/day whether by one or more administrations. In more particular embodiments, the antimicrobial MoMo30 product or MoMo30-containing formulation is administered in weight range from about 1 ng/kg body weight/day to about 1 µg/kg body weight/day, 1 ng/kg body weight/day to about 100 ng/kg body weight/day, 1 ng/kg body weight/day to about 10 ng/kg body weight/day, 10 ng/kg body weight/day to about 1 µg/kg body weight/day, 10 ng/kg body weight/day to about 100 ng/kg body weight/day, 100 ng/kg body weight/day to about 1 µg/kg body weight/day, 100 ng/kg body weight/day to about 10 µg/kg body weight/day, 1 µg/kg body weight/day to about 10 µg/kg body weight/day, 1 µg/kg body weight/day to about 100 µg/kg body weight/day, 10 µg/kg body weight/day to about 100 µg/kg body weight/day, 10 µg/kg body weight/day to about 1 mg/kg body weight/day, 100 µg/kg body weight/day to about 10 mg/kg body weight/day, 1 mg/kg body weight/day to about 100 mg/kg body weight/day and 10 mg/kg body weight/day to about 100 mg/kg body weight/day.

In other embodiments, an antimicrobial MoMo30 product is administered at a dosage range of 1 ng-10 ng per injection, 10 ng-100 ng per injection, 100 ng-1 µg per injection, 1 g-10 µg per injection, 10 µg-100 µg per injection, 100 µg-1 mg per injection, 1 mg-10 mg per injection, 10 mg-100 mg per injection, and 100 mg-1000 mg per injection. The MoMo30 protein or MoMo30-containing formulation may be injected once daily, twice daily, three times daily, and/or every 2, 3, 4, 5, 6 or 7 days. In addition, the MoMo30 protein or MoMo30-containing formulation may be administered over a period of one month, two months, six months, 12 months, 2 years, 5 years, 10 years, 20 years, or more.

In other embodiments, the antimicrobial MoMo30 product or MoMo30-containing formulation may be administered in a range from about 1 ng/kg to about 100 mg/kg. In more particular embodiments, the antimicrobial MoMo30 product or MoMo30-containing formulation may be administered in a range from about 1 ng/kg to about 10 ng/kg, about 10 ng/kg to about 100 ng/kg, about 100 ng/kg to about 1 µg/kg, about 1 µg/kg to about 10 µg/kg, about 10 g/kg to about 100 µg/kg, about 100 µg/kg to about 1 mg/kg, about 1 mg/kg to about 10 mg/kg, about 10 mg/kg to about 100 mg/kg, about 0.5 mg/kg to about 30 mg/kg, and about 1 mg/kg to about 15 mg/kg.

In other particular embodiments, the amount of antimicrobial MoMo30 product administered is, or is about, 0.0006, 0.001, 0.003, 0.006, 0.01, 0.03, 0.06, 0.1, 0.3, 0.6, 1, 3, 6, 10, 30, 60, 100, 300, 600 and 1000 mg/day.

Concentrations or amounts of MoMo30 protein may be determined using anti-MoMo30 antibodies as further described herein below. The specific dose of antimicrobial MoMo30 product may be determined based on the particular circumstances of the individual patient including the size, weight, age and sex of the patient, the nature and stage of the disease, the aggressiveness of the disease, and the route of administration of the antimicrobial composition.

In certain embodiments, an antimicrobial MoMo30 product or MoMo30-containing formulation may be administered at least once per day, typically once, twice, three times or four times per day with the doses given at equal intervals throughout the day and night to maintain a constant presence of the drug to provide sufficient antimicrobial activity. However, a skilled artisan will appreciate that a treatment schedule can be optimized for any given patient, and that administration of compound may occur less frequently than once per day.

In other embodiments, an antimicrobial MoMo30 product or MoMo30-containing formulation of the present application is prescribed to be taken in combination with other antimicrobial agents and/or the other active agents described above. Examples of other antimicrobial agents include, but are not limited to, antibiotics, other antimicrobial peptides, and in vivo expression vectors that encode an antimicrobial MoMo30 product of the present application. When used in such combinations, the antimicrobial MoMo30 product of the present application and other antimicrobial agents may be administered simultaneously, by the same or different routes, or at various times during treatment.

The treatment may be carried out for as long a period as necessary, i.e., until the infection is cleared or no longer a threat to the host. In some cases, the treatment may be continued indefinitely while the disease state persists, although discontinuation might be indicated if the antimicrobial compositions no longer produce a beneficial effect. In one embodiment, the treatment is carried out for 6 months and then discontinued. The treating physician can determine whether to increase, decrease, or interrupt treatment based on a patient's response, including evaluation of immune responses, viral loads etc.

An antimicrobial MoMo30 product of the present application can be chemically synthesized or produced from cells transformed with polynucleotide expression vectors encoding a MoMo30 gene using recombinant DNA technologies well known to those skilled in the art. Polynucleotide expression vectors can be designed to facilitate preparative expression levels in many different cell hosts, including bacteria, yeast, insect cells, and mammalian cells.

In some microorganisms, such as wild type *E. coli*, the periplasm constitutes an oxidizing environment, whereas the cytoplasm is a reducing environment. Accordingly, expression in the *E. coli* periplasm may enable the production of peptides containing interchain or intrachain disulfide bonds that might be otherwise reduced in cytoplasm, where it may be toxic to the cell. Some prokaryotic organisms have endogenous, intracellular oxidizing environments and can normally accommodate formation of protein disulfide bonds inside the cell. Accordingly, the fusion protein may be periplasmically expressed using an operably linked periplasmic signal sequence at the 5'end of the corresponding nucleic acid expression construct.

The MoMo30 product may be fused to other protein domain, including binding tags conferring additional biochemical properties, targeting properties, antimicrobial properties etc. When fused to another protein domain in an expression vector, the MoMo30 encoded product in the expression vector may further include a cleavage recognition site for proteolytic cleavage of one or more peptide domains from one another. The cleavage recognition sequence can be cleaved by a suitable protease, such as Kex2p or furin, at one or more defined residues.

Where the cleavage recognition site is positioned adjacent to an adjacent protein domain, proteolytic cleavage in a transduced cell can liberate one or more antimicrobial domains from one another so that the antimicrobial products can function independently of one another according to their designated microbial cell surface target or microbial intracellular target.

For example, when positioned in or adjacent to a spacer region adjacent to the MoMo30 gene product, the expressed peptide can be directly cleaved when introduced into a microbial cell bearing the corresponding protease. In one embodiment, the proteolytic recognition site is a Kex2p-sensitive proteolytic cleavage site. In another embodiment, the proteolytic recognition site is the furin proteolytic cleavage site, which is sensitive to cleavage by the enzyme, furin.

An expression construct can further include a native or non-native N-terminal signal peptide region to facilitate entry of the encoded antimicrobial MoMo30 product into the secretory pathway following gene transfer into eukaryotic cells near a site of infection.

Expression Vectors

In certain embodiments, an expression vector encoding the antimicrobial MoMo30 protein of the present application is directly administered to a patient to express an antimicrobial MoMo30 protein in vivo. In certain particular embodiments, a recombinant polynucleotide operatively linked to suitable regulatory elements for expression of a MoMo30 protein is codon optimized for expression in a selected prokaryotic or eukaryotic host cell, such as a mammalian, plant, or insect cell. To facilitate replication and expression, the polynucleotide can be incorporated into a vector, such as a prokaryotic or a eukaryotic expression vector. Suitable non-viral expression vectors include, but are not limited to, plasmid expression vector or a bacteriophage vector. Suitable viral vectors include, but are not limited to, retroviral vectors, lentiviral vectors, adenoviral vectors, adeno-associated viral (AAV) vectors, herpes viral vectors, and alphavirus vectors. The viral vector can also be an astrovirus, coronavirus, orthomyxovirus, papovavirus, paramyxovirus, parvovirus, picornavirus, poxvirus, togavirus viral vector.

The term "in vivo expression vector" refers to a non-viral or viral vector that comprises a polynucleotide encoding an antimicrobial MoMo30 protein of the present application in a form suitable for expression of the polynucleotide in a host cell. The expression vectors include one or more regulatory sequences, selected based on the host cells used for expression, and operably linked to the polynucleotide sequence to be expressed. It will be appreciated by those skilled in the art that the design of the expression vector can depend on such factors as the choice of the host cell to be transformed, the level of expression of protein desired, and the like. The expression vectors can be introduced into host cells to produce an antimicrobial MoMo30 protein of the present application.

As used herein, the term "control sequences" or "regulatory sequences" refers to DNA sequences necessary for the expression of an operably linked coding sequence in a particular host organism. The term "control/regulatory sequence" is intended to include promoters, enhancers, and other expression control elements (e.g., polyadenylation signals). Control/regulatory sequences include those which direct constitutive expression of a nucleotide sequence in many types of host cells and those which direct expression of the nucleotide sequence only in certain host cells (e.g., tissue-specific regulatory sequences). An expression vector may be designed to facilitate expression of an antimicrobial MoMo30 protein-encoding polynucleotide in one or more cell types. Tissue-specific regulatory elements may be used to restrict expression to a particular cell type.

A nucleic acid sequence is "operably linked" to another nucleic acid sequence when the former is placed into a functional relationship with the latter. For example, a DNA for a presequence or secretory leader peptide is operably linked to DNA for a protein if it is expressed as a preprotein that participates in the secretion of the protein; a promoter or enhancer is operably linked to a coding sequence if it affects the transcription of the sequence; or a ribosome binding site is operably linked to a coding sequence if it is positioned so as to facilitate translation. "operably linked" means that the DNA sequences being linked are contiguous and, in the case of a secretory leader, contiguous and in reading phase. However, enhancers do not have to be contiguous. Linking is accomplished by ligation at convenient restriction sites. If such sites do not exist, synthetic oligonucleotide adaptors or linkers are used in accordance with conventional practice.

Delivery of antimicrobial MoMo30 protein-encoding expression vectors can be achieved by infection (for viral vectors), transfection (for non-viral vectors) and other methods well known to one skilled in the art. Examples of other delivery methods and media include, polycationic condensed DNA linked or unlinked to killed viruses, ligand linked DNA, liposomes, eukaryotic cell delivery vehicles cells, deposition of photopolymerized hydrogel materials, handheld gene transfer particle gun, ionizing radiation, nucleic charge neutralization or fusion with cell membranes. Particle mediated gene transfer may also be employed.

Plasmid DNA expression vectors can be utilized for non-viral gene transfer, either by direct injection of naked DNA or by encapsulating an antimicrobial MoMo30 protein-encoding polynucleotide in liposomes, microparticles, microcapsules, virus-like particles, or erythrocyte ghosts. Such compositions can be further linked by chemical conjugation to, for example, microbial translocation domains and/or targeting domains to facilitate targeted delivery and/or entry of nucleic acids into the nucleus of desired cells to promote gene expression. In addition, plasmid vectors may be incubated with synthetic gene transfer molecules such as polymeric DNA-binding cations like polylysine, protamine, and albumin, and linked to cell targeting ligands such as asialoorosomucoid, insulin, galactose, lactose, or transferrin. Naked DNA may also be employed. Uptake efficiency of naked DNA may be improved using biodegradable latex beads. Such delivery may be improved further by treating the beads to increase hydrophobicity and thereby facilitate disruption of the endosome and release of the DNA into the cytoplasm.

As used herein, the term "promoter" is to be taken in its broadest context and includes transcriptional regulatory elements (TREs) from genomic genes or chimeric TREs therefrom, including the TATA box or initiator element for accurate transcription initiation, with or without additional TREs (i.e., upstream activating sequences, transcription factor binding sites, enhancers and silencers) which regulate activation or repression of genes operably linked thereto in response to developmental and/or external stimuli and trans-acting regulatory proteins or nucleic acids. The promoter may be constitutively active, or it may be active in one or more tissues or cell types in a developmentally regulated manner. A promoter may contain a genomic fragment, or it may contain a chimera of one or more TREs combined.

Examples of such promoters include: the immediate early promoter of CMV, LTR or SV40 promoter, polyhedron promoter of baculovirus, *E. coli* lac or trp promoter, phage T7 and lambda PL promoter and other promoters known to control expression of genes in prokaryotic or eukaryotic cells or their viruses. The expression vector typically also contains a ribosome binding site for translation initiation and a transcription terminator. The vector optionally includes appropriate sequences for amplifying expression. In addition, the expression vectors optionally comprise one or more selectable marker genes to provide a phenotypic trait for selection of transformed host cells, such as dihydrofolate reductase or neomycin resistance for eukaryotic cell culture or such as tetracycline or ampicillin resistance in *E. coli*.

The expression vector can also include additional expression elements, for example, to improve the efficiency of translation. These signals can include, e.g., an ATG initiation codon and adjacent sequences. In some cases, for example, a translation initiation codon and associated sequence elements are inserted into the appropriate expression vector simultaneously with the polynucleotide sequence of interest (e.g., a native start codon). In such cases, additional translational control signals are not required. However, in cases where only a protein coding sequence or a portion thereof, is inserted, exogenous translational control signals, including an ATG initiation codon is provided for expression of an antimicrobial MoMo30 protein. The initiation codon is placed in the correct reading frame to ensure translation of the polynucleotide sequence of interest. Exogenous transcriptional elements and initiation codons can be of various origins, both natural and synthetic. If desired, the efficiency of expression can be further increased by the inclusion of enhancers appropriate to the cell system in use (Scharf et al. (1994) Results Probl Cell Differ 20:125-62; Bitter et al. (1987) Methods in Enzymol 153:516-544).

Expression vectors carrying an antimicrobial MoMo30-encoding nucleic acid can be introduced into host cells by any of a variety of well-known procedures, such as electroporation, liposome mediated transfection, calcium phosphate precipitation, infection, transfection, and the like, depending on the selection of vectors and host cells.

Host cells that contain antimicrobial MoMo30 protein-encoding nucleic acids are, thus, also a feature of this disclosure. Favorable host cells include prokaryotic (i.e., bacterial) host cells, such as *E. coli*, as well as numerous eukaryotic host cells, including plant (e.g., tobacco), fungal (e.g., yeast, such as *Saccharomyces cerevisiae* and *Picchia pastoris*) cells, insect cells, and mammalian cells (such as CHO cells). Recombinant antimicrobial MoMo30-encoding nucleic acids are introduced (e.g., transduced, transformed, or transfected) into host cells, for example, via a vector, such as an expression vector. As described above, the vector is most typically a plasmid, but such vectors can also be, for example, a viral particle, a phage, etc. Examples of appropriate expression hosts include bacterial cells, such as *E. coli, Streptomyces*, and *Salmonella typhimurium*; fungal cells, such as *Saccharomyces cerevisiae, Pichia pastoris* and *Neurospora crassa*; insect cells such as *Drosophila* and *Spodoptera frugiperda*; mammalian cells such as 3T3, COS, CHO, BHK, HEK 293 or Bowes melanoma; plant cells, including algae cells, etc.

The host cells can be cultured in conventional nutrient media modified as appropriate for activating promoters, selecting transformants or amplifying the inserted polynucleotide sequences. The culture conditions, such as temperature, pH, and the like, are typically those previously used with the host cell selected for expression and will be apparent to those skilled in the art.

In bacterial systems, a number of expression vectors can be selected depending upon the use intended for the expressed product. For example, when large quantities of a protein or fragments thereof are needed for the production of antibodies, vectors which direct high-level expression of fusion proteins that are readily purified are favorably employed. Such vectors include, but are not limited to, multifunctional *E. coli* cloning and expression vectors such as BLUESCRIPT (Stratagene), in which the coding sequence of interest, e.g., a polynucleotide of the invention as described above, can be ligated into the vector in-frame with e.g., sequences for the amino-terminal translation initiating methionine and the subsequent 7 residues of beta-galactosidase producing a catalytically active beta galactosidase fusion protein in which the amino-terminal methionine is ligated in frame with a histidine tag; and the like.

Similarly, in yeast, such as *Saccharomyces cerevisiae*, a number of vectors containing constitutive or inducible promoters such as alpha factor, alcohol oxidase and PGH can be used for production of the desired expression products. In mammalian host cells, a number of expression systems, including both plasmids and viral-based systems, can be utilized.

A host cell is optionally chosen for its ability to modulate the expression of the inserted sequences or to process the expressed protein in the desired fashion. Such modifications of the protein include, but are not limited to, glycosylation, acetylation, carboxylation, phosphorylation, lipidation, acylation etc. Post-translational processing for example, which cleaves a precursor form into a mature form of the protein (for example, by a furin protease) is optionally performed in the context of the host cell. Different host cells such as 3T3, COS, CHO, HeLa, BHK, MDCK, 293, WI38, etc. have specific cellular machinery and characteristic mechanisms for such post-translational activities and can be chosen to ensure the correct modification and processing of the introduced, foreign protein.

For long-term, high-yield production of recombinant antimicrobial MoMo30 protein, stable expression systems may be employed. For example, polynucleotides encoding an antimicrobial MoMo30 protein can be introduced into suitable host cells using expression vectors which contain viral origins of replication or endogenous expression elements and a selectable marker gene. Following the introduction of the vector, cells are allowed to grow for 1-2 days in an enriched media before they are switched to selective media. The purpose of the selectable marker is to confer resistance to selection and its presence allows growth and recovery of cells which successfully express the introduced sequences. For example, resistant groups or colonies of stably transformed cells can be proliferated using tissue culture techniques appropriate to the cell type. Host cells transformed with a nucleic acid encoding an antimicrobial MoMo30 protein are optionally cultured under conditions suitable for the expression and recovery of the encoded protein from cell culture.

Following transduction of a suitable host cell line and growth of the host cells to an appropriate cell density, the selected promoter is induced by appropriate means (e.g., temperature shift or chemical induction) and cells are cultured for an additional period. The secreted protein product is then recovered from the culture medium. Alternatively, cells can be harvested by centrifugation, disrupted by physical or chemical means and the resulting crude extract retained for further purification. Eukaryotic or microbial cells employed in expression of proteins can be disrupted by any convenient method, including freeze-thaw cycling, sonication, mechanical disruption or use of cell lysing agents or other methods, which are well known to those skilled in the art.

Expressed antimicrobial MoMo30 proteins can be recovered and purified from recombinant cell cultures by any of a number of methods well known in the art, including ammonium sulfate or ethanol precipitation, acid extraction, anion, or cation exchange chromatography, phosphocellulose chromatography, hydrophobic interaction chromatography, affinity chromatography (e.g., using any of the tagging systems noted herein), hydroxylapatite chromatography and lectin chromatography. Since the MoMo30 protein is unusually heat stable it also suggests that application of heat to denature other proteins may be a useful approach. Protein refolding steps can be used, as desired, in completing configuration of the mature protein. Finally, high performance liquid chromatography (HPLC) can be employed in the final purification steps.

In certain examples, the nucleic acids are introduced into vectors suitable for introduction and expression in prokaryotic cells, e.g., E. coli cells. For example, a nucleic acid including a polynucleotide sequence that encodes a F2GF1 chimeric RSV antigen can be introduced into any of a variety of commercially available or proprietary vectors, such as the pET series of expression vectors (e.g., pET19b and pET21d). Expression of the coding sequence is inducible by IPTG, resulting in elevated levels of protein expression. The polynucleotide sequence encoding the chimeric RSV antigen is transcribed under the phage T7 promoter. Alternate vectors, such as pURV22 that include a heat-inducible lambda pL promoter are also suitable.

The expression vector is introduced (e.g., by electroporation) into a suitable bacterial host. Numerous suitable strains of *E. coli* are available and can be selected by one of skill in the art (for example, the Rosetta and BL21 (DE3) strains have proven favorable for expression of recombinant vectors containing polynucleotide sequences that encode F2GF1 chimeric RSV antigens.

In another example, a polynucleotide sequence that encodes an antimicrobial product is introduced into insect cells using a baculovirus expression vector system (BEVS). Recombinant baculovirus capable of infecting insect cells can be generated using commercially available vectors, kits and/or systems, such as the BD BaculoGold system from BD BioScience. Briefly, the polynucleotide sequence encoding the antimicrobial product is inserted into the pAcSG2 transfer vector. Then, host cells SF9 (Spodopterafrugiperda) are co-transfected by pAcSG2-chimer plasmid and BD BaculoGold, containing the linearized genomic DNA of the baculovirus *Autographa californica* nuclear polyhedrosis virus (AcNPV). Following transfection, homologous recombination occurs between the pACSG2 plasmid and the Baculovirus genome to generate the recombinant virus. In one example, the antimicrobial product is expressed under the regulatory control of the polyhedrin promoter (pH). Similar transfer vectors can be produced using other promoters, such as the basic (Ba) and p10 promoters. Similarly, alternative insect cells can be employed, such as SF21 which is closely related to the SF9 and the High Five (Hi5) cell line derived from a cabbage looper, *Trichoplusia ni.*

Following transfection and induction of expression (according to the selected promoter and/or enhancers or other regulatory elements), the expressed proteins are recovered (e.g., purified or enriched) and renatured to ensure folding into a biologically active conformation.

In yet other embodiments, the antimicrobial products are expressed in vivo using viral or non-viral expression vectors.

Viral-based expression vectors. In some embodiments, the antimicrobial products are delivered from viral-derived expression vectors. Exemplary viral vectors may include or be derived from adenovirus, adeno-associated virus, herpesvirus, vaccinia virus, poliovirus, poxvirus, HIV virus, lentivirus, retrovirus, Sindbis and other RNA viruses and the like. Also preferred are any viral families which share the properties of these viruses which make them suitable for use as vectors. Retroviruses include Murine Moloney Leukemia virus (MMLV), HIV and other lentivirus vectors. Adenovirus vectors are relatively stable and easy to work with, have high titers and can be delivered in aerosol formulation and can transfect non-dividing cells. Poxviral vectors are large and have several sites for inserting genes, they are thermostable and can be stored at room temperature. Viral delivery systems typically utilize viral vectors having one or more genes removed and with and an exogenous gene and/or gene/promoter cassette being inserted into the viral genome in place of the removed viral DNA. The necessary functions of the removed gene(s) may be supplied by cell lines which have been engineered to express the gene products of the early genes in trans.

Non-viral expression vectors. In other embodiments, non-viral delivery systems are utilized for delivery of plasmid vectors or other bioactive non nucleic acid agents using lipid formulations comprising, for example, liposomes, such as cationic liposomes (e.g., DOTMA, DOPE, DC-cholesterol) and anionic liposomes. Liposomes can be further conjugated to one or more proteins or peptides to facilitate targeting to a particular cell, if desired. Administration of a composition comprising a compound and a cationic liposome can be administered to the blood afferent to a target organ or inhaled into the respiratory tract to target cells of the respiratory tract. Furthermore, active agent(s) can be administered as a component of a microcapsule or nanoparticle that can be targeted to a cell type of interest using targeting moieties described herein or that can be designed for slow release of one or more active agent(s) in accordance with a predetermined rate of release or dosage.

In other embodiments, the nucleic acids may be delivered in vivo by electroporation, the technology for which is available from Genetronics, Inc. (San Diego, Calif.), as well as by means of a SONOPORATION machine (ImaRx Pharmaceutical Corp., Tucson, Ariz.).

The nucleic acids may be in solution or suspension (for example, incorporated into microparticles, liposomes or cells). These may be targeted to a particular cell type via antibodies, receptors, or receptor ligands. Vehicles such as "stealth" and other antibody conjugated liposomes (including lipid mediated drug targeting to cells of interest), receptor mediated targeting of DNA through cell specific ligands or viral vectors targeting e.g., lymphoid, epithelial, or endothelial cells. In general, receptors are involved in pathways of endocytosis, either constitutive or ligand induced. These receptors cluster in clathrin-coated pits, enter the cell via clathrin-coated vesicles, pass through an acidified endosome in which the receptors are sorted and then either recycle to the cell surface, become stored intracellularly or are degraded in lysosomes. The internalization pathways serve a variety of functions, such as nutrient uptake, removal of activated proteins, clearance of macromolecules, opportunistic entry of viruses and toxins, dissociation and degradation of ligand and receptor level regulation. Many receptors follow more than one intracellular pathway, depending on the cell type, receptor concentration, type of ligand, ligand valency and ligand concentration.

Pharmaceutical Compositions

As used herein the language "pharmaceutically acceptable carrier" is intended to include any and all solvents, solubilizers, fillers, stabilizers, binders, absorbents, bases, buffering agents, lubricants, controlled release, vehicles, diluents, emulsifying agents, humectants, lubricants, dispersion media, coatings, antibacterial or antifungal agents, isotonic and absorption delaying agents, and the like, compatible with pharmaceutical administration. The use of such media and agents for pharmaceutically active substances is well-known in the art. Except as far as any conventional media or agent is incompatible with the active compound, use thereof in the compositions is contemplated. Supplementary agents can also be incorporated into the compositions. In certain embodiments, the pharmaceutically acceptable carrier comprises serum albumin.

The pharmaceutical composition of the application is formulated to be compatible with its intended route of administration. Examples of routes of administration include parenteral, e.g., intrathecal, intra-arterial, intravenous, intradermal, subcutaneous, oral, transdermal (topical) and transmucosal administration.

Solutions or suspensions used for parenteral, intradermal, or subcutaneous application can include the following components: a sterile diluent such as water for injection, saline solution, fixed oils, polyethylene glycols, glycerine; propylene glycol or other synthetic solvents; antibacterial agents such as benzyl alcohol or methyl parabens; antioxidants such as ascorbic acid or sodium bisulfate; chelating agents such as ethylenediaminetetraacetic acid; buffers such as acetates, citrates or phosphates and agents for the adjustment of tonicity such as sodium chloride or dextrose, pH can be adjusted with acids or bases, such as hydrochloric acid or sodium hydroxide. The parenteral preparation can be enclosed in ampoules, disposable syringes or multiple dose vials made of glass or plastic.

Pharmaceutical compositions suitable for injectable use include sterile aqueous solutions (where water soluble) or dispersions and sterile powders for the extemporaneous preparation of sterile injectable solutions or dispersions. For intravenous administration, suitable carriers include physiological saline, bacteriostatic water, Cremophor EL™ (BASF, Parsippany, N.J.) or phosphate buffered saline (PBS). In all cases, the injectable composition should be sterile and should be fluid to the extent that easy syringability exists. It must be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene, glycol, and liquid polyethylene glycol, and the like), and suitable mixtures thereof. The proper fluidity can be maintained, for example, using a coating such as lecithin, by the maintenance of the required particle size in the case of dispersion and using surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as mannitol, sorbitol, and sodium chloride in the composition. Prolonged absorption of the injectable compositions can be brought about by including in the composition an agent which delays absorption, for example, aluminum monostearate and gelatin.

Sterile injectable solutions can be prepared by incorporating an active agent in the required amount in an appropriate solvent with one or a combination of ingredients enumerated above, as required, followed by filtered sterilization. Dispersions can be prepared by incorporating the active compound into a sterile vehicle which contains a basic dispersion medium and the required other ingredients from those enumerated above. In the case of sterile powders for the preparation of sterile injectable solutions, the preferred methods of preparation are vacuum drying and freeze-drying which yields a powder of the active ingredient plus any additional desired ingredient from a previously sterile-filtered solution thereof.

Oral compositions generally include an inert diluent or an edible carrier. They can be enclosed in gelatin capsules or compressed into tablets. For oral therapeutic administration, the active compound may be incorporated with excipients and used in the form of tablets, troches, or capsules. Oral compositions can also be prepared using a fluid carrier for use as a mouthwash, wherein the compound in the fluid carrier is applied orally and swished and expectorated or swallowed. Pharmaceutically compatible binding agents, and/or adjuvant materials can be included as part of the composition. The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel, or corn starch; a lubricant such as magnesium stearate or Stertes; a glidant such as colloidal silicon dioxide; a sweetening agent such as sucrose or saccharin; or a flavoring agent such as peppermint, methyl salicylate, or orange flavoring.

For administration by inhalation, the compounds are delivered in the form of an aerosol spray from pressured container or dispenser which contains a suitable propellant, e.g., a gas such as carbon dioxide, or a nebulizer.

Systemic administration can also be by transmucosal or transdermal means. For transmucosal or transdermal administration, penetrants appropriate to the barrier to be permeated are used in the formulation. Such penetrants are known in the art, and include, for example, for transmucosal administration, detergents, bile salts, and fusidic acid derivatives. Transmucosal administration can be accomplished using nasal sprays or suppositories. For transdermal administration, the pharmaceutical compositions are formulated into ointments, salves, gels, or creams as generally known in the art.

In certain embodiments, the pharmaceutical composition is formulated for sustained or controlled release of the active ingredient. Biodegradable, biocompatible polymers can be used, such as ethylene vinyl acetate, polyanhydrides, polyglycolic acid, collagen, polyorthoesters, and poly lactic acid. Methods for preparation of such formulations will be apparent to those skilled in the art. The materials can also be obtained commercially from e.g., Alza Corporation and Nova Pharmaceuticals, Inc. Liposomal suspensions (including liposomes targeted to infected cells with monoclonal antibodies to viral antigens) can also be used as pharmaceutically acceptable carriers.

It is especially advantageous to formulate oral or parenteral compositions in dosage unit form for ease of administration and uniformity of dosage. Suitable unit dosage forms include, but are not limited to powders, tablets, pills, capsules, lozenges, suppositories, patches, nasal sprays, injectibles, implantable sustained-release formulations, lipid complexes, etc.

Dosage unit form as used herein includes physically discrete units suited as unitary dosages for the subject to be treated; each unit containing a predetermined quantity of active compound calculated to produce the desired therapeutic effect in association with the required pharmaceutical carrier. The specification for the dosage unit forms of the present application is dictated by and directly dependent on the unique characteristics of the active compound and the particular therapeutic effect to be achieved, and the limitations inherent in the art of compounding such an active compound for the treatment of individuals.

Toxicity and therapeutic efficacy of the antimicrobial product of the present application can be determined by standard pharmaceutical procedures in cell cultures or experimental animals, e.g., for determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50. Compounds which exhibit large therapeutic indices are preferred. While compounds that exhibit toxic side effects may be used, care should be taken to design a delivery system that targets such compounds to the site of affected tissue to minimize potential damage to uninfected cells and, thereby, reduce side effects.

The data obtained from the cell culture assays and animal studies can be used in formulating a range of dosage for use in humans. The dosage of such compounds lies preferably within a range of circulating concentrations that include the ED50 with little or no toxicity. The dosage may vary within this range depending upon the dosage form employed and the route of administration utilized. For any compound used in the method of the present application, the therapeutically effective dose can be estimated initially from cell culture assays. A dose may be formulated in animal models to achieve a circulating plasma concentration range that includes the IC50 (i.e., the concentration of the test compound which achieves a half-maximal inhibition of symptoms) as determined in cell culture. Such information can be used to more accurately determine useful doses in humans. The pharmaceutical compositions can be included in a container, pack, or dispenser together with instructions for administration.

The present application is further illustrated by the following examples that should not be construed as limiting. The contents of all references, patents, and published patent applications cited throughout this application, as well as the Figures and Tables, are incorporated herein by reference.

EXAMPLES

Example 1. Materials and Methods

1. Plant Extracts.

One hundred grams of dried leaves from *Momordica balsamina* were extracted in 1 L of distilled water overnight at 4° C. The liquid extract was separated from solid material through centrifugation at 4000×g for 30 min. at 4° C. The resulting supernatant was filtered through Whatman filter paper (Cat #3030). The extract was filter-sterilized by passing it through a 0.45-micron filter (Celltreat Cat #229703) and was kept frozen at −80° C. prior to lyophilization overnight.

2. Isolation of MoMo30.

The lyophilized powder was dissolved in nuclease-free water (Invitrogen Cat #AM9938) to create a 15 mg/mL solution. The solution was passed through 30 kD molecular weight cutoff filter at 4000×g for at least 10 minutes (Amicon ultra-15 cat # UFC903024) to remove low molecular weight contaminants. Once a retentate of 1 to 1.5 mL was obtained, the solution was passed through a 0.22-micron syringe filter (Celltreate Cat #229747) and stored at 4° C. (−20° C. for long term storage). The retentate contained one protein MoMo30 that was >95% pure as determined by SDS-PAGE and stained with Coomassie Brilliant Blue R-250 (Bio-Rad Cat #161-0400).

3. Multinuclear Activation of an Indicator (MAGI) assay for infectivity.

MAGI cell assays for infectivity were done as previously described (Khan M. et al. (2001) J Virol. 75:12081-7; Raymond A D et al. (2011) AIDS Res Hum Retroviruses 27:167-178). MAGI cells (AIDS reagent program cat # U373) were grown to 90% confluence. Cells were infected with 1 ng of p24 equivalent of HIV-$1_{NL4-3}$ (AIDS reagent program cat #114). Infected cells were fixed and identified by cells exhibiting the development of blue color. Before staining, Cells were fixed using 1% Formaldehyde (F-79-500 Fisher Chemicals) and 0.2% Glutaraldehyde (F-02957-1 Fisher Scientific) in PBS. Staining solution was prepared to contain (14.25 ml PBS, 300 µl 0.2M potassium ferrocyanide, 300 µl 0.2M potassium ferricyanide, 15p 2M $MgCl_2$ and 150 µl X-gal stock (40 mg/ml in DMSO). Two ml solution was added to each well and incubated at 37° C. for 50 min. Cells were washed twice with PBS and counted using light microscopy.

4. Determination of the effect of MoMo30 on infectivity. A MoMo30 dose-response curve was carried out using MoMo30 concentrations from 1 to 100 nM. The IC50 of MoMo30 was determined by curve fitting using the Hill equation and determined using the Dr. Fit program (Di Veroli G Y et al. (2015) Scientific Reports 5:14701. For comparison, the commercially available fusion inhibitor Enfurvirtide (Sigma. SML0934). Briefly, MAGI cells were infected with 1 ng HIV-$1_{NL4-3}$, Momo30+1 ng HIV-$1_{NL4-3}$ and Enfuvirtide +1 ng HIV-$1_{NL4-3}$ at different concentrations of MoMo30 and Enfuvirtide. After 48 hrs cells were fixed and stained.

5. Detection of MoMo30 in serum. To determine if the ingestion of plant extracts resulted in detectable levels of MoMo30 in the blood, two Rhesus macaques were given plant extracts using a scaled dosage to that typically given to humans. The macaques were given the plant extracts with food. Two grams of plant was given twice a day for a period of six months. Blood samples were taken at 0 days up to 183 days. Plasma was tested by SDS-PAGE and Western blot.

6. MTT Assay of MoMo30.

To determine if MoMo30 exhibits significant cellular toxicity at therapeutic levels, HEK 293 cells were exposed to concentrations of MoMo30 from 1 to 1000 nM and a mitochondrial toxicity test (MTT; Sigma Cat # CGD-1) was performed according to the manufacturer's recommendations. Percent viability was determined by comparison to an untreated control.

7. Stability Studies on MoMo30 and its Complex to Gp120.

To determine the stability of MoMo30 and its attachment to HIV-1, stock solutions of MoMo30 (4 ng/ml and 40 ng/ml) were subjected to temperatures from 25° C. to 120° C. for 30 min. After heating, the solution was mixed with 1 ng of HIV-$1_{NL4-3}$ and was added to a MAGI cell assay, and blue cells were counted. In a separate comparison study, 1 ng of HIV-$1_{NL4-3}$ samples were mixed with a stock solution of MoMo30 (400 ng/ml), incubated at 4° C., followed by collection of aliquots at time intervals from 5 min to 3 days, and centrifuged at 125,000 g through 20% sucrose cushion to remove free MoMo30 and then tested for infectivity by MAGI cell assay.

8. N-Terminal Sequencing of MoMo30.

Edman degradation was performed in two labs (Biosynthesis, Lewisville, Tex., and Creative Proteomics, New York, N.Y.). The analysis was performed on an ABI Procise 494HT (Thermo Fisher). The procedure determines the N-terminal amino acid sequence of proteins and peptides by the Edman degradation chemistry.

9. RNAseq to Determine the MoMo30 Gene Sequence.

RNAseq (GeneWiz) was used to determine the gene sequence of MoMo30. Total RNA was isolated from *M. balsamina* leaves by the Trizol method (~4 g). RNAseq was done on the Illumina platform and the de novo transcriptome was assembled using Trinity software. The mRNA corresponding to the MoMo30 protein was determined by searching for the N-terminal sequence as determined by Edman degradation. Once the DNA sequence had been determined, the MoMo30 coding sequence was synthesized (Genscript) and cloned into the pGen-lenti vector which contains both a T7 promoter and a CMV promoter for expression in mammalian cells.

10. Software for Gene Assembly and Translation.

BLAST searches were done at the national center for biotechnology information (NCBI) web site. Comparisons of homology to various proteins and DNA sequences were done in SnapGene 6.0.2. Prediction of secondary structure was done at the Phyre2 structure prediction web portal (Kelley L A (2015) Nature Protocols 10:845-858).

11. Coupled transcription translation of MoMo30 gene. The cloned version of the synthesized gene was expressed in the wheat germ coupled transcription/translation system (TNT T7 coupled Wheat Germ Extract System Promega Cat # L4140) according to the manufacturer's recommendations. Ten μl of product was resolved on a 4-20% SDS-PAGE gel and a Western blot was done using antibody to the N-terminal peptide of MoMo30. Ten μl of product was also tested in a MAGI cell infectivity assay to determine any antiviral effect. Since the pGen-lenti vector also contained a CMV promoter, HEK293 cells were transfected with the plasmid using Lipofectamine 3000 (ThermoFisher Scientific Cat # L3000008) following the manufacturers protocol and grown for 48 hrs. Conditioned medium was harvested, and cells were collected and lysed by using (Pierce RIPA buffer Cat #89901). Ten μl of cell pellet and 20 μl of conditioned medium was resolved on a 4-20% SDS-PAGE gel and blotted with N-terminal antibody to MoMo30. 100 μl of conditioned medium was used in a MAGI cell assay for evaluating antiviral effects.

12. Fluorescent Gp120 Binding Assay. P

Purified gp120 (ImmunoDX cat #1001-F) was added to a suspension of $1\times10^6$/ml Jurkat cells (AIDS reagent program ARP-177 E6-1 clone) allowed to interact for 2 h at 37° C. Free gp120 was removed by centrifugation, and the cells were resuspended in PBS. A portion was stained with Hoechst stain, and the cells were viewed under a fluorescent microscope using a neutral density filter, a blue filter, and a FITC filter.

13. Surface Plasmon Resonance (Biacore).

Surface plasmon resonance was done at the Biacore Molecular Interaction Shared Resource at Georgetown University. A Biacore T200 was used with a CM5 chip at 25° C. Purified gp120-IIIB (Immuno Dx, 1 mg/ml) in 1 mM sodium acetate buffer at pH 5.5 was used as a ligand to immobilize onto FC2, FC3, and FC4 to the levels of 8850 RU, 283 RU, and 2980 RU, respectively. Standard amine coupling chemistry was used. HBS-P (10 mM Hepes, pH 7.4, 150 mM NaCl, 0.05% v/v surfactant P20) was used as the immobilization running buffer. Overnight kinetics were performed for MoMo30 binding to the ligand. Injected compound concentrations were 102 μM to 0.1 μM. Three 15 second pulses of 1:250 $H_3PO_4$ (v/v, $ddH_2O{:}H_3PO_4$) were injected to regenerate the chip surface. All analyses were done in triplicate. The sensorgrams were obtained from overnight kinetics using 1:1 model fitting. In some experiments, gp120 was pre-treated with PNGase F (removes N-glycans) for 30 min at 50° C. before linkage to the chip surface. A control reaction was done with buffer alone. Three independent assays were done, each in triplicate.

14. MoMo30 Inhibition in the Presence of Mannose.

To determine the effect of mannose on the action of MoMo30, infectivity assays were carried out with 2 nM of MoMo30 in the presence of D-Mannose (Sigma cat # M6020) at concentrations from 0.002 to 2 nM, incubated at room temperature for five minutes, and added to MAGI cells for determination of infectivity inhibition by the MAGI cell assay.

15. 2G12 Antibody Blot for Changes in Gp120 Glycosylation Pattern.

The 2G12 antibody has been previously described (Scanlan C N et al., (2002) J. Virol. 76:7306-7321). This antibody recognizes a cluster of aspartate residues (N295, 332, 339, 386, 392) on the surface of gp120. The most likely epitope is likely to be N295 and 332. HIV-$1_{NL4-3}$ was produced by infecting $5\times10^6$ Jurkat cells (AIDS reagent program ARP-177 E6-1 Clone) with 300 ng HIV-$1_{NL4-3}$ (AIDS reagent program cat #114) in presence and absence of sufficient MoMo30 (60 nM) to reduce replication by >95%. Samples were collected 5, 8 and 12 days after infection and evaluated by Western blot using the 2G12 antibody to determine the effect of MoMo30 on this cluster of glycans.

16. Immunoblotting.

A rabbit antibody was produced (Genescript) from a 15-amino acid peptide with the N-terminal sequence of MoMo30. The antibody (at a dilution of 1:2000) was used to perform an immunoblot on purified protein resolved on a 4-20% SDS PAGE gel. Then were transferred to 0.2 μm Nitrocellulose membrane using Bio-Rad Trans-Blot Turbo for 20 min and blocked with 0.5% skim milk made in Tris buffer saline with 0.1% tween 20 (TBST) for 1 h and after that membrane was incubated with primary antibody 1:2000 in TBST overnight at 4° C. Three washes of ten minutes with TBST and a wash with distilled water between each wash. After which secondary antibody (G.E. Healthcare goat anti-rabbit Cat # NA934V) was added at a dilution of 1:25000 containing precision protein StrepTectin-HRP (Bio-Rad CaE #1610380) 1:10,000 and allowed to incubate for 1 hour at room temperature. After this, the membrane was washed three times as previously, and chemiluminescent substrate (SuperSignal West Femto Thermo Scientific Cat #34096) was added and incubated for 5 min. The blot was visualized by a chemiluminescent imager (ThermoFisher iBright 1500). In some cases, the mouse monoclonal antibody 2G12 (AIDS reagent program; cat #1476) or a mouse anti-p24 antibody (AIDS reagent program; cat #6457) were used at a dilution of 1:1000 and used a mouse secondary antibody at a dilution of 1:25000.

Example 2. Preparation and Inhibitory Activity by the MoMo30 Protein

The present application is directed to compositions and methods comprising a 30 kDa MoMo30 product from *Momordica balsamina* plants. The functional activity of MoMo30 protein was originally assayed from *Momordica balsamina* plant extracts. In one non-limiting embodiment, the method comprises the steps of: (a) extracting dried *M. balsamina* leaves in water to form an aqueous extract; (b) removing solid material from the aqueous extract by centrifugation to form a supernatant; and (c) filter sterilizing the supernatant. The aqueous extract therefrom can be further frozen at −80° C. prior to lyophilization overnight.

As further described below, MoMo30-containing extracts or purified proteins were tested for functional activity by testing their ability to inhibit infectivity by the MAGI cell infectivity assay (or "indicator assay") described above. The MAGI cell infectivity assay involves the use of genetically modified CD4-expressing HeLa cell line (MAGI) containing an HIV LTR-driven cassette placed upstream of the E. coli β-gal encoded reporter gene (HeLa-CD4-LTR-β-gal). Cells infected by HIV turn blue and can be counted under a microscope. In the figures that follow, the results depict inhibition of infectivity as a function of blue cells per nanogram of HIV-1 p24 capsid protein. In some cases, WT HIV-1$_{NL4-3}$ was used to allow multiple rounds of infectivity. By using HIV-1$_{NL4-3}$ with a deleted env gene and then supplying env in trans, the assay can test a single round of infectivity.

Example 3. *Momordica balsamina* has Anti-HIV-1 Activity

Figure 2A:
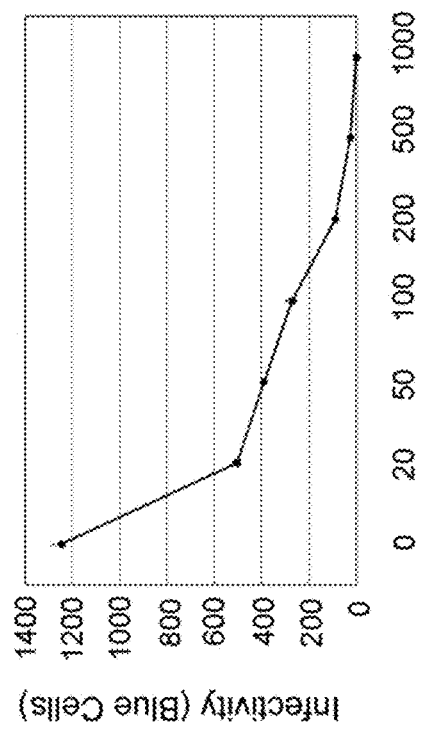
FIG. 2A shows that water soluble extracts from dried leaves extracts of *Momordica balsamina* contain an anti-HIV activity. The water-soluble extracts were tested at concentrations from 0 to 1000 µg/ml and scored for infectivity using a MAGI assay.

Water-soluble *M. balsamina* extracts were tested for their ability to inhibit HIV-1$_{NL4-3}$ infection in a MAGI cell assay. More particularly, cell extracts were prepared and various amounts of extract (20 µg, 50 µg, 100 µg, 200 µg, 500 µg, and 1000 µg of total dry weight per milliliter of water) were mixed with 1 ng of HIV-1$_{NL4-3}$ and tested for their ability to inhibit HIV-1$_{NL4-3}$ infection in a MAGI cell reporter system (Khan M. et al. (2001) J Virol. 75:12081-7; Raymond A D et al. (2011) AIDS Res Hum Retroviruses 27:167-178). The results of this assay showed a dose-dependent reduction in the number of blue cells (indicating reduced infectivity), reaching 100% at 1000 µg/ml of extract (FIG. 2A). Moreover, there were no indications of cell toxicity. These data indicated that the plant extracts contained one or more antiviral agents.

Figure 2B:
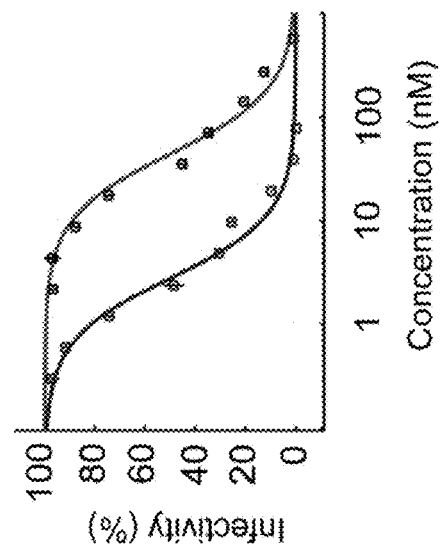
FIG. 2B shows an IC50 determination of inhibitory activity against HIV-1$_{NL43}$ by exposing 1 ng of HIV-1$_{NL43}$ to concentrations of MoMo30 from 1 to 100 nM and determining the percent infectivity (or inhibition) by MAGI assay. The IC50 value was determined by curve-fitting using Dr. Fit software. The top curve shows MoMo30 inhibition. The bottom curve shows a comparison to the commercially available HIV inhibitor, Enfuvirtide.

As a follow-up, various concentrations of purified MoMo30 protein from 1 to 1000 nM were tested in a MAGI cell assay to determine the IC50 of MoMo30-HIV binding (FIG. 2B). Similar to the results in FIG. 2A, purified protein was able to inhibit HIV-1$_{NL4-3}$ in a dose-dependent fashion. The IC$_{50}$ of the protein was determined by curve fitting using the Dr. Fit program. As shown in FIG. 2B, the IC50 was determined to be 2.8 nM. The plot was curve-fit from triplicate measurements of two independently isolate purified protein preparations (top curve). For comparison, triplicate sample analysis of the commercially available HIV fusion inhibitor Enfuvirtide was conducted in parallel (FIG. 2B, bottom curve). The IC50 of Enfuvirtide was determined to be 44 nM, consistent with the previously published value of 26 nM (He Y et al. (2008) Proc. Natl. Acad. Sci. USA, 105:16332-16337).

Example 4. Physical and Chemical Properties of MoMo30

Figure 3A:
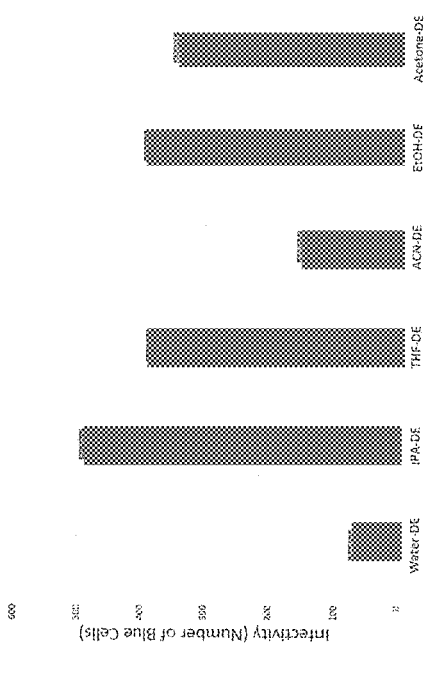
FIGS. 3A and 3B show the effects of different primary solvents (A) or extraction conditions (B) used in processing MoMo30 extracts relative to the amount of inhibition of HIV as determined by MAGI cell indicator assays. Lower bars indicate greater inhibition.
Figure 3B:
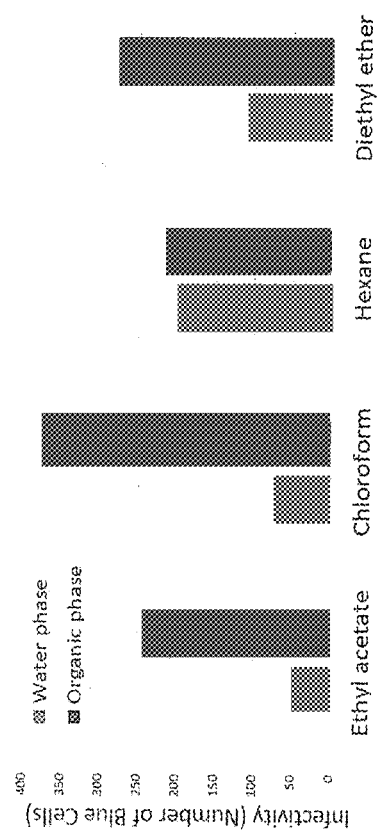

To further characterize the chemical nature of MoMo30, various extraction conditions were applied to preparation of the evaluate extraction of MoMo30 from *Momordica balsamina* plant extracts. Accordingly, *M. balsamina* leaves were directly extracted in water, isopropyl alcohol (IPA), tetrahydrofuran (THF), acetylnitrile (ACN), ethanol (EtOH), and acetone (FIG. 3A). These extracts were evaluated for their ability to inhibit HIV infection of MAGI indicator cells, where lower bars indicate greater anti-viral activity). As shown in FIG. 3A, the active agent can be extracted using water or acetylnitrile. This suggests that MoMo30 agent has both hydrophilic and hydrophobic properties, which is characteristic of larger molecules, such as proteins. The water-soluble nature of MoMo30 was further confirmed when testing the aqueous and organic phases obtained following extraction of *M. balsamina* leaves with ethyl acetate, chloroform, hexane and diethyl ether (FIG. 3B).

Example 5. The Antiviral Agent of Plant Extracts is a 30 kDa Protein

Figure 4A:
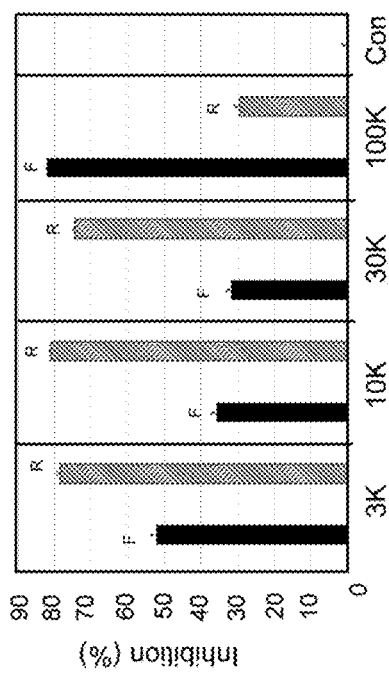
FIG. 4A shows the results from using different size molecular weight cutoff filters to either retain (retentate) or pass through (filtrate) the inhibitory product in the plant extract. The plant extract (2 mg/ml stock) was passed through Amicon Ultra cutoff filters (3K, 10K, 30K, 100K and control (virus alone) and then mixed with 1 ng of p24 equivalent of virus before testing by MAGI assay. In each case the portion that flowed through the filter (solid bars) and a portion retained by the filter (hashed bars) was tested by the MAGI infectivity assay. F=filtrate (passes through filter) and R=retentate (retained by filter).

To determine the relative size of the active agent, extracts were passed through a series of molecular weight cutoff filters ranging from 3 to 100 kDa. It was determined that the antiviral activity of the extract was retained by most of the filters (see FIG. 4A). Only at the 100 kDa cutoff did more activity flow through the filter than was retained (FIG. 4A). This observation suggested that the active agent was likely a large molecule such as a protein. The extract products retained on the 30 kDa cutoff filter were electrophoresed on a 4-20% SDS-PAGE gel and a single band of approximately 30 kDa in size was detected (see FIG. 4B, Purified). Surprisingly, no other major bands were detected on the SDS-PAGE gel. Because this protein was isolated from a *Momordica* plant and was 30 kDa in size, the antiviral protein is referred to herein as "MoMo30". Molecular weight cutoff filters were henceforth used to separate MoMo30 from lower molecular weight contaminants and concentrate the protein.

Example 6. MoMo30 Stability and HIV Binding

Figure 4B:
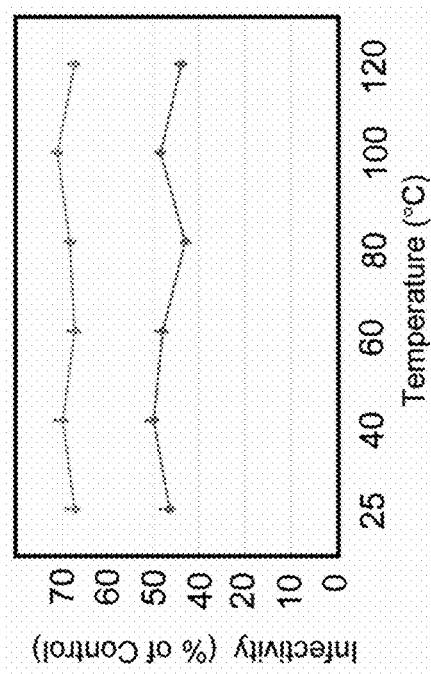
FIG. 4B shows that MoMo30 is heat stable and stays bound to virus for long periods of time.

The heat stability of MoMo30 was investigated by testing the ability of MoMo30 to inhibit HIV infectivity by the MAGI assay after incubating the protein at temperatures from 25° C. to 120° C. (autoclaving). The activity of MoMo30 was tested at concentrations of 40 ng/ml (top line) and 4 ng/ml (bottom line) over a range from 25° C. to 120° C. As shown in FIG. 4B, the percent infectivity of the purified protein remained unchanged over the broad temperature range tested.

Figure 4C:
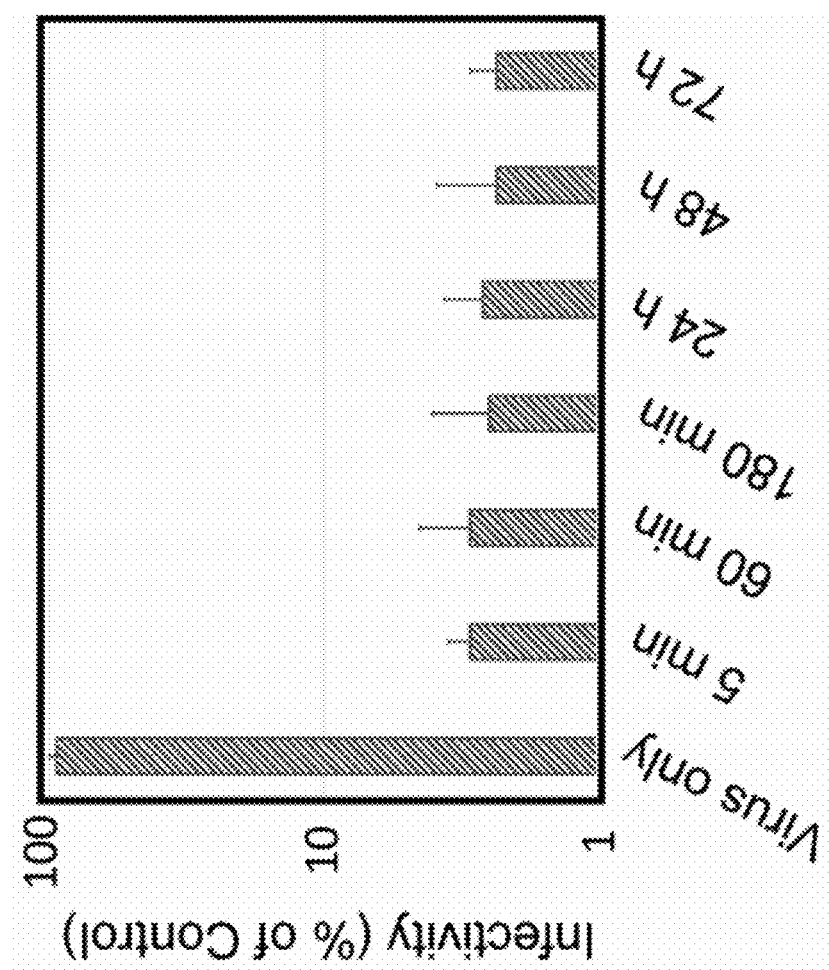
FIG. 4C shows that MoMo30 forms highly stable complexes with HIV-1. MoMo30 (3 nM) was mixed with an amount of HIV-1$_{NL43}$ comprising 1 ng p24 and allowed to interact for 5 min prior to centrifugation through a 40% sucrose cushion. Virus-complexes were removed at times from 5 min to 72 h at 4° C. prior to testing for infectivity/blocking by the MAGI cell assay. All measurements were done in triplicate.

To determine the stability of MoMo30 complexes formed with HIV-1, 100 ng/ml of MoMo30 was incubated with 1 ng of a p24 equivalent of HIV-1$_{NL4-3}$ virus. The complex of virus plus MoMo30 was then centrifuged through a 30% sucrose cushion at 125,000×g to remove any unbound MoMo30. The sucrose pellet containing virus plus bound MoMo30 was then tested for infectivity by the MAGI cell assay at time intervals from 5 min to 3 days. The results are summarized in FIG. 4C. Complexes of MoMo30 and HIV-1$_{NL4-3}$ virus retained 100% of their antiviral activity for at least 72 h suggesting that once formed, the complex of MoMo30 and virus remains stable.

Example 7. Detection of MoMo30 with Anti-MoMo30 Antibodies

Figure 5A:
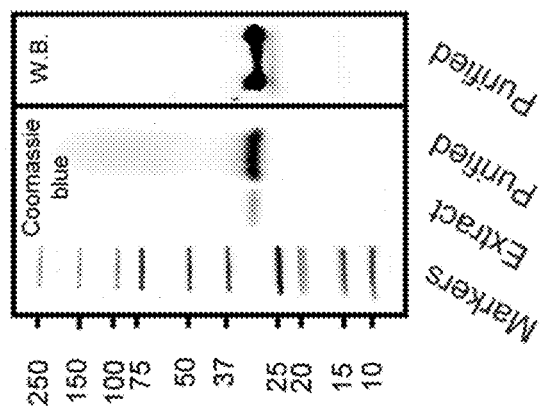
FIG. 5A shows that a *M. balsamina* extract passed through a 30 kD cutoff filter contains a prominent 30 kDa protein as visualized on a Coomasie blue stained 4-20% SDS-PAGE gel. The band is reactive with an N-terminal antibody to MoMo30.
Figure 5B:
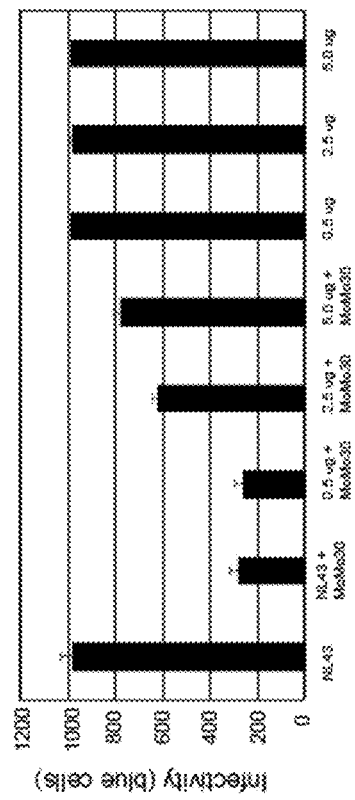
FIG. 5B shows that the anti-MoMo30 antibody blocked the ability of MoMo30 to inhibit HIV-1 infection in a dose-dependent manner (from 0.5 µg to 5.0 µg).

To provide a means for detection and immunopurification of MoMo30 protein from cells or cell extracts, a rabbit polyclonal antibody directed against the N-terminal amino acids of MoMo30 was generated. The N-terminal sequence of the first 15 amino acids was determined by Edman degradation (Creative Proteomics) to be GPIVTYWGQNVXEGEL (SEQ ID NO: 16). From this peptide, a rabbit antibody made that was used to perform Western analysis to confirm that the original 30 kDa band seen in the SDS-PAGE gel was the same protein submitted for Edman degradation (see FIG. 5A, W.B). FIG. 5B shows that in a MAGI assay, the anti-MoMo30 antibody blocked the ability of MoMo30 to inhibit HIV-1 infection in a dose-dependent manner (from 0.5 µg to 5.0 µg).

Example 8. Identification of the MoMo30 Gene

To identify the MoMo30 gene in *Momordica balsamina*, the following protocol was carried out: (1) isolate total plant RNA from *Momordica balsamina* leaves; (2) submit RNA for RNAseq de novo transcriptome analysis (GeneWiz); (3) assemble reads in Trinity 2.5 software; (4) search for open reading frames (EMBOSS); (5) translate into protein sequences (Diamond BLASTx annotation); and (6) search protein sequences for hevamine-related sequence motifs.

The Diamond BLAST search of open reading frames (ORFs) identified a Hevamine A-like sequence translated from the RNAseq data having strong homology (but not identical) to the N-terminal amino acid sequence (i.e., SEQ ID NO: 16) of MoMo30. The complete MoMo30 nucleotide coding sequence assembled from RNAseq reads is shown in FIG. 6 (SEQ ID NO: 1). A nucleic acid database search of the MoMo30 nucleotide coding sequence found the MoMo30 sequence to be 93% identical to the hevamine A-like gene from *M. chantaria* (NCBI Reference Sequence: XM_022291555.1; FIG. 6, SEQ ID NO: 5) and 26% identity to the *M. charantia* MAP30 protein. Residues that are different are shaded.

Figures 7A, 7B:
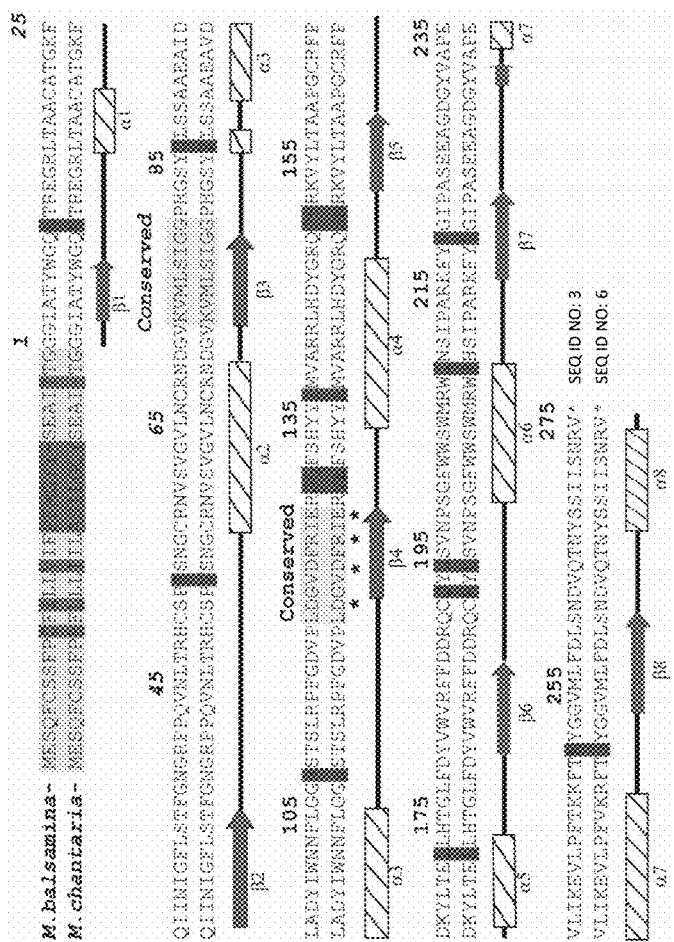
FIG. 7A shows the MoMo30 coding region aligned with the hevamine A-related amino acid sequence from *Momordica charantia*, along with structural domain predictions thereof. Amino acids highlighted in red show differences between the two sequences. Arrows denote predicted beta sheet structures and hatched boxes denote areas of predicted alpha helical structure. The two yellow shaded boxes denote areas of conservation in this class of proteins. Asterisks denote highly conserved catalytic residues.
FIG. 7B shows the amino acid sequence of the mature MoMo30 (i.e., secreted) protein.

A translation of the MoMo30 nucleotide coding sequence is shown in FIG. 7, panels A and B. An alignment of the MoMo30 amino acid coding sequence in SEQ ID NO: 3 with the translation product of the *Momordica charantia* hevamine A-related nucleotide sequence in FIG. 6 (via SnapGene) shows 91% identity at the protein level. Secondary structure predictions (by Phyre2 website) of the *M. balsamina* MoMo30 and the *M. chantaria* hevamine A-like ORF are shown in FIG. 7, panel A. The predicted secondary structure shows strong homology to a TIM β-barrel (a structure that is commonly found in Hevamine A-like proteins (Wierenga R K, (2001) FEBS Letters 492:193-198. The TIM structure is reported to be a very heat stable conformation (Romero-Romero S et al., (2021) J. Mol. Biol., 433:167153-167153), which is consistent with the profound heat stability of MoMo30 shown in FIG. 4B.

Hevamines are members of several families of plant chitinases and lysozymes that are important for plant defense against pathogenic bacteria and fungi and belong to the family 18 glycosyl hydrolases. Hevamines are known to hydrolyze linear polysaccharide chains of chitin and peptidoglycan. The MoMo30 protein was resistant to proteolysis by most proteases, including trypsin, which is used in most liquid chromatography with tandem mass spectrometry strategies. However, the MoMo30 protein was found to be sensitive to proteolysis by subtilisin (data not shown). Like other chitinases, MoMo30 was found to exhibit chitinase activity (data not shown).

Further, as shown in FIG. 6, the MoMo30 sequence of SEQ ID NO: 1 has a signal peptide-encoding sequence having an amino acid sequence present in amino acid residues 1-31 in SEQ ID NO: 7, panel A, which is removed in the secreted mature protein. FIG. 7, panel B shows the amino acid sequence of the mature MoMo30 protein (SEQ ID NO: 4) in secreted form having a predicted molecular weight of 30.9 kDa. The nucleotide sequence corresponding to the secreted form of MoMo30 is set forth in SEQ ID NO: 2.

FIG. 8 shows an alignment of two conserved regions from the MoMo30 protein relative to other hevamine A-related proteins comprising the amino acid sequences set forth in SEQ ID NOs: 7-15.

Figure 9:
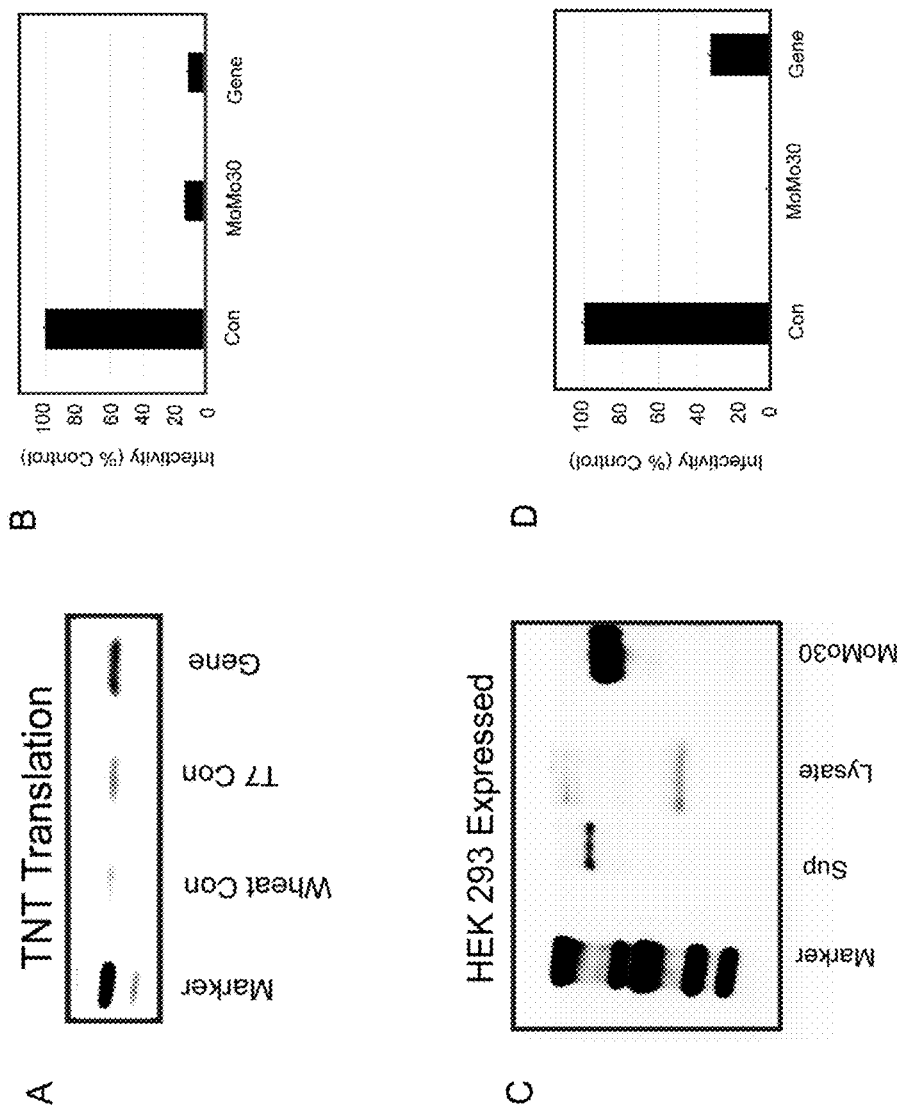
FIG. 9, panel A shows a 30 kD in vitro translated MoMo30 product. The MoMo30 gene was inserted into a pGEM vector that was used as a template for coupled transcription/translation. The reaction was run on a 20% SDS-PAGE gel and a western blot was probed with an N-terminal ab to MoMo30. A sample of purified MoMo30 is used as a marker. Panel B shows that the translation products have anti-HIV activity as determined by a MAGI assay. In panel C, the MoMo30 pGEM plasmid was transfected into HEK 293 cells, followed by collection of supernatants and cell lysates therefrom, which were run on a 20% SDS-PAGE gel and probed with the N-terminal MoMo30 ab. In panel D, 10 µl of cell-free conditioned medium was tested for HIV infectivity by the MAGI assay.

Example 9. In Vitro Transcription/Translation of the Hevamine A-Like MoMo30 Gene Produces an Antiviral Effect The MoMo30 coding sequence derived from the RNAseq data was synthesized (Genscript) and cloned into the pGen-lenti vector expression plasmid. In vitro coupled transcription and translation was carried out with the expression plasmid using the TNT wheat germ extract system (FIG. 9, panel A). A MAGI assay was performed using the reaction product to confirm that the product exhibits an antiviral effect. The synthesized product (FIG. 9, panel A) was able to inhibit HIV-1 similar to purified MoMo30 (FIG. 9, panel B). The product was also reactive with the N-terminal MoMo30 antibody (FIG. 9, panel C). Western blot analysis revealed an ~30 kDa protein in the supernatant, suggesting that the protein (synthesized with the native signal peptide sequence) was secreted, and the signal peptide was cleaved. Cell-free supernatants of HEK-293 cells transfected with the MoMo30 expression plasmid were tested for antiviral activity by the MAGI assay. As shown in FIG. 9, panel D, the tissue culture supernatants were found to significantly inhibit HIV-1 infectivity. Together, these data indicate that the MoMo30 is an *M. balsamina* hevamine A-like protein capable of inhibiting HIV-1 infection.

Example 10. MoMo30 Binds HIV-1 gp120 and Blocks its Binding to Jurkat Cells

Figure 10:
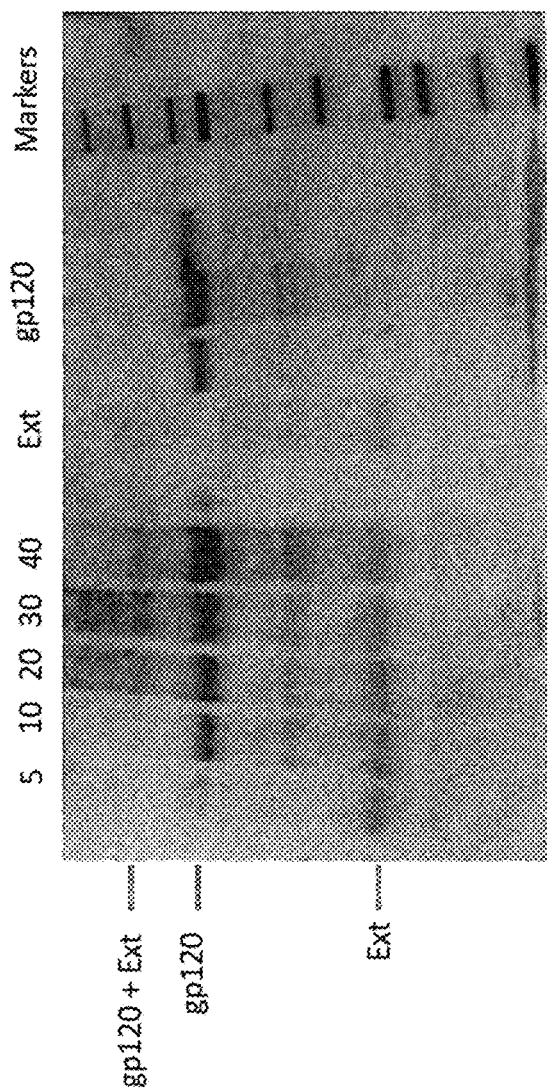
FIG. 10 is a Coomasie stained SDS-PAGE showing that the 30 kDa MoMo30 protein from extract A ("Ext") binds to increasing levels of purified HIV gp120 (in relative amounts 5, 10, 20, 30 and 40) and induces it to undergo a shift in MW (see "gp120+Ext"). Note the shift in mobility is evident even after boiling in loading buffer and despite the denaturing conditions in the gel.
Figure 11:
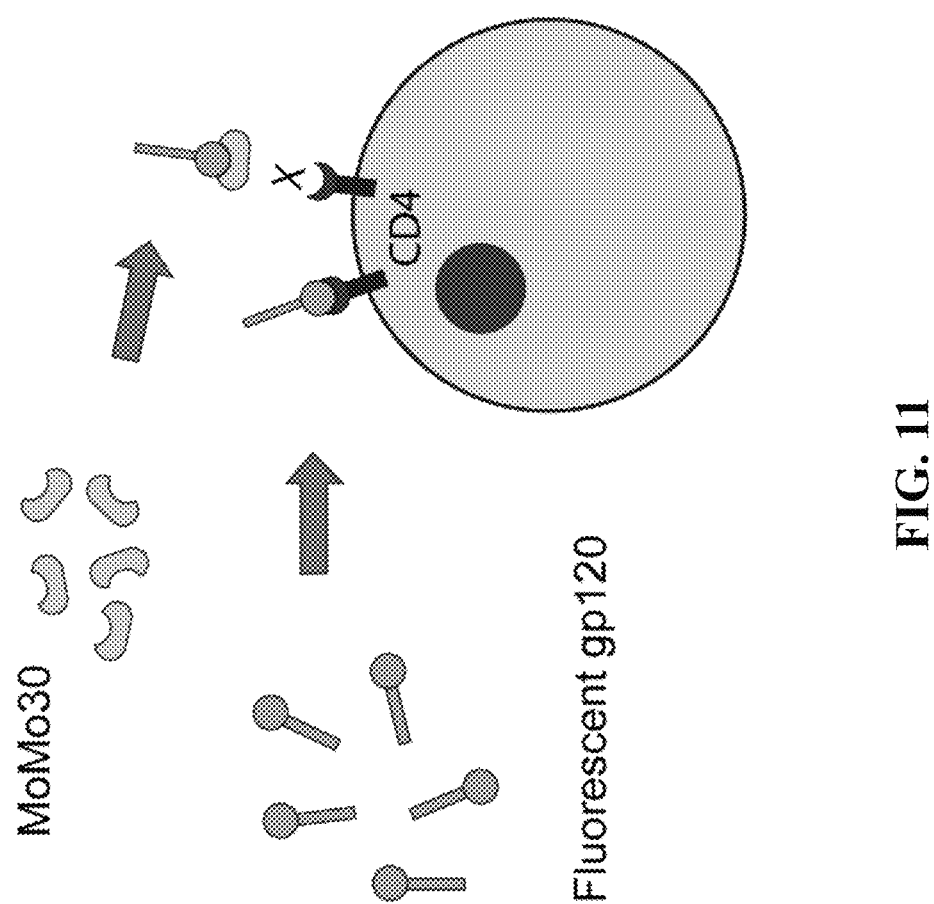
FIG. 11 is a schematic depiction of a blocking assay to examine whether MoMo30-containing extracts from *M. balsamina* inhibit the binding of purified HIV gp120 to CD4. Purified fluorescently labeled gp120 (30 µg, ImmunoDx) was added to 1×10$^6$ Jurkat T cells either with PBS or a pooled combination of extracts.

To further characterize the antiviral properties of the 30 kDa MoMo protein, a *M. balsamina* plant extract was incubated with purified HIV-1 gp120 loaded on a non-denaturing polyacrylamide gel. The results of this analysis showed that the 30 kDa protein in the plant extract binds HIV-1 gp120 inducing a band-shift as shown in FIG. 10A. Further, this interaction was not disrupted by boiling or denaturing conditions of the gel (data not shown).

Figure 12:
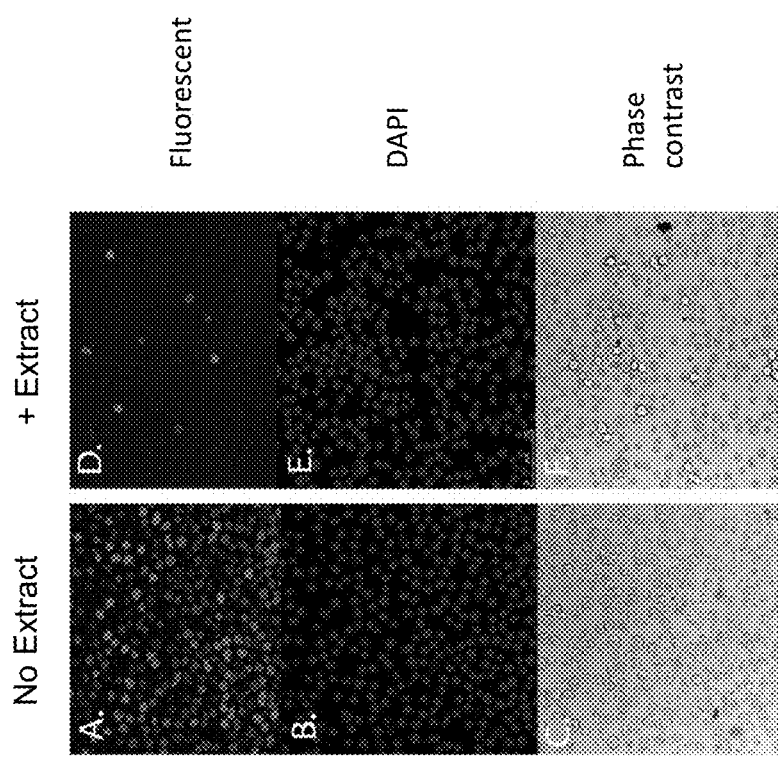
FIG. 12, panels A-F show the results of a fluorescence binding assay (as depicted in schematic in FIG. 11). Briefly, Jurkat T cells are mixed with FITC labeled gp120 either in the absence (panels A-C) or presence (panels D-F) of extract A. The results show that binding of fluorescently labeled gp120 to the surface of Jurkat T-cells (panel A) is inhibited in the presence of the MoMo30-containing plant extracts (panel D). Panels B and E are the same cells stained with DAPI and panels C and F depict the same cells under phase contrast.

To further confirm this binding in the context of live cells, a blocking assay was carried out to determine the stage of viral replication inhibited by MoMo30. To assay attachment of gp120 to susceptible cells, purified FITC labeled gp120 was mixed with Jurkat cells. FITC labeled gp120 binds the cell surface to make it visible. In the absence of MoMo30, the purified gp120 can attach to CD4 on the surface of Jurkat cells (see FIG. 12, panels A to C). A stock solution of 200 nM of MoMo30 (sufficient to completely inhibit 1 ng of virus) was pre-incubated with the gp120 before adding the Jurkat suspension. Treatment with MoMo30 blocked the interaction of gp120 with Jurkat cells (compare FIG. 12, panel A to panel D). This finding is consistent with MoMo30 blocking the initial step in replication by binding to gp120 and blocking entry.

Example 11. MoMo30 Binds to the Glycan Residues of Gp120

Figure 13A:
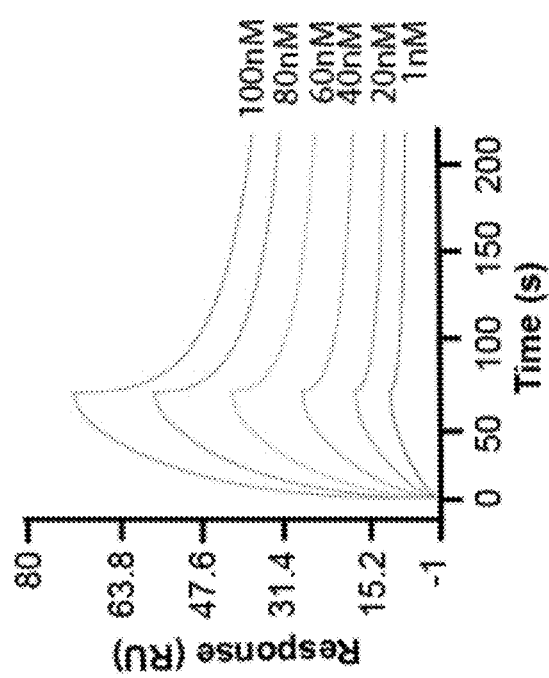
FIG. 13A shows a surface plasmon resonance (SPR) analysis (Biacore) indicating that MoMo30 protein from a cell extract attaches to HIV gp120 so as to prevent its interaction with the CD4 receptor. Gp120 was immobilized on the gold surface and MoMo30 protein was flowed across the surface at concentrations from 6 to 200 nM. The assay was done in triplicate on separate days.

To further characterize the interaction of MoMo30 with gp120, surface plasmon resonance (Biacore) experiments were carried out. Purified gp120 was bound to a chip surface, and MoMo30 at concentrations from 1 to 100 nM was allowed to flow across the surface, allowing the binding to be further characterized. Increasing concentrations of MoMo30 showed proportional reflectance increases of the chip (FIG. 13A). Three independent measurements in triplicate gave a kd of $2.42 \times 10^{-3}$, K.D. of 6.0 µM, and ka of 400.5 1/Ms. The binding profile suggests that there is a fast on rate and a biphasic off rate. The initial dissociation is rapid, followed by a very slow dissociation.

Figure 13B:
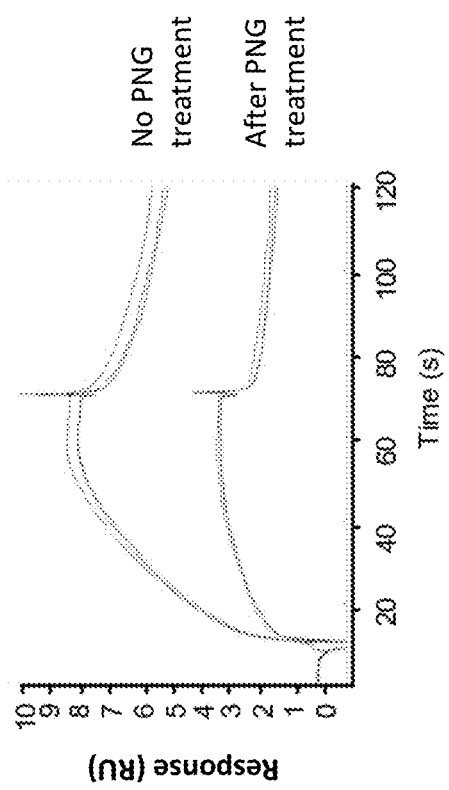
FIG. 13B shows that binding of MoMo30 to gp120 is dependent on glycosyl residues on gp120. A Biacore chip was saturated with gp120 and MoMo30 (top curves). The gp120-MoMo30 complexes were treated with PNG glycosylase to remove sugar residues from gp120 (bottom curves). Loss of sugar residues resulted in a decrease in binding.

To further characterize the binding of MoMo30 to gp120, purified gp120 was pre-treated with PNGase F. PNGase F is an amidase that works by cleaving between the innermost GlcNAc and asparagine residues of high mannose, hybrid, and complex oligosaccharides from N-linked glycoproteins and glycopeptides, resulting in a deaminated protein or peptide and a free glycan. Following treatment with PNGase F, a dramatic decrease in binding to the chip surface was observed (see FIG. 13B), the loss of sugar residues produced a decrease in reflectance units (RU), reflecting a decrease in MoMo30 binding to gp120, suggesting that MoMo30 binds to glycan residues in gp120.

Example 12. Effect of Mannose Monosaccharide and Glycan Specific mAbs on Inhibition of Infection by MoMo30

Figure 14A:
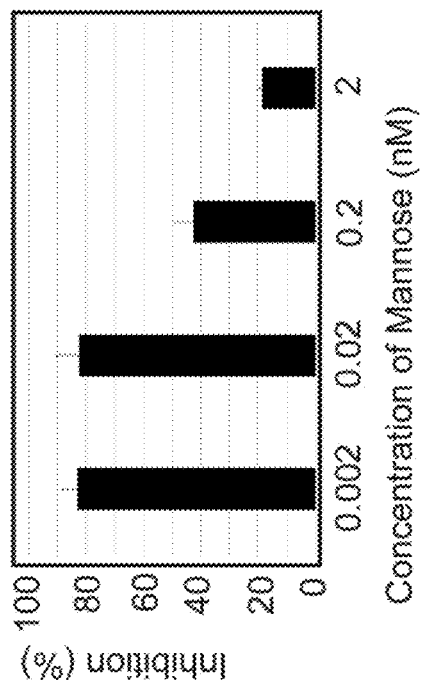
In FIG. 14A, Gp120 was bound to a Biacore chip surface and MoMo30 was allowed to flow across the chip at concentrations from 1 nM to 100 nM. Binding was monitored by changes in surface plasmon resonance.

The glycans on gp120 comprise a mixture of high mannose glycans and complex-type mannose glycans. To determine the effect of adding mannose in the context of MoMo30 binding to HIV-1$_{NL4-3}$, HIV-1$_{NL4-3}$ was incubated with MoMo30 (2 nM) in the presence of mannose concentrations from 0 to 2 nM (FIG. 14A). The results of this experiment showed that inhibition of HIV by MoMo30 was entirely abolished by the presence of mannose at a concentration of 2 nM, which is a 1:1 molar ratio with MoMo30, thereby suggesting a single binding site in gp120 (FIG. 14A).

Figure 14B:
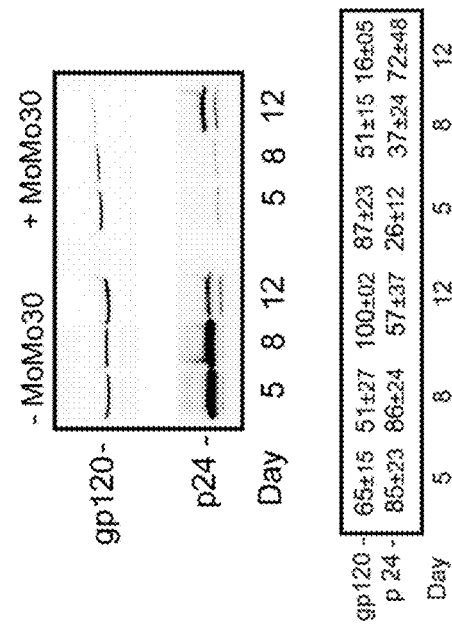
FIG. 14B shows that exposure of HIV-1 to MoMo30 reduces its reactivity with the glycan specific mAb 2G12. Virus was harvested at days 5, 8, and 12 and concentrated by centrifugation at 125,000×g through a 30% sucrose cushion. The pellet was subjected to SDS-PAGE and an immunoblot was done using anti-gp120 glycosyl specific antibody 2G12 and p24 mouse antibody.

The monoclonal antibody 2G12 has been previously shown to react with specific high mannose glycans on the surface of gp120 (Punja Z K et al. (1993) J Nematol 25:526-40; Sahai A S et al. (1993) FEMS Microbiology Reviews 11:317-338), most likely N295 and N332 (Scanlan C N et al., (2002) J. Virol. 76:7306-7321). To determine the effect of MoMo30 on reactivity with the antibody 2G12, Jurkat cells were infected with HIV-1$_{NL4-3}$ in the presence or absence of 1 nM MoMo30. Virus was harvested on days 5, 8, and 12 after initial exposure and the resulting particles were subjected to immunoblot analysis using the mAb 2G12 (FIG. 14B). The results of this experiment showed that exposing HIV-1 to MoMo30 appears to reduce reactivity over time with the glycan specific mAb 2G12. This is consistent with the observation that MoMo30 binds to glycan residues on the surface of gp120 and supports the conclusion that carbohydrate residues become inaccessible as a result of the binding.

Example 13. MoMo30 Binds to Other Viruses

Figures 15, 16:
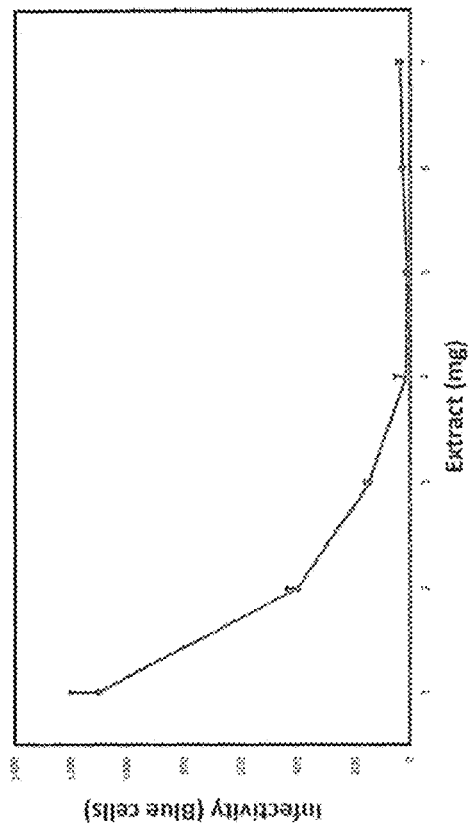
FIG. 15 shows inhibition of simian immunodeficiency virus (SIV-mac239) infectivity by MoMo30 cell extracts.
FIG. 16 shows inhibition of Ebola virus (Zaire strain) infectivity in HeLa or HFF cells by MoMo30 cell extracts.

To determine whether the antimicrobial properties of the active agent in the plant extracts are specific for HIV or could be extended to other viruses as a broad-spectrum antimicrobial agent, a MAGI cell infectivity assay was performed in simian immunodeficiency virus (SIV) infected cells, the results of which are shown in FIG. 15. Additionally, EBOV assays were carried out in Ebola virus infected cells treated with several different independently obtained MoMo30 extracts (A-E). Infectivity was determined by immunofluorescence using anti-EBOV antibodies. As shown in FIG. 16, each of the MoMo30 extracts was shown to exhibit anti-EBOV activity in both Hela and HFF cell lines as indicated by the EC50 (concentration required to obtain a 50% effect). For all extracts, the potency values were slightly better in Hela cells than in HFF. The safety index (SI) was low for extracts A and C in Hela cells.

Figure 17:
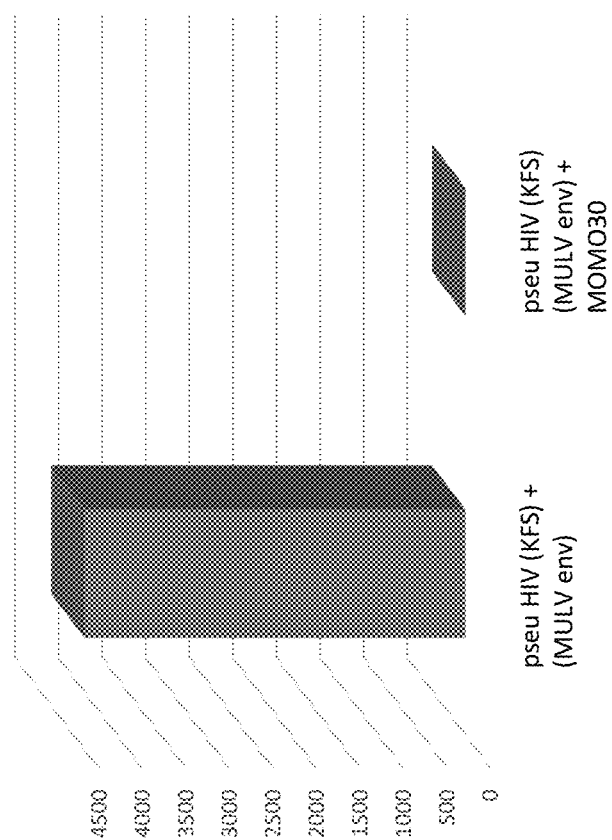
FIG. 17 shows that an HIV-1 pseudotyped with the aMLV envelope protein is sensitive to MoMo30 inhibition. An env deleted HIV-1 strain (KFS) pseudotyped to contain the MuMLV envelope glycoprotein was tested for infectivity in the absence (left) or presence (right) of MoMo30.

As an extension of this analysis, an envelope (env) deleted HIV-1 strain (KFS) pseudotyped to contain the MuMLV envelope glycoprotein was tested for infectivity in the absence (left) or presence (right) of MoMo30 (FIG. 17). The results of this assay showed that an HIV-1 pseudotyped with the aMLV envelope protein is sensitive to MoMo30 inhibition, suggesting that the antiviral properties of MoMo30 broadly extend to a variety of enveloped viruses via glycosylated surface envelopes. Taken together, these results are consistent with the active agent having broad-spectrum antimicrobial properties.

Figure 18:
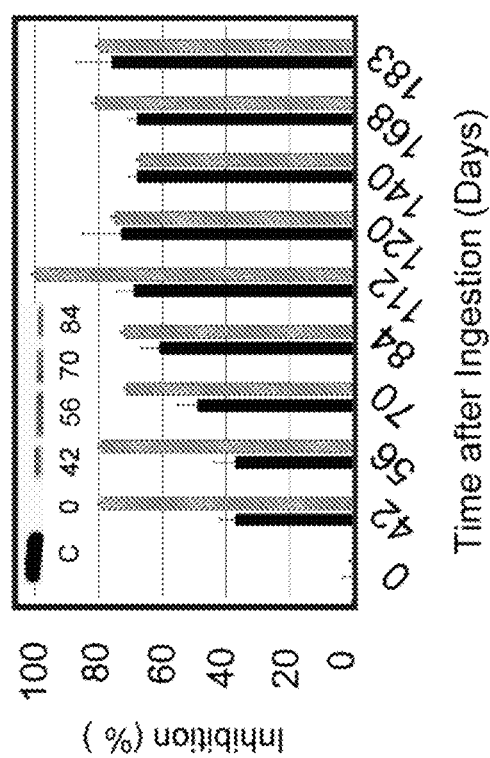
FIG. 18 shows adsorption of MoMo30 to the serum of Rhesus macaques. Two macaques were given herbal therapy in the same regimen as that given in the field (adjusted for weight). Three microliters of serum was tested by the MAGI assay (in triplicate) for antiviral effects at times from 0 to 183 days. The inset shows a western blot using N-terminal MoMo30 ab and 15 μl the sample in crosshatched bars.

Example 14. Orally Provided MoMo30 can Accumulate Stably in the Bloodstream of a Non-Human Primate To determine MoMo30 bioavailability in the bloodstream, M. balsamina extracts of the medicinal plants were administered to two Rhesus macaques by mouth for six months. MAGI infectivity assays and Western blots were carried out to confirm the presence of MoMo30 in the serum of treated animals (FIG. 18). Serum was tested from 0 to 183 days after ingestion. Neither of the animals exhibited inhibitory activity in their serum prior to ingestion of the plant extract. However sera from both possessed significant amounts of antiviral activity by 42 days post-ingestion (FIG. 2C). A Western blot was carried out using the anti-MoMo30 antibody described herein. A representative Western blot of serum from the animal is represented by the cross-hatched bars is shown as an inset to FIG. 18. Neither animal had detectable protein present in their serum before ingestion.

Example 15. MoMo30 is not Toxic to MAGI Cells at Therapeutic Levels

Figure 19:
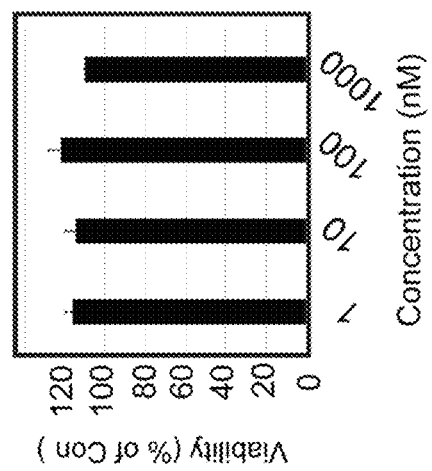
FIG. 19 shows the results of an MTT assay demonstrating a lack of cellular toxicity by MoMo30 protein at concentrations between 1 to 1000 nm.

To confirm the absence of toxicity at the cellular level, the effect of various MoMo30 concentrations (1 to 1000 nM) on MAGI cells was evaluated. Specifically, a cellular viability (MTT) assay measuring a cell's metabolic activity was carried out in which metabolic activity is reduced if the compound is toxic. As shown in FIG. 19, the treated cells showed no toxic effect at concentrations needed to inhibit HIV infection.

Example 16. MoMo30 Causes Hemagglutination

Figure 20A:
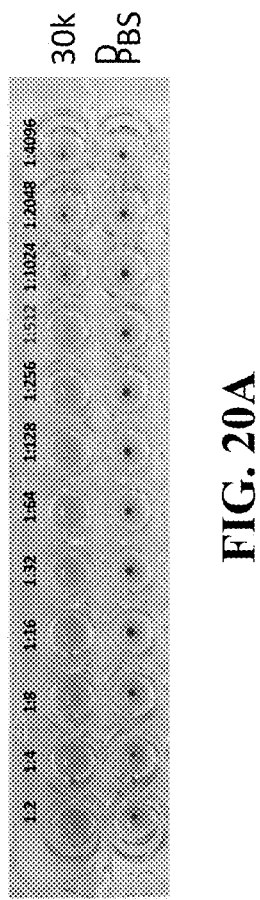
FIG. 20A shows that MoMo30 causes hemagglutination. Purified MoMo30 was tested for its ability to agglutinate sheep red blood cells (RBCs). As shown in panel A, the stock solution at a dilution of 1:512 was found to cause hemagglutination.

The observation that MoMo30 appears to bind sugar groups in a range of viral envelopes suggests that it has properties reminiscent of lectins. Inasmuch as lectins have often been found to exhibit hemagglutinin activity, it was of interest to investigate whether MoMo30 exhibits hemagglutinin activity too. FIG. 20A shows the results of this analysis. In this case, purified MoMo30 protein was tested for its ability to agglutinate sheep red blood cells (RBCs). As shown in panel A, a 30 mg/ml stock solution at a dilution of 1:512 was found to cause hemagglutination, consistent with lectin-like activity.

Example 17. MoMo30 Stimulates the Activation and Proliferation of T Cells

Figure 20B:
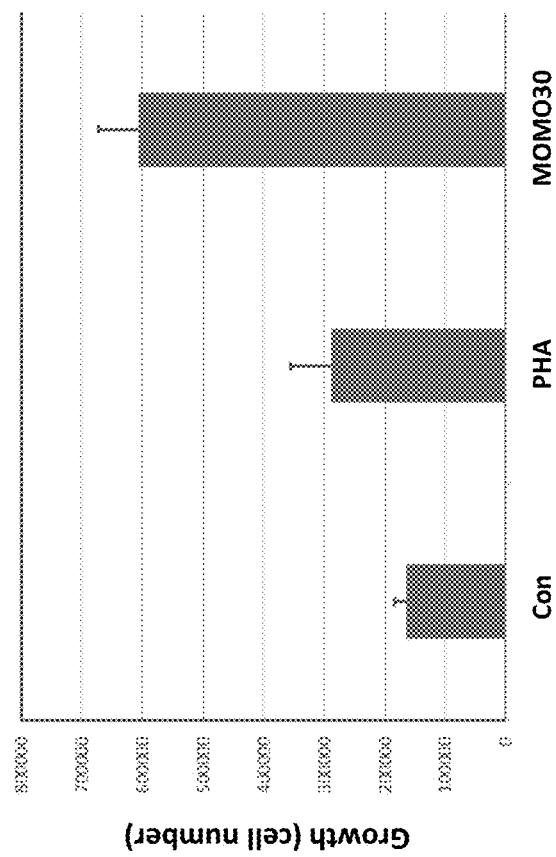
FIG. 20B shows that MoMo30 stimulates T cell growth. In each experiment, a fixed number of Jurkat cells was treated (left to right) with either PBS (control, Con), phytohemaglutinin A (PHA) or an equal amount of MoMo30.

Inasmuch as lectins are known to function as T cell mitogens, such as phytohemagglutinin A (PHA), it was of interest to examine whether MoMo30 can stimulate the activation and proliferation of T cells. Thus, a T cell activation assay was performed in which a fixed number of Jurkat cells was treated (left to right) with PBS (neg. control, Con), PHA (pos. control), or MoMo30 (FIG. 20B). The results of this assay showed that MoMo30 similarly stimulates the activation and proliferation of T cells.

Example 18. Clinical Study of HIV Patients Treated with a MoMo30 Herbal tea

Figure 21A:
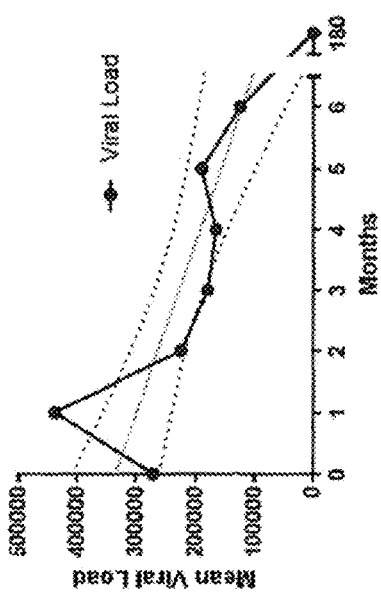
FIGS. 21A-21B show the results of a clinical study (n=61) in which HIV-1 infected patients were orally administered an herbal tea daily for 6 months containing Extracts A-E above. The results of this study showed a decrease in patients' HIV viral loads following a 6-month treatment with MoMo30 plant extract (FIG. 21A).
Figure 21B:
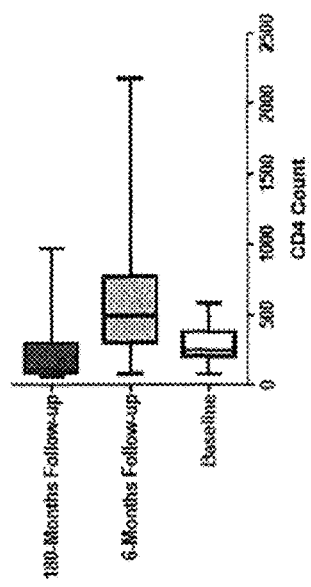

To examine the therapeutic efficacy of the MoMo30 protein, HIV-infected patients (n=61) were orally administered a combination of Extracts A-E daily for a period of 6 months during which no other anti-retroviral agents (ARVs) were administered. The extracts were administered in the form of an herbal tea. During this 6 month treatment period, the patients' viral loads (FIG. 21A) and CD4+ lymphocyte counts (FIG. 21B) were monitored. The results of this analysis showed that the average viral load was significantly reduced (FIG. 21A), while the CD4+ cell counts increased over this same period (FIG. 21B). A follow-up done over 10 years later (180 months) showed that some of the treated patients are healthy and exhibit undetectable or extremely low HIV virus levels (FIG. 21A).

Table 1 shows individual patient data evaluating viral loads and CD4+ cell counts in the follow-up patients compared to healthy, uninfected control subjects, where NP=Not performed (specimen clotted) and ND=Not detected <20 copies/ml.

TABLE 1

| Patient Number | % CD4+ cells/total lymphocytes | No. CD4+ cells/ml | No. total lymphocytes/ml | Viral Load (<20 copies) |
|---|---|---|---|---|
| Uninfected Control Subjects | | | | |
| 1 | 26 | 422 | 1630 | ND |
| 2 | 53 | 539 | 1019 | ND |
| 3 | 23 | 175 | 762 | ND |
| 4 | 50 | 116 | 230 | ND |
| 5 | 28 | 211 | 761 | ND |
| 6 | 21 | 374 | 1797 | ND |
| 7 | 32 | 139 | 434 | ND |
| 8 | 45 | 185 | 414 | ND |
| 9 | 28 | 82 | 298 | ND |
| 10 | 13 | 206 | 1634 | ND |
| 11 | 37 | 565 | 1518 | ND |
| 12 | 49 | 106 | 215 | ND |
| 13 | NP | NP | NP | ND |
| Control Avg | 34 | 260 | 893 | |
| Follow-Up Patients 10 Years After Treatment | | | | |
| 14 | 21 | 95 | 444 | ND |
| 15 | 36 | 61 | 170 | ND |
| 16 | 47 | 73 | 154 | ND |
| 17 | 16 | 146 | 895 | 3360 |
| 18 | 24 | 78 | 322 | ND |
| 19 | 33 | 969 | 2909 | 20 |
| 20 | 21 | 180 | 855 | ND |
| 21 | 32 | 95 | 294 | 3600 |
| 22 | 14 | 110 | 768 | ND |
| 23 | 29 | 314 | 1094 | ND |
| 24 | 32 | 283 | 892 | ND |
| 25 | 29 | 649 | 2253 | ND |
| 26 | 13 | 112 | 897 | ND |
| Patient Avg | 27 | 243 | 919 | |

The results of the follow-up study showed that the treated patients showed similar CD4 and viral load profiles compared to the uninfected control subjects.

Figure 22:
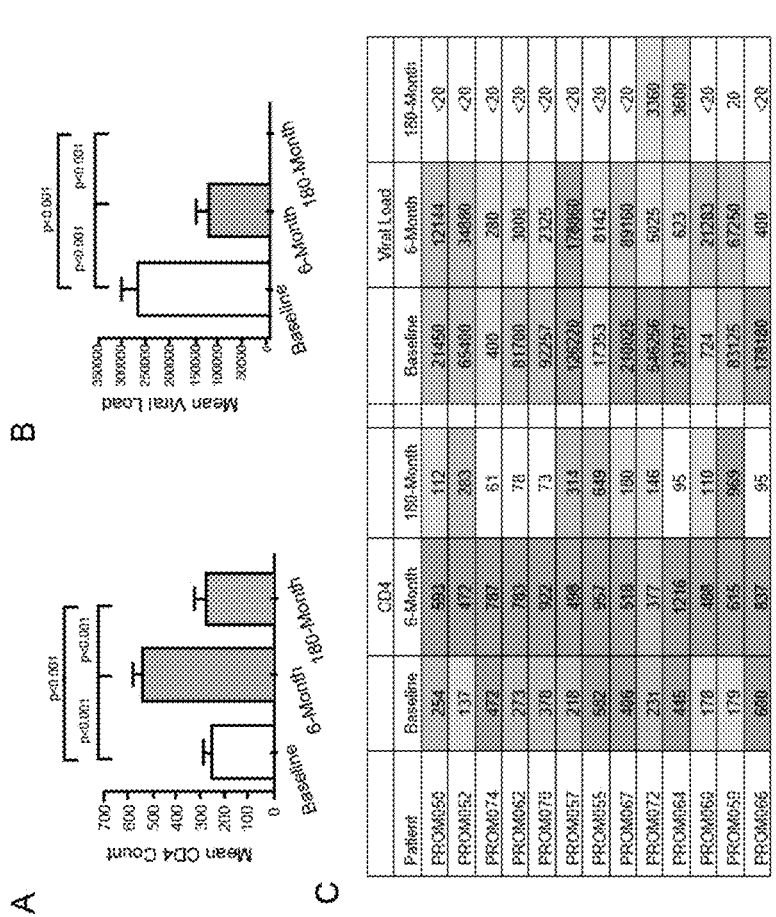
FIG. 22, panels A and B further show the results of the clinical study depicted in FIGS. 21A-21B where an increase in CD4+ lymphocytes of about 50% was observed following 6 months of treatment with the (FIG. 22, panel A), and a decrease of 60% of the patients' mean HIV viral loads was observed following a 6-months post-treatment (FIG. 22, panel B), which typically decreased to undetectable levels after 180 months (FIG. 22, panel B).

FIG. 22, panels A and B further show the results of the clinical study above, further documenting an increase in CD4+ lymphocytes of about 50% following 6 months of treatment with MoMo30 plant extract (FIG. 22, panel A), and a decrease of 60% of the patients' mean HIV viral loads following a 6-months post-treatment (FIG. 22, panel B), and in most cases decreased to undetectable levels after 180 months (FIG. 22, panel B).

In FIG. 22, panel C, a subset of the original patients (n=13) were re-tested at 180 months. The results of this analysis showed that CD4 counts in most of the re-tested patients returned to near baseline levels. In addition, viral loads in most of these re-tested patients had decreased to undetectable (<20 copies/ml) levels at 180 months post-treatment.

Example 19. Analysis of Neutralizing Antibody Production

Antisera from the subset of original patients (n=13) in FIG. 22C were further evaluated for production of neutralizing antibodies in an HIV neutralizing antibody assay as previously described (Simek et al., J. Virol., 83(14):7337-7348, July 2009). Multiple assay controls were set up to monitor each plate in a run and to allow for comparison of runs over time. The two types of controls included: (1) a control virus panel tested with all samples (sera, plasma, antibodies, etc.) and (2) an antibody control. The control virus panel includes the neutralization sensitive lab strain env, HIV-1$_{NL4-3}$; a less sensitive primary isolate env, JRCSF; and a specificity control env, amphotropic murine leukemia virus (aMLV) envelope. aMLV was used as a specificity control, because it is a non-HIV envelope and has not been found to be inhibitable by antibodies to HIV. Any inhibition of aMLV by plasma would be attributed to non-specific factors. The antibody control included a broadly neutralizing HIV+ plasma present on all control assay plates.

Figure 23:
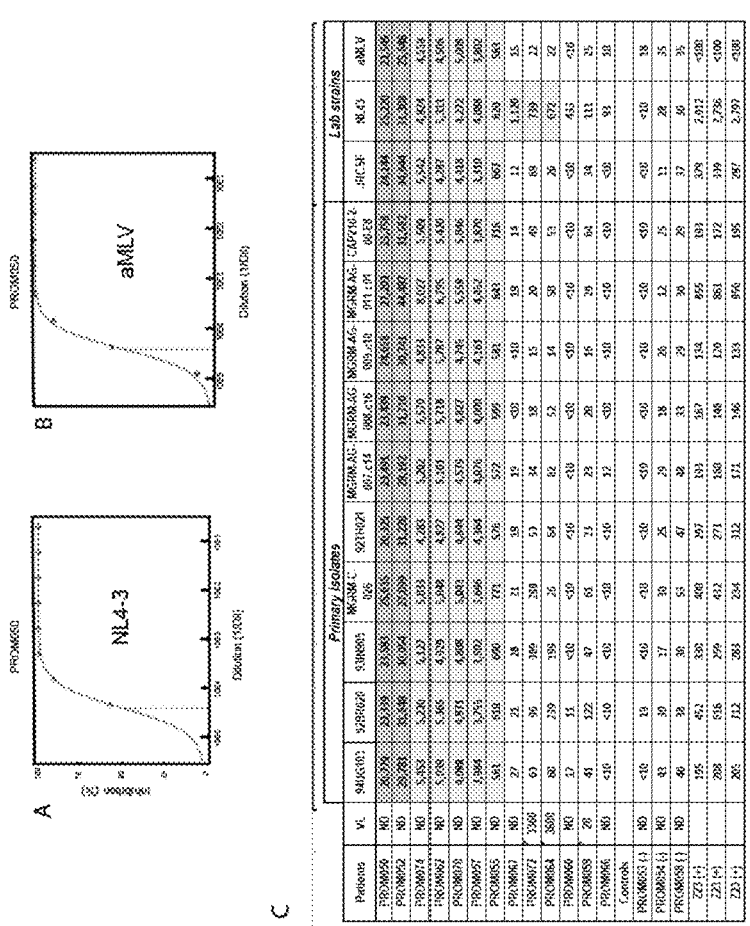
FIG. 23, panels A and B show that the 13 re-tested patients in FIG. 22, panel C produced neutralizing antibodies.

FIG. 23, panels A-C summarize the results of the HIV neutralizing antibody assay using antisera obtained from the 13 re-tested patients at 180 months post-treatment. FIG. 23, panels A and B show the results of the patient PROM050 serum being tested in a MAGI indicator cell assay for neutralizing activity against HIV-1 pseudotyped with an HIV-1$_{NL4-3}$ env or an aMLV env, respectively. FIG. 23, panel C shows a table depicting antibody titers from the 13 re-tested patients at 180 months post-treatment against each of an HIV-1 pseudotyped with an HIV-1 envelope from one or 10 primary strains or one of 3 lab strains of HIV-1, as indicated. In this case, the serum from each of these 13 patients was tested against 13 different isolates of HIV-1 in 5 different clades. The table in FIG. 23, panel C summarizes reciprocal dilutions of the inhibitory dose to induce 50% reduction in replication of virus (ID 50) as measured in a MAGI indicator cell assay. Darker shaded areas depict higher titers, while the lighter shaded areas depict lower titers.

Seven of these individuals had high titers of antibody against all of the isolates. Six of the patients had lower levels of antibody. All of the patients had significant levels of neutralizing antibodies against the common lab strain, HIV-1$_{NL4-3}$. Not wishing to be bound by theory, the results suggest that binding of MoMo30 to glycosyl groups of gp120 exerts pressure for selection of mutant viruses having fewer glycosyl groups so the virus will be less susceptible to MoMo30. Thus, viruses with fewer sugars will be more antigenic and allow the host to mount a neutralizing ab response.

The follow up patients were tested for neutralizing ab at 180 months. More than half of them show high levels of ab that can neutralize over a dozen strains of HIV-1. The pseudotyped strains were used to test different primary envelope proteins. MuMLV env was used as a negative control, since there was no expectation for subjects being infected with this mouse virus. However, half of the patients also had an antibody that could neutralize that control, suggesting a broadly cross-reactive antibody. These results suggest that neutralizing antibodies raised in response to MoMo30 are responsible for the long-term control of HIV infection.

Figure 24:
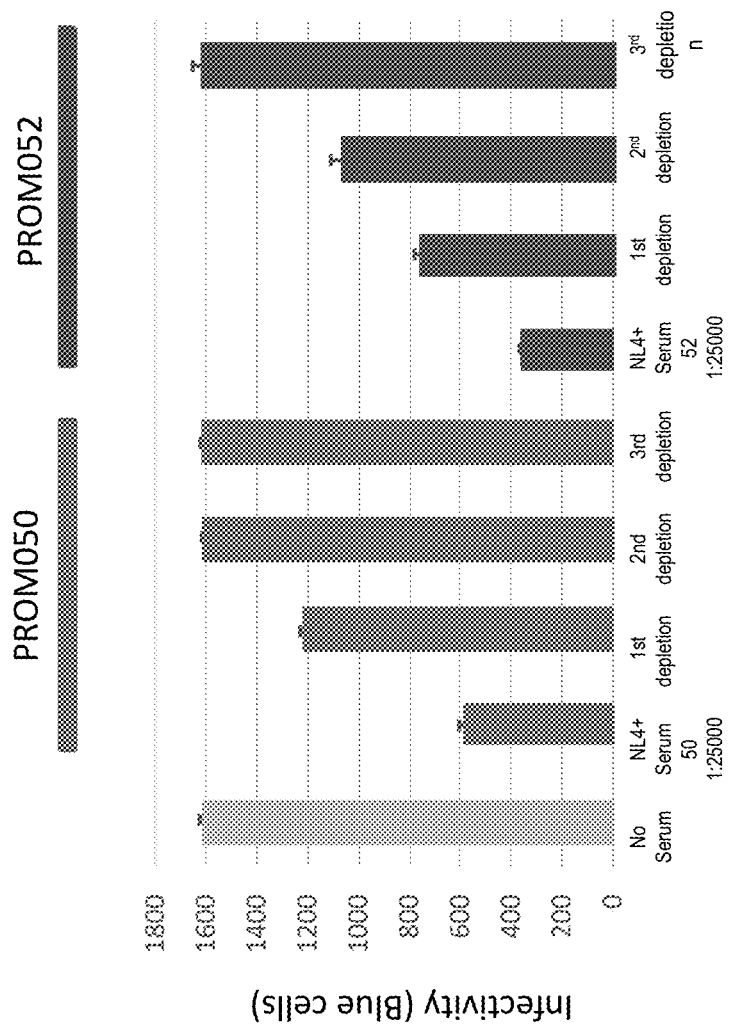
FIG. 24 shows the results of an analysis in which serum from two patients (PROM050 and PROM052) treated with MoMo30 extracts were tested for neutralizing activity against HIVNL4-3 following 3 successive rounds of Protein A/G adsorption. Following adsorption, neutralizing activity was completely depleted.

FIG. 24 shows that the neutralizing activity of serum from two patients (PROM050 and PROM052) treated with MoMo30 is completely eliminated following 3 successive rounds of Protein A/G adsorption. Additionally, these results confirm that the inhibitory activity was solely attributed to antibodies rather than an effect caused by the use of other anti-retroviral agents.

The above description is for the purpose of teaching the person of ordinary skill in the art how to practice the present invention, and it is not intended to detail all those obvious modifications and variations. While various embodiments have been described above, it should be understood that such disclosures have been presented by way of example only and are not limiting. Thus, the breadth and scope of the subject compositions and methods should not be limited by any of the above-described exemplary embodiments and should be defined only in accordance with the following claims and their equivalents, which should be understood to cover obvious modifications and variations which are readily apparent to a person of ordinary skill in the art upon reading the description. Further, the claims are intended to cover the components and steps in any sequence which is effective to meet the objectives there intended, unless the context specifically indicates the contrary.

What is claimed is:

1. A composition comprising:
an isolated/purified protein comprising an amino acid sequence at least 95% identical to SEQ ID NO: 4.

2. The composition of claim 1, wherein the protein comprises the amino acid sequence of SEQ ID NO: 4.

3. The composition of claim 1, wherein the composition is in a dried form.

4. The composition of claim 1, wherein the dried form is a capsule or tablet.

5. The composition of claim 1, wherein the composition is in a liquid form.

6. The composition of claim 1, wherein the composition comprises an herbal tea.

7. The composition of claim 1, wherein the composition further comprises at least one pharmaceutically acceptable carrier.

8. The composition of claim 7, further comprising a second antimicrobial agent.

9. A composition comprising a nucleic acid having a nucleotide sequence having at least 95% identity to SEQ ID NO: 2.

10. The composition of claim 9, wherein the nucleic acid comprises the nucleotide sequence of SEQ ID NO: 2.

11. An expression vector comprising the nucleic acid of claim 9 operably linked thereto to facilitate expression of the protein encoded therein.

12. A cell comprising a plasmid or expression vector comprising the nucleic acid of claim 9.

* * * * *